(12) United States Patent
Meade et al.

(10) Patent No.: US 12,508,328 B2
(45) Date of Patent: Dec. 30, 2025

(54) BIO-ACTIVATED REPORTERS TO VISUALIZE, IN REAL TIME, SPECIFIC GENE THERAPY PRODUCTS

(71) Applicant: Northwestern University, Evanston, IL (US)

(72) Inventors: Thomas J. Meade, Wilmette, IL (US); Sarah G. Kamper, Highland Park, IL (US)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 16/943,820

(22) Filed: Jul. 30, 2020

(65) Prior Publication Data

US 2021/0030896 A1  Feb. 4, 2021

Related U.S. Application Data

(60) Provisional application No. 62/880,405, filed on Jul. 30, 2019.

(51) Int. Cl.
*A61K 49/08* (2006.01)

(52) U.S. Cl.
CPC .................. *A61K 49/085* (2013.01)

(58) Field of Classification Search
CPC ..... A61K 49/106; A61K 49/10; A61K 49/085
See application file for complete search history.

(56) References Cited

U.S. PATENT DOCUMENTS

| | | |
|---|---|---|
| 5,450,010 A | 9/1995 | Van Der et al. |
| 5,455,512 A | 10/1995 | Groen et al. |
| 5,555,251 A | 9/1996 | Kinanen |
| 6,111,410 A | 8/2000 | Young |
| 6,119,032 A | 9/2000 | Martin |
| 6,127,775 A | 10/2000 | Bergen |
| 6,128,522 A | 10/2000 | Acker et al. |
| 6,144,202 A | 11/2000 | Kanazawa et al. |
| 7,354,568 B1 * | 4/2008 | Meade ................. A61K 49/10 424/9.363 |

OTHER PUBLICATIONS

Alauddin et al., Nuclear Medicine and Biology, 2003, 30, p. 261-265. (Year: 2003).*
Kamper, Northwestern University ProQuest Dissertation & Theses, 2014.3669267. (Year: 2014).*
Louie et al., Nature Biotechnol., 2000, 18, p. 321-325. (Year: 2000).*
Waerzeggers et al., Methods, 2009, 48, p. 146-160. (Year: 2009).*
Arena et al., Bioconjugate Chem., 2011, 22, p. 2625-2635 (Year: 2011).*
Keliris et al., Bioorganic & Medicinal Chemistry, 2011, 19, p. 2529-2540. (Year: 2011).*
Keliris et al., Contrast Media Mol. Imaging, 2012, 7, p. 478-483. (Year: 2012).*
Greiner-Tollersrud OK, Berg T. Lysosomal Storage Disorders. In: Madame Curie Bioscience Database Landes Bioscience; 2000-2013.
Concilio S.C., et al., "A Brief Review of Reporter Gene Imaging in Oncolytic Virotherapy and Gene Therapy", Molecular Therapy Oncolytics, vol. 21, Jun. 2021, pp. 98-109.
European Medicines Agency: "Guideline on Follow-up of Patients Administered with Gene Therapy Medicinal Products", London, Oct. 22, 2009, pp. 1-12.
FDA Guidance: "Long Term Follow-Up After Administration of Human Gene Therapy Products", Guidance for Industry, Jan. 2020, 37 Pages.
Hiona A., et al., "Noninvasive Radionuclide Imaging of Cardiac Gene Therapy: Progress and Potential", Nature Clinical Practice Cardiovascular Medicine, vol. 5, Supplement 2, Aug. 2008, pp. S87-S95.
Iqvia Biotech: "Long-term Follow-up for Gene Therapies—Innovative, Patient-centered Approaches", White Paper, 2021, pp. 1-10.
Marsden G., et al., "Gene Therapy: Understanding the Science, Assessing the Evidence, and Paying for Value", Institute for Clinical and Economic Review (ICER), A Report from the 2016 ICER Membership Policy Summit, Mar. 2017, pp. 1-48.
Tarantal A.F., "In Vivo Imaging and Gene Therapy: Monitoring Safety, Biodistribution, and Long-Term Expression with Positron Emission Tomography", Human Gene Therapy, vol. 31, No. 23 and 24, 2021, pp. 1224-1225.
Vassaux G., et al., "In Vivo Noninvasive Imaging for Gene Therapy", Journal of Biomedicine and Biotechnology, vol. 2003, No. 2, 2003, pp. 92-101.

* cited by examiner

*Primary Examiner* — Jake M Vu
*Assistant Examiner* — Leah H Schlientz
(74) *Attorney, Agent, or Firm* — Casimir Jones, S.C.; Rikki A. Hullinger

(57) ABSTRACT

Provided herein are MRI contrast agents that are conditionally activated by an enzyme from a reporter gene coupled to a gene of interest. In some embodiments, provided herein is a platform where a substrate (blocking access of water to a Gd(III) ion) is removed by an enzyme that can be changed to accommodate a number of gene therapy targets.

20 Claims, 57 Drawing Sheets

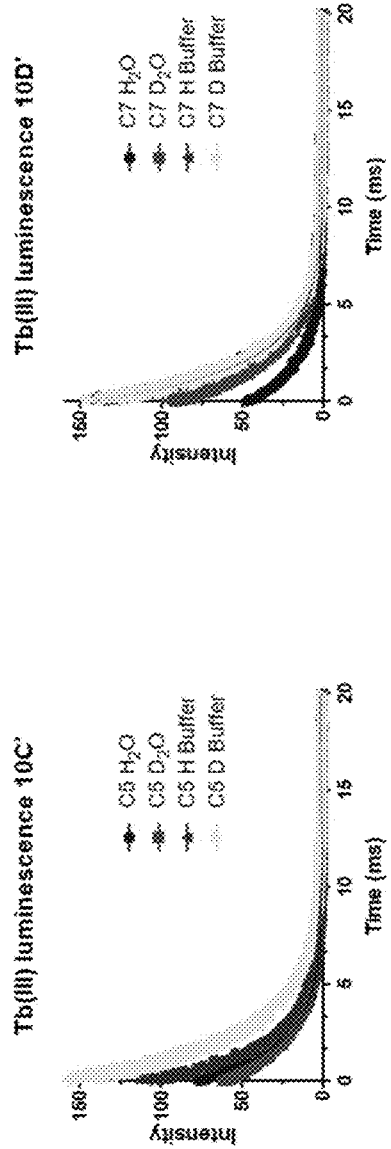
FIG. 17C
FIG. 17D
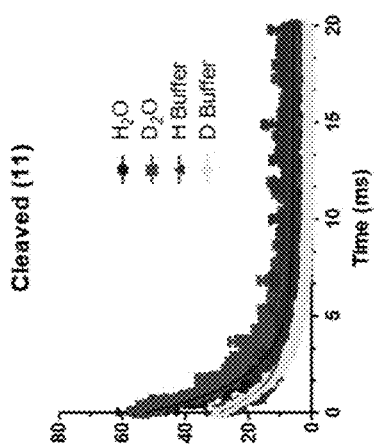
FIG. 17E

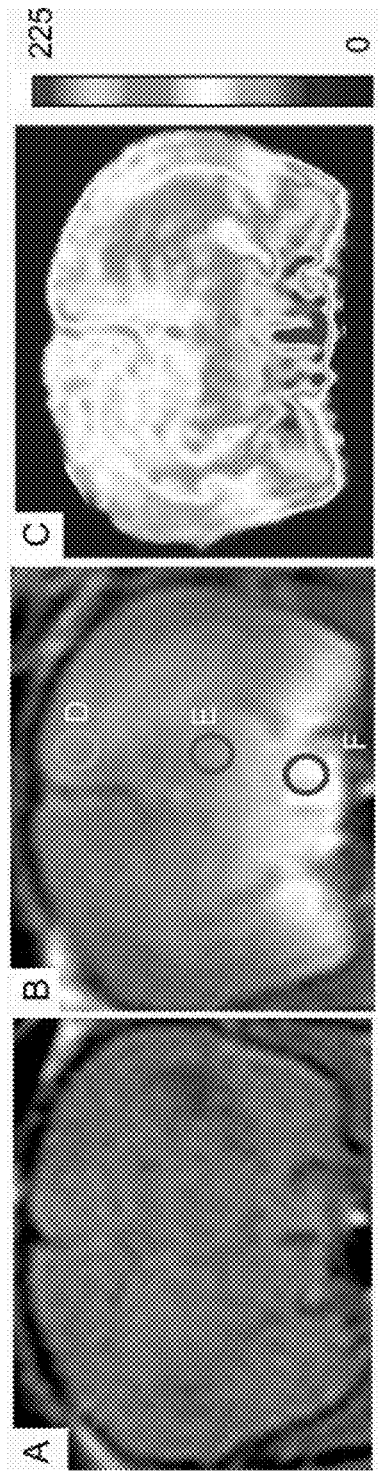
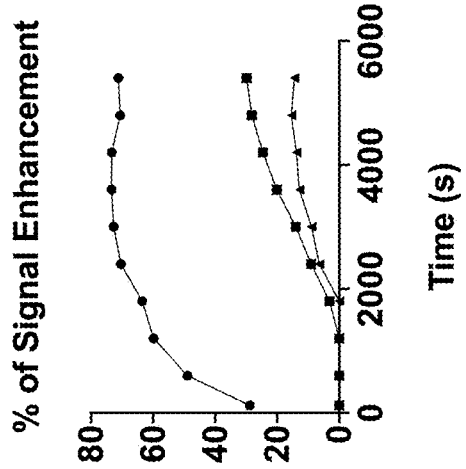
FIG. 31A  FIG. 31B  FIG. 31C  FIG. 31D

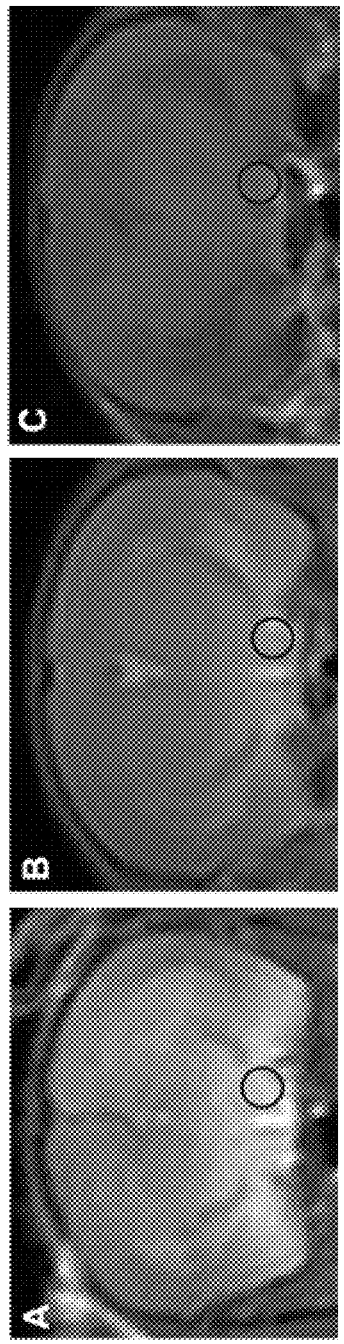
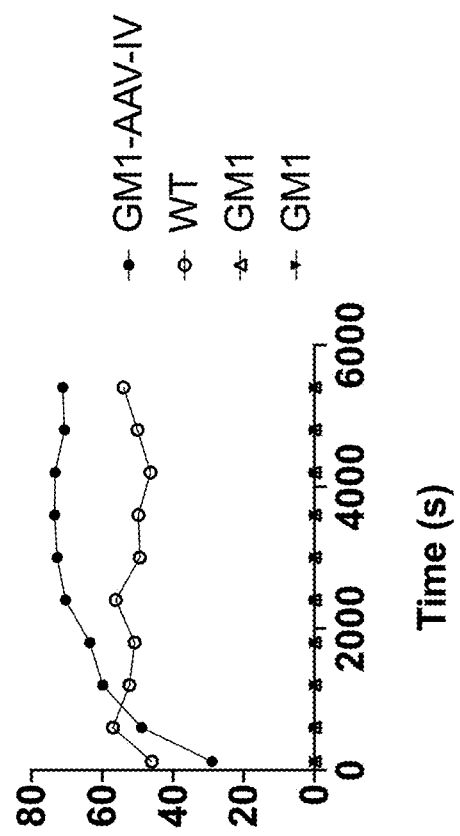
FIG. 32A
FIG. 32B
FIG. 32C
FIG. 32D

| Chromosomal Protein Defect Localization | Disease |
|---|---|
| DEFECTS IN GLYCAN DEGRADATION | |
| Defects in glycoprotein degradation | |
| α-Sialidase | Sialidosis |
| Galactosialidosis | |
| α-Mannosidase | Cathepsin A |
| β-Mannosidase | α-Mannosidosis |
| Glycosylasparaginase | β-Mannosidosis |
| α-Fucosidase | Aspartylglucosaminuria |
| α-N-Acetylglucosaminidase | Fucosidosis |
| | Schindler |
| Defects in glycolipid degradation | |
| A. GM1 Ganglioside | |
| β-Galactosidase | GM1 gangliosidosis / MPS IVB |
| β-Hexosaminidase α-subunit | GM2-gangliosidosis (Tay-Sachs) |
| β-Hexosaminidase β-subunit | GM2-gangliosidosis (Sandhoff) |
| GM2 activator protein | GM2 gangliosidosis |
| Glucocerebrosidase | Gaucher disease |
| Saposin C | Gaucher disease |
| B. Defects in the degradation of sulfatide | |
| Arylsulfatase A | Metachromatic leukodystrophy |
| Saposin B | Metachromatic leukodystrophy |
| Formyl-Glycin generating enzyme | Multiple sulfatase deficiency |
| β-Galactosylceramidase (Krabbe) | Globoid cell leukodystrophy |
| C. Defects in degradation of globotriaosylceramide | |
| α-Galactosidase A | Fabry |

FIG. 39A

| | |
|---|---|
| Defects in degradation of Glycosaminoglycan (Mucopolysaccharidoses) | |
| A. Degradation of heparan sulphate | |
| Iduronate sulfatase | MPS II (Hunter) |
| α-L-iduronidase | MPS I (Hurler, Scheie) |
| Heparan N-sulfatase | MPS IIIa (Sanfilippo A) |
| Acetyl-CoA transferase | MPS IIIc (Sanfilippo C) |
| N-acetyl glucosaminidase | MPS IIIb (Sanfilippo B) |
| β-glucuronidase | MPS VII (Sly) |
| N-acetyl glucosamine 6-sulfatase | MPS IIId (Sanfilippo D) |
| Degradation of other mucopolysaccharides | |
| N-Acetylgalactosamine 4-sulfatase | MPS VI |
| Galactose 6-sulfatase | MPS IVA (Morquio A) |
| Hyaluronidase | MPS IX |
| Defects in degradation of glycogen | |
| α-Glucosidase | Pompe |
| DEFECTS IN LIPID DEGRADATION | |
| Defects in degradation of sphingomyelin | |
| Acid sphingomyelinase | Niemann Pick type A and B |
| Acid ceramidase | Farber lipogranulomatosis |
| Defects in degradation of triglycerides and cholesteryls ester | |
| Acid lipase | Wolman and cholesteryl ester storage disease |
| DEFECTS IN PROTEIN DEGRADATION | |
| Cathepsin K | Pycnodysostosis |
| Tripeptidyl peptidase | Ceroide lipofuscinosis 2 |
| Palmitoyl-protein thioesterase | Ceroide lipofuscinosis 1 |
| *DEFECTS IN LYSOSOMAL TRANSPORTERS* | |
| Cystinosin (cystin transport) | Cystinosis |
| Sialin (sialic acid transport) | Salla disease |

FIG. 39B

| DEFECTS IN LYSOSOMAL TRAFFICKING PROTEINS | |
|---|---|
| UDP-N-acetylglucosamine Phosphotransferase γ-subunit | Mucolipidosis III (I-cell) |
| Mucolipin-1 (cation channel) | Mucolipidosis IV |
| LAMP-2 | Danon |
| NPC1 | Niemann Pick type C |
| CLN3 | Ceroid lipofuscinosis |
| CLN 6 | Ceroid lipofuscinosis 6 |
| CLN 8 | Ceroid lipofuscinosis 8 |
| LYST | Chediak-Higashi |
| MYOV | Griscelli Type 1 |
| RAB27A | Griscelli Type 2 |
| Melanophilin | Griscelli Type 3 |
| AP3 β-subunit | Hermansky Pudlak 2 |

FIG. 39C

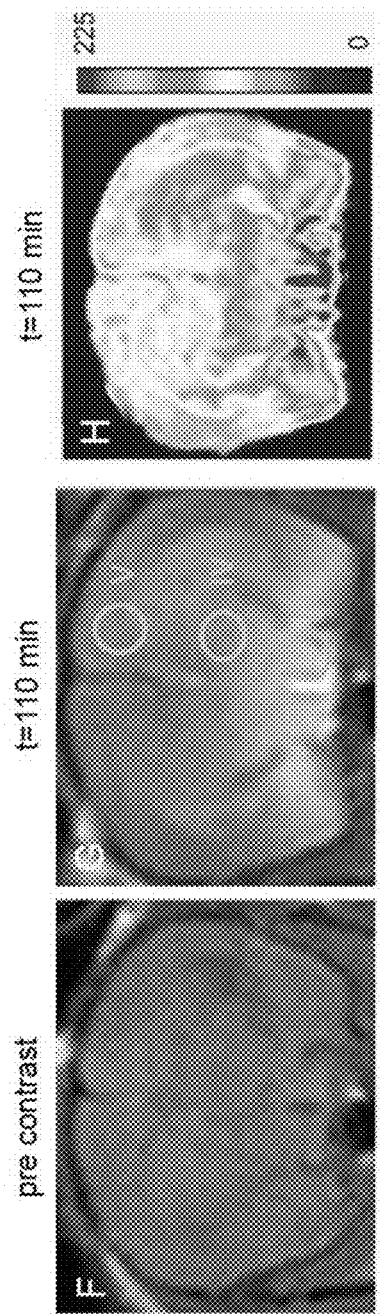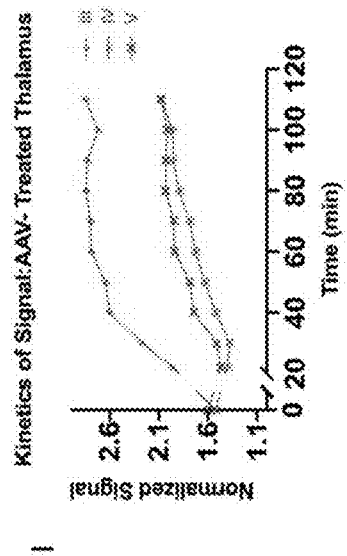
FIG. 42F-42I

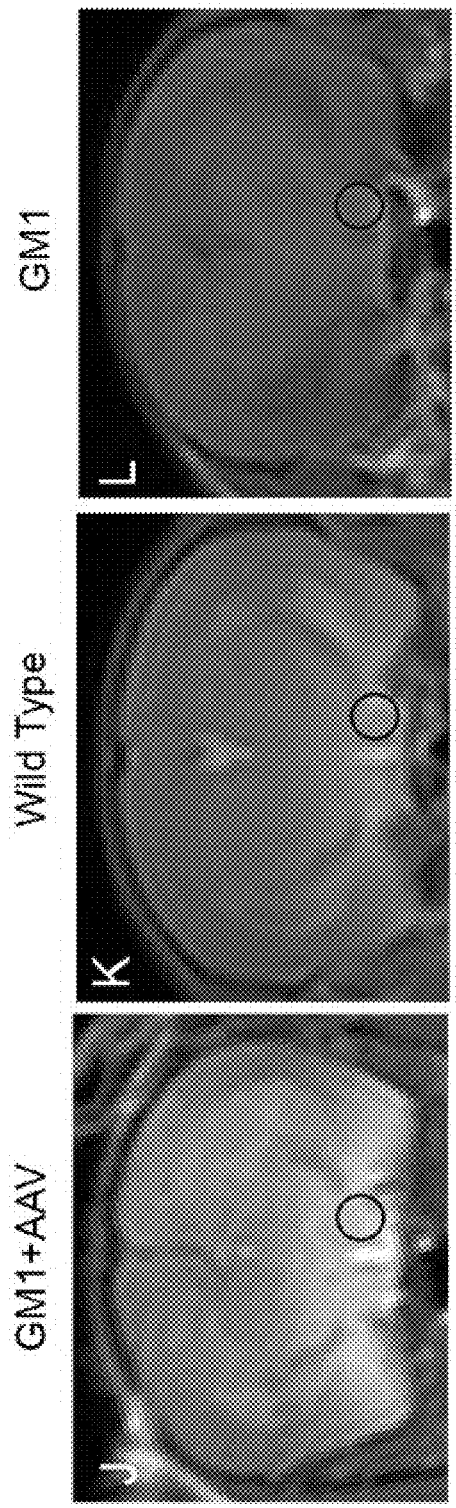
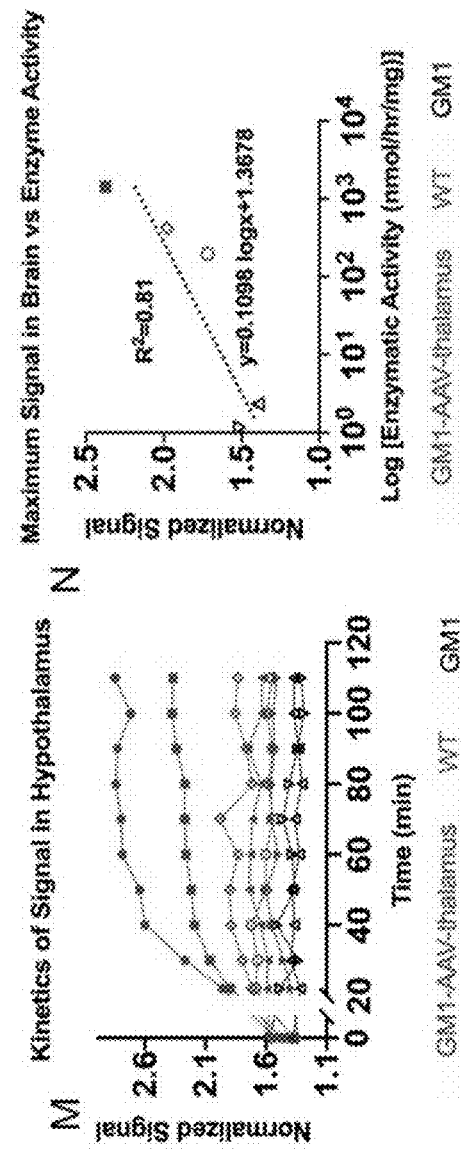
FIG. 42J-42N

BIO-ACTIVATED REPORTERS TO VISUALIZE, IN REAL TIME, SPECIFIC GENE THERAPY PRODUCTS

RELATED APPLICATIONS

This application claims priority to U.S. Provisional Patent Application No. 62/880,405, filed Jul. 30, 2019, the entire contents of which are incorporated herein by reference.

STATEMENT REGARDING FEDERALLY SPONSORED RESEARCH

This invention was made with government support under grant number R01 EB005866 awarded by the National Institutes of Health. The government has certain rights in the invention.

FIELD

Provided herein are magnetic resonance imaging (MRI) contrast agents and uses thereof. In particular, provided herein are MRI contrast agents that are conditionally activated by an enzyme from a reporter gene coupled to a gene of interest (e.g. "bioresponsive" MRI contrast agents.)

BACKGROUND

Gene therapy represents a viable means for treating multiple disease types, including lysosomal storage diseases (LSD), but effective clinical trials with shortened paths to approval will require robust biomarkers to track therapeutic effect. To date, there is a lack of non-invasive ways to determine biodistribution or activity levels of these therapies in the body and the central nervous system (CNS) in patients. This is a significant hindrance, leaving investigators guessing which organs or structures are effectively treated and, due to the lag time associated with clinical disease progression, this limitation ultimately impacts the evolution of treatment modalities. Accordingly, the need for non-invasive, disease specific biomarkers that reflect treatment efficacy is paramount.

SUMMARY

In some aspects, provided herein are complexes for use in magnetic resonance imaging (MRI). In some embodiments, the complex comprises an MRI contrast agent, a blocking substrate cleavable by a target enzyme, and a self-immolative linker attaching the blocking substrate to the MRI contrast agent. In some embodiments, cleavage of the blocking substrate by the target enzyme activates the MRI contrast agent to generate a detectable signal.

In some embodiments, the contrast agent comprises gadolinium. In some embodiments, the contrast agent comprises a macrocyclic gadolinium chelate.

In some embodiments, the blocking substrate comprises a sugar moiety containing a glucose, a galactose, a mannose, a ribose, a dextrose, or a derivative thereof. For example, the blocking substrate may comprise α-glucose, β-glucose, β-galactose, β-glucuronic acid, or N-acetylgalactosamine.

In some embodiments, the complex further comprises a targeting moiety.

The complexes may be formulated into compositions comprising any suitable pharmaceutically acceptable excipient.

In some aspects, provided herein are methods of monitoring gene therapy in a subject. The methods comprise providing gene therapy to the subject, providing a composition as described herein to the subject, and performing magnetic resonance imaging on the subject.

In some embodiments, the subject may be deficient in one or more enzymes associated with a lysosomal storage disease. Gene therapy may be provided to the subject to restore activity of the enzyme in the subject. In some embodiments, successful restoration of enzyme activity in the subject activates the contrast agent to produce a detectable signal.

In some embodiments, the subject is deficient in an enzyme selected from α-galactosidase, β-galactosidase, α-glucosidase, β-glucosidase, hexosaminidase-A, and hexosaminidase-B. In some embodiments, the subject is human. In some embodiments, the composition is administered parenterally.

BRIEF DESCRIPTION OF THE DRAWINGS

FIG. 1A shows X-gal staining (blue) for β-gal in GM1 mice and cats after AAV mediated gene therapy. FIG. 1B shows Naphthol staining (red) for Hex in SD mice and cats after AAV mediated gene therapy. Mouse brain coronal sections containing both hemispheres. Cat brain staining of a single hemisphere. Spinal cord distribution is also shown (bottom).

FIG. 5A) After intraperitoneal injection of the contrast agent, mild enhancement is observed in wild type animals after $T_1$w MRI. In β-gal−/− animals treated with intravenous gene therapy encoding β-gal, strong enhancement is observed in the internal organs (e.g., liver and gastrointestinal tract). FIG. 5B) After intrathecal injection of contrast, no enhancement is observed in wild type animals, however after thalamic injection of gene therapy for β-gal, strong enhancement of the brain is observed, in areas with better contrast distribution after intrathecal delivery (lateral ventricles and ventral aspect of the brain).

pre-contrast. B) post-contrast image showing areas (D-F) where signal changes were quantified over time. Note scale y-axis is greater for F, because this area has the greatest exposure to CSF backflow after intrathecal injection. (C) Heat map of signal enhancement shows the greatest enhancement in the ventral aspect of the brain where CSF is located.

Figure 7B:
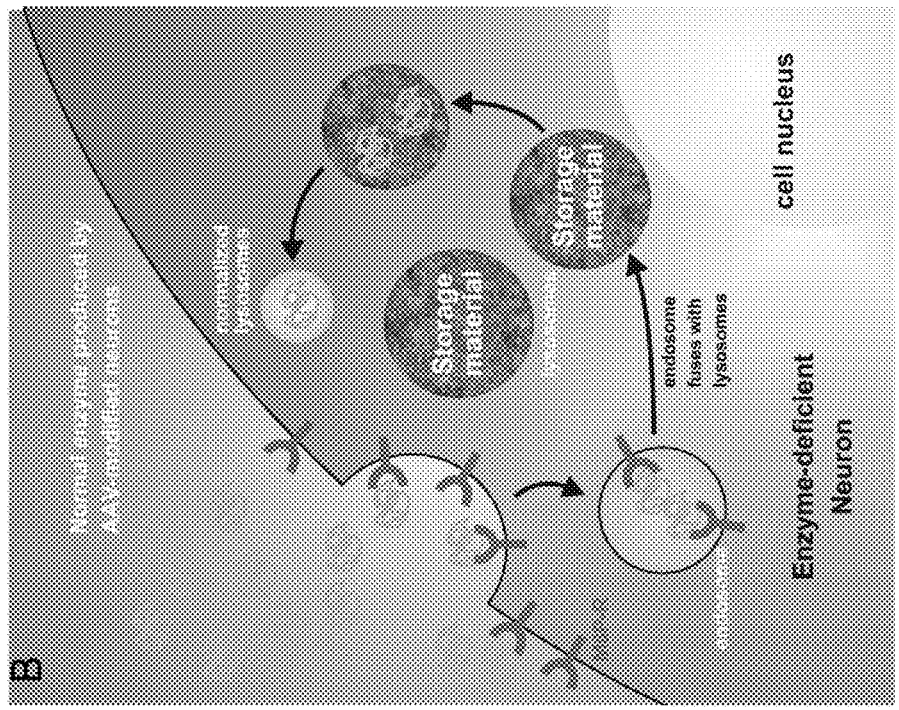
Figure 7A:
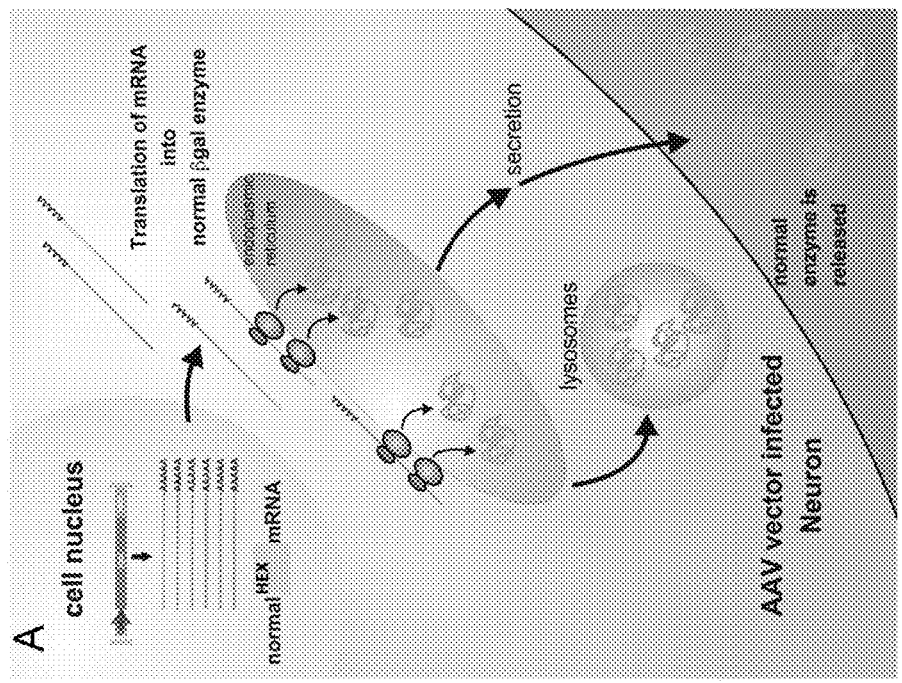

FIG. 7A-7B is a schematic showing the therapeutic principle of cross correction. FIG. 7A shows transduced cells overexpress and secrete functional enzyme. FIG. 7B shows that this is taken up by untransduced cells via the mannose-6-phosphate receptors on the cells surface.

Figure 8:
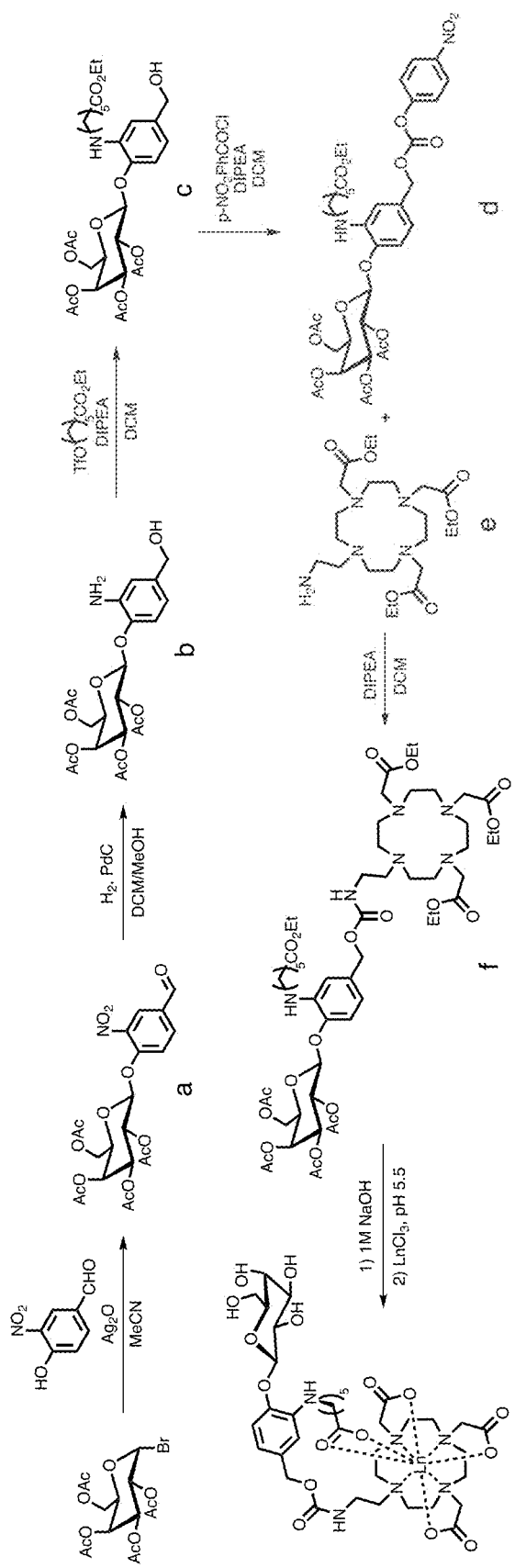

FIG. 8 shows an exemplary chemical synthesis method for large-scale production of β-gal responsive MR contrast agent. Key steps have been redesigned (in green) to incorporate a convergent strategy and efficient coupling conditions to maximize yield and purity of late stage synthetic intermediates, enabling more rapid, large-scale synthesis of the final product.

Figure 9:
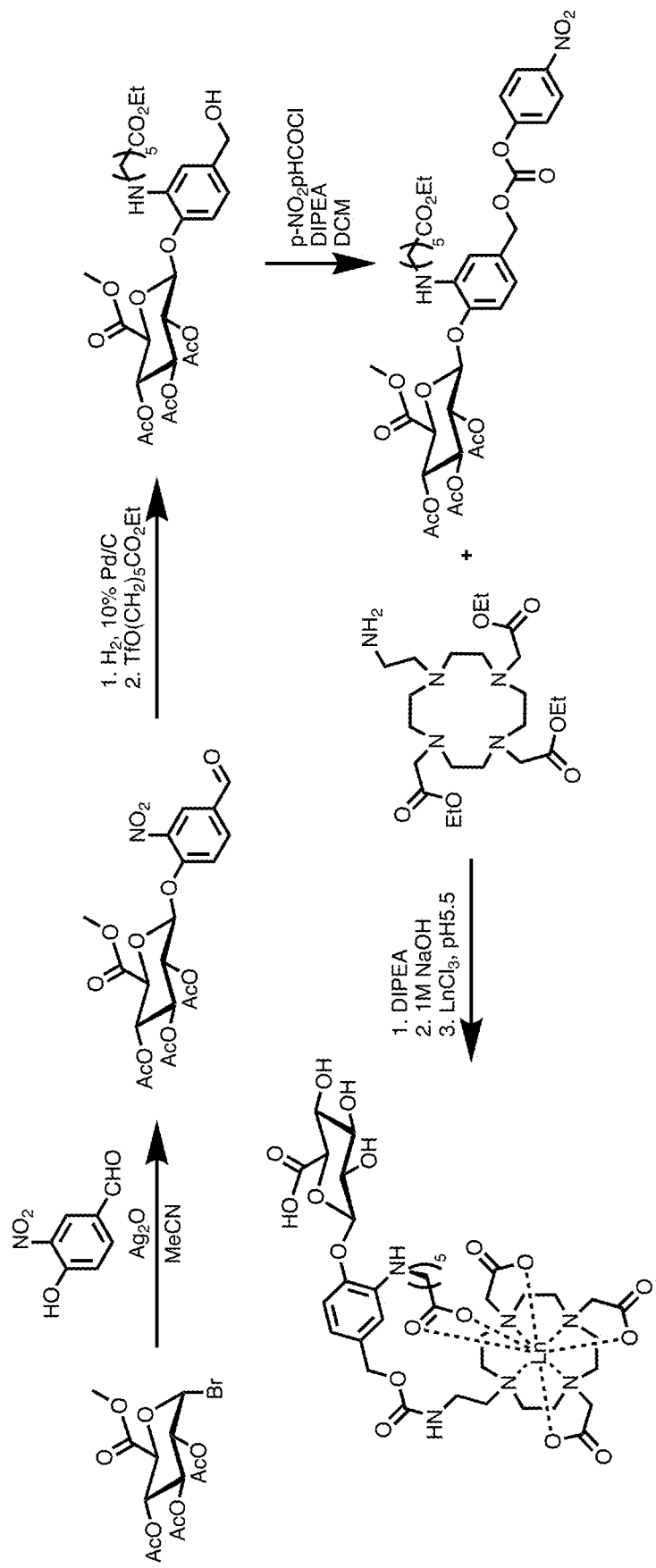

FIG. 9 shows an exemplary synthesis method for a β-gluc responsive MR contrast agent. The use of β-glucuronic acid, rather than galactose, provides specificity for β-glucoronidase for in vivo detection without requiring a new synthesis be devised.

Figure 10:
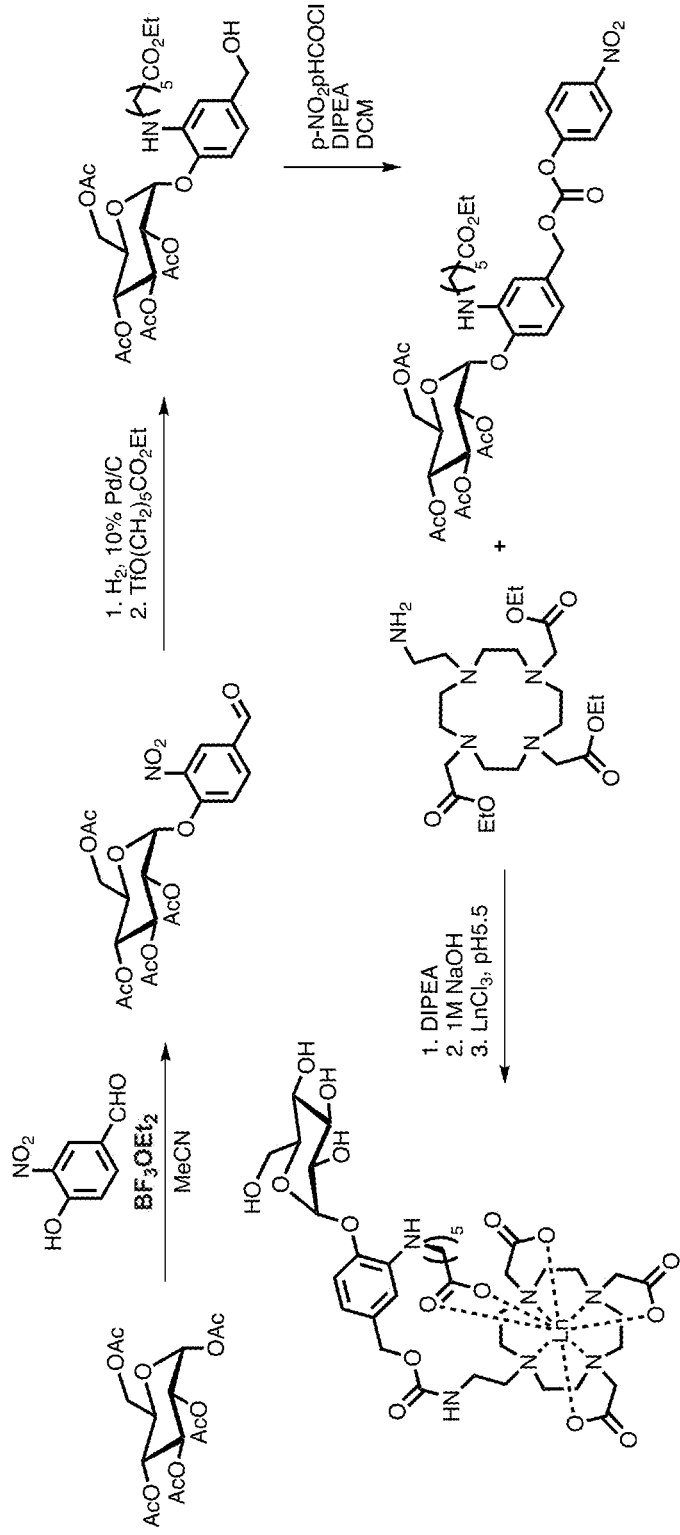

FIG. 10 shows an exemplary synthesis method for a α-gluc responsive MR contrast agent. The use of α-glucose, rather than galactose provides specificity for α-glucosidase for in vivo detection.

Figure 11:
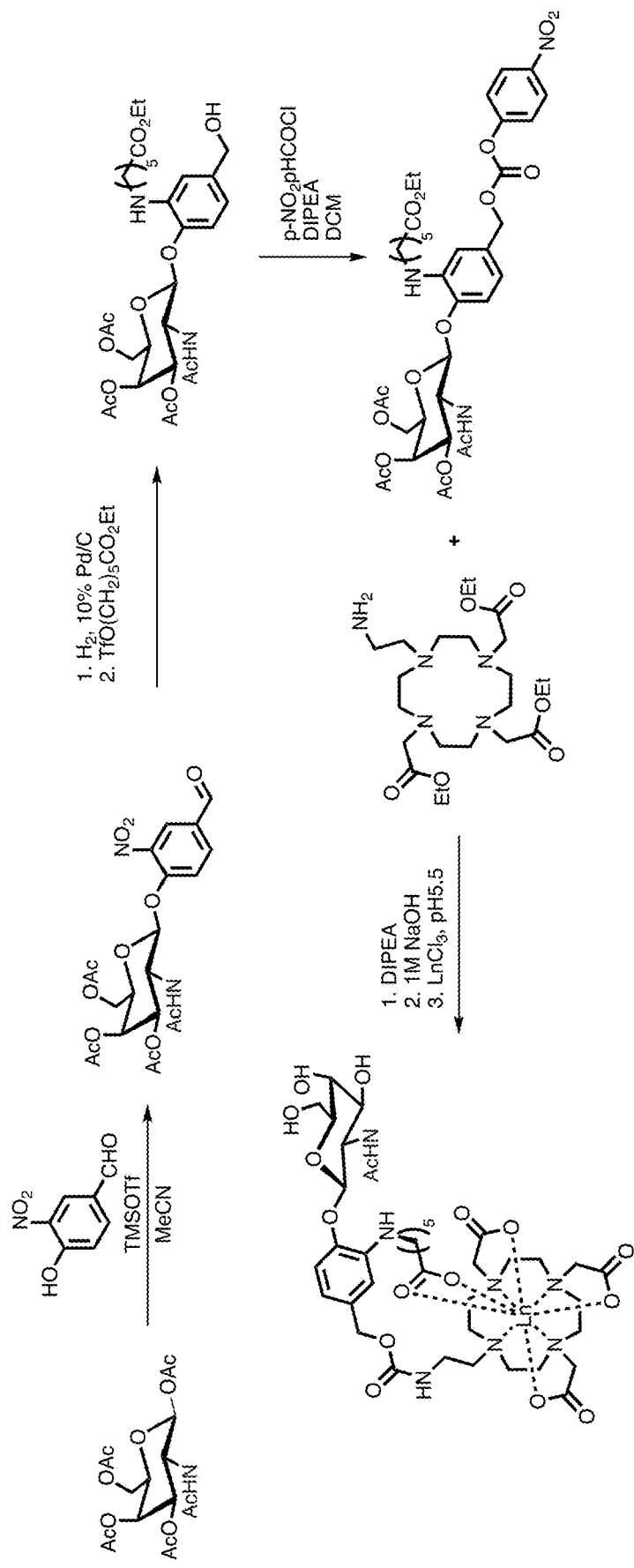

FIG. 11 shows an exemplary synthesis method for a Hex-A responsive MR contrast agent. The use of 2-acetylamino (in blue) 2-deoxy galactose (GalNAc), rather than galactose provides specificity for Hexosaminidase-A for in vivo GM2 detection without requiring a new synthetic scheme.

Figure 12:
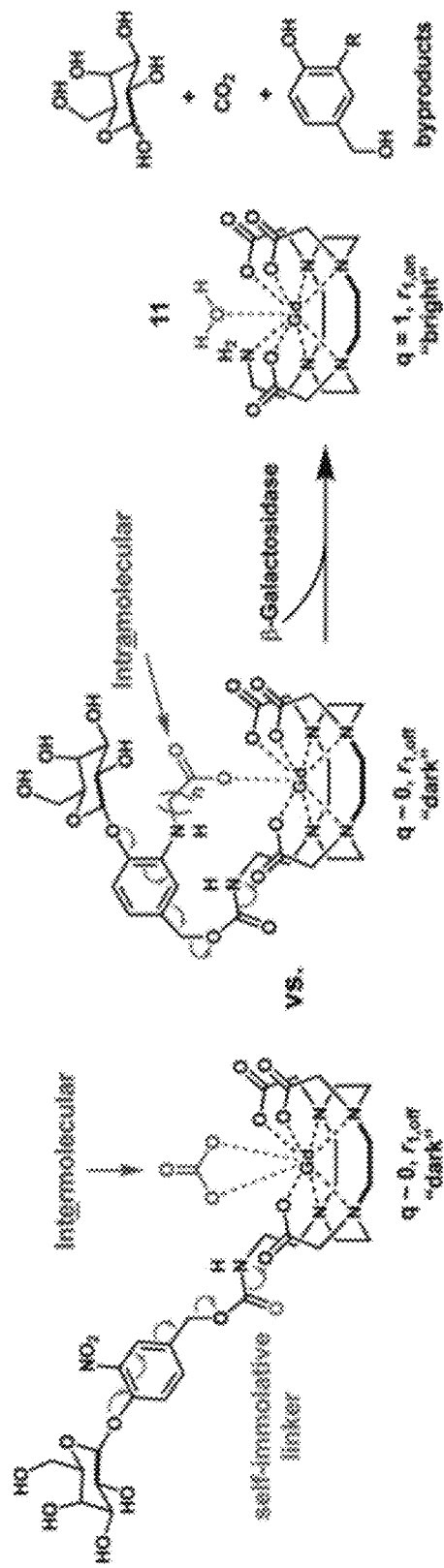

FIG. 12. Inter-versus intramolecular activation of q-modulated MRI contrast agents sensitive to β-gal. The intermolecular design maximizes $CO_3^{2-}$ binding by manipulating the structural isomers. The intramolecular design incorporates a pendant carboxylate ligand where the linker length was varied to maximize coordination. Both designs feature a self-immolative linker that improves activation kinetics. An electron cascade (red arrows) for both designs are initiated by sugar hydrolysis.

Figure 13B:
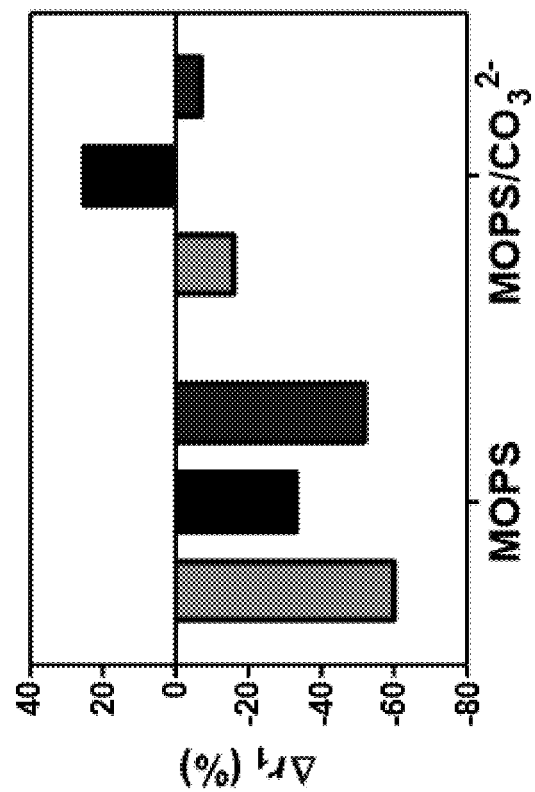
Figure 13A:
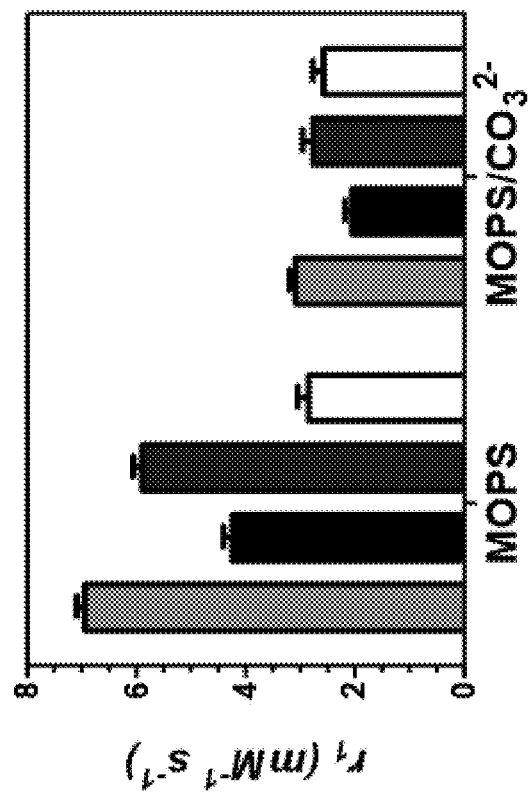

FIG. 13A shows r1 values in MOPS and MOPS/$CO_3^{2-}$ (pH=7.4 and 37° C.) for 5a—ortho (orange), 5b—meta (black), 5c—para (purple), 11 cleaved complex (white). FIG. 13B shows Δr1 values for 5a-c relative to the cleaved complex 11.

Figure 14A:
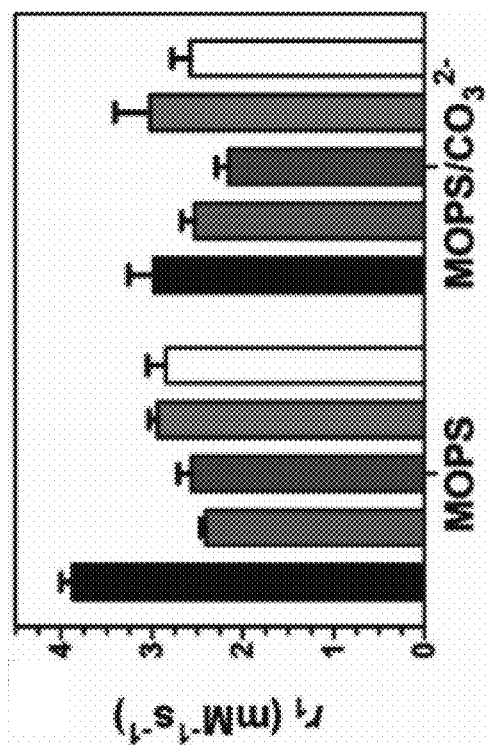
Figure 14B:
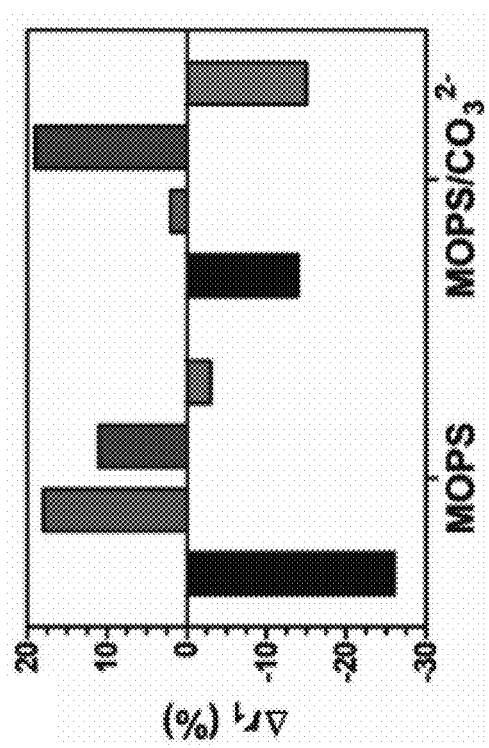

FIG. 14A shows relaxivity values of 10a-2C linker (black), 10b-4C linker (green), 10c-6C linker (blue), 10d-8C linker (red) and 11-cleaved (white) in either MOPS or MOPS/$CO_3^{2-}$ at 37° C. and 1.4 T. FIG. 14B shows r1 values for 10a-d relative to the cleaved control product 11 (see FIG. 12).

Figure 15:
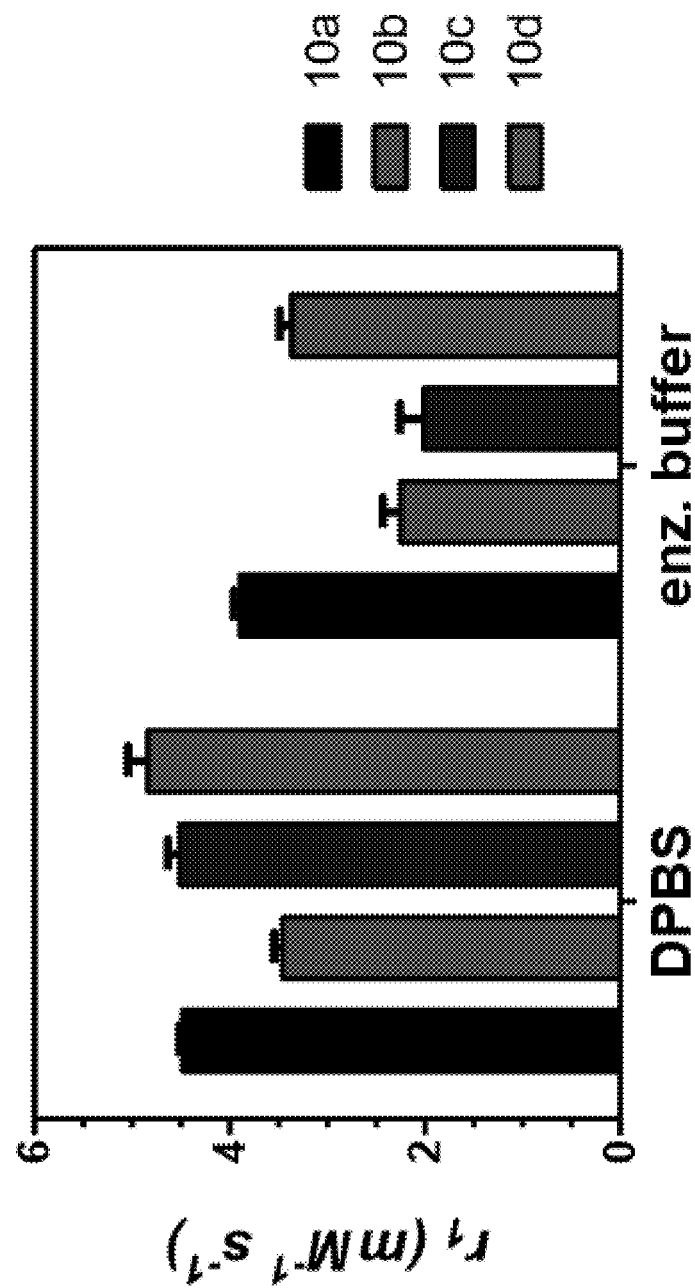

FIG. 15 shows Δr1 values of 10a-d in DPBS pH=7.3 and β-gal enzyme buffer 200 mM sodium phosphate, 100 mM β-mercaptoethanol, 2 mM MgCl2, pH=7.3

Figure 16:
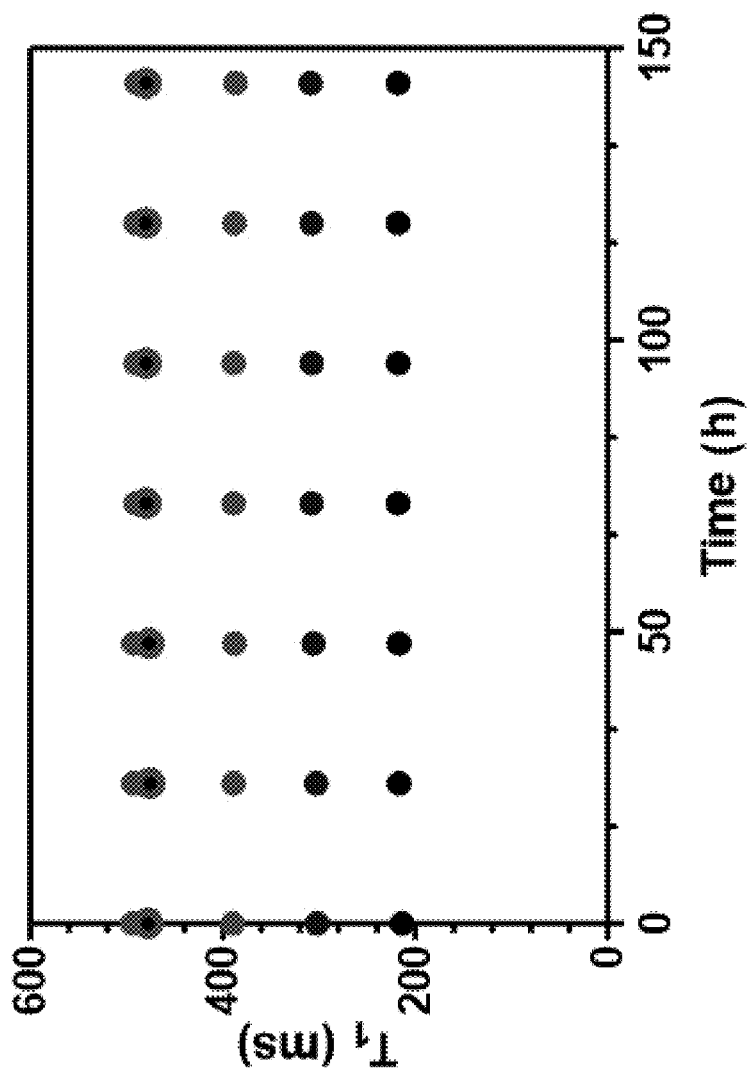

FIG. 16 Complex stability measured by relaxivity. T1 values are 10a-2C linker (black), 10b-4C linker (green), 10c-6C linker (blue), 10d-8C linker (red), and 10d in cell culture media (red circle with black center). No significant change in T1 is observed over 140 hours.

Figure 17A:
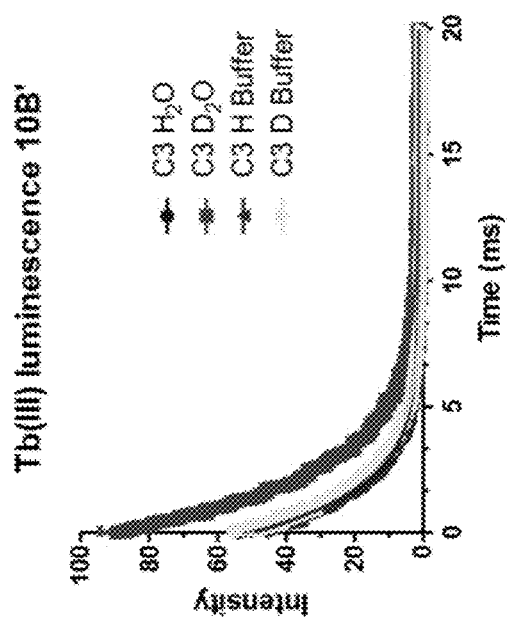
Figure 17B:
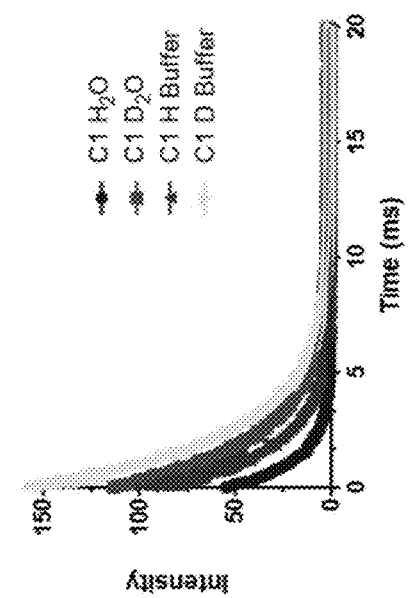

FIG. 17A-17E show Tb(III) luminescent spectra of 10a'-d' and 11 in $H_2O$, $D_2O$, buffer, and deuterated buffer. Spectra for 10b' is shown in FIG. 17A, spectra for 10a' is shown in FIG. 17B, 10c' is shown in FIG. 17C, 10d' is shown in FIG. 17D, and 11 (cleaved) is shown in FIG. 17E.

Figure 18:
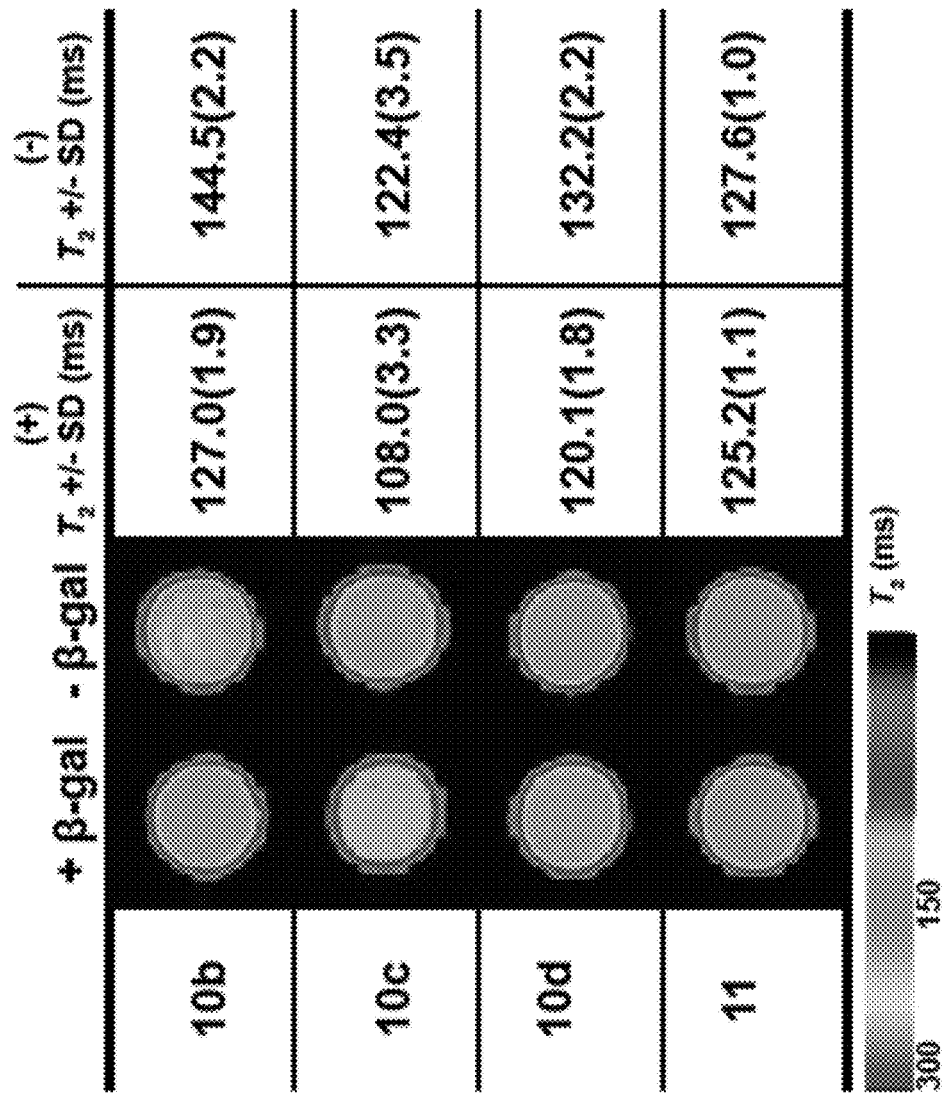

FIG. 18. 7 T, T2-weighted imaging of 10b-d and 11 in the presence and absence of the enzyme β-galactosidase. Measurements are performed after incubation+/−enzyme (24 h) in buffer 200 mM sodium phosphate, 100 mM β-mercaptoethanol, 2 mM MgCl2, pH=7.3.

Figure 19:
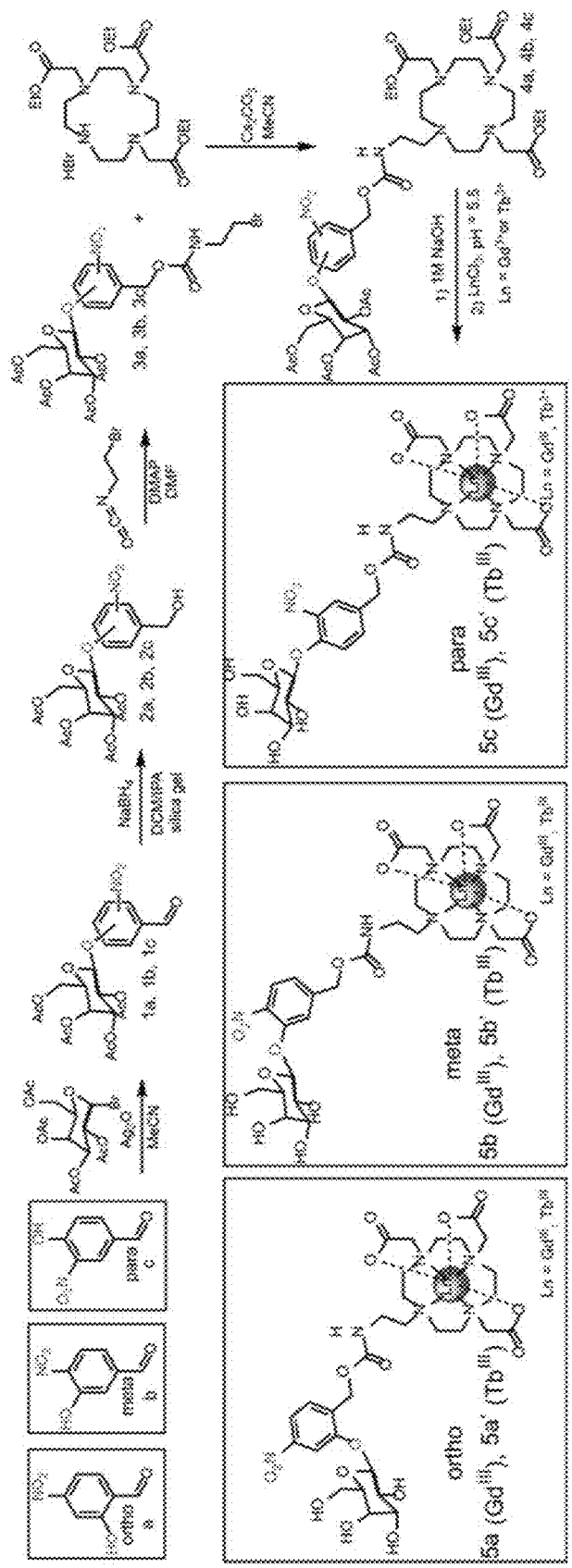

FIG. 19. Synthetic route for three structural CA isomers where the β-galactose substrate is either ortho (5a, 5a'), meta (5b, 5b'), or para (5c, 5c') to the carbamate linkage. The metalated complexes (with either TbCl3 or GdCl3) were obtained via purification by preparative HPLC.

Figure 20:
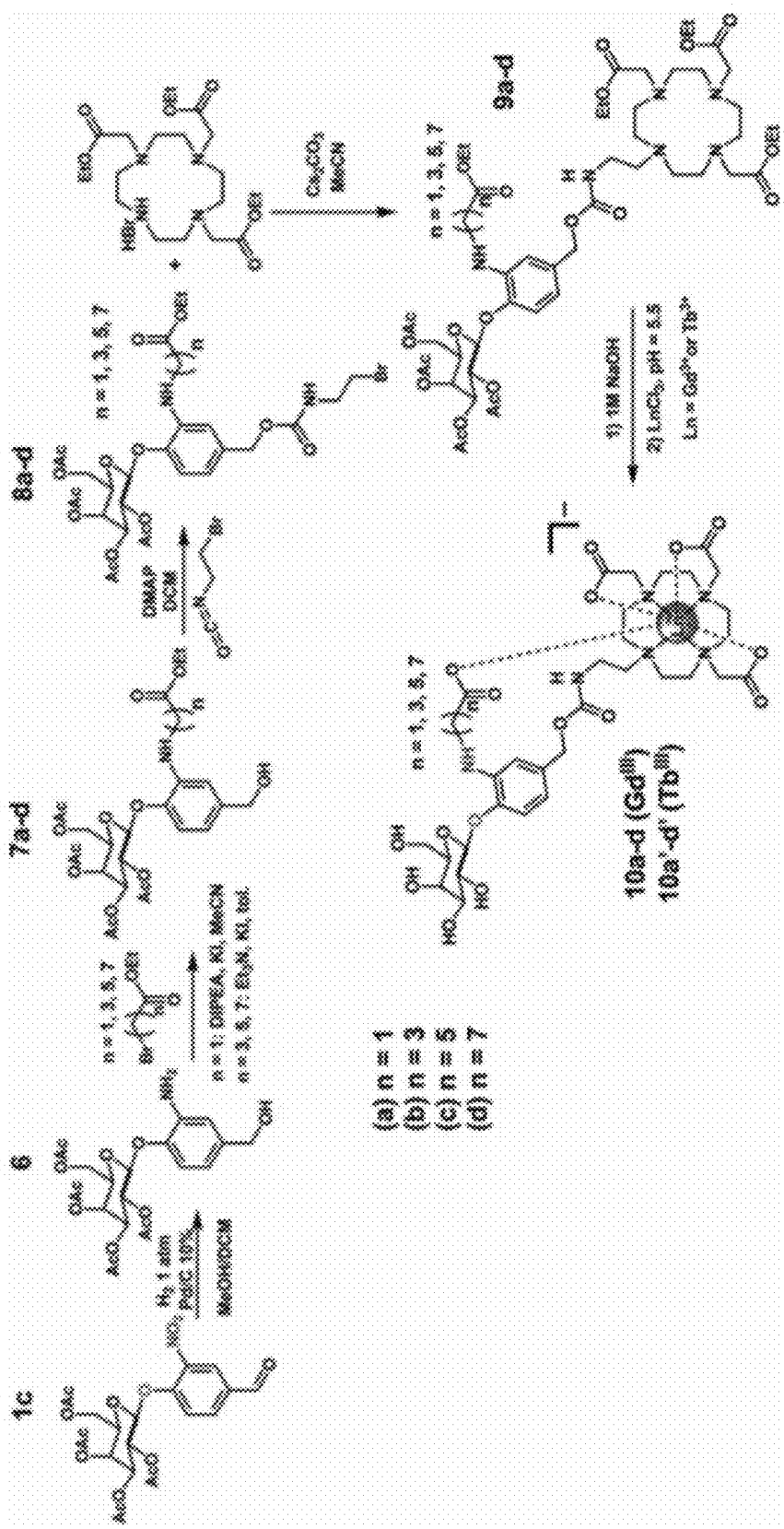

FIG. 20. Synthesis of the intramolecularly coordinated GdIII CAs activated by β-gal. Final metalated complexes (TbCl3 or GdCl3) were obtained via purification by preparative HPLC.

Figure 21:
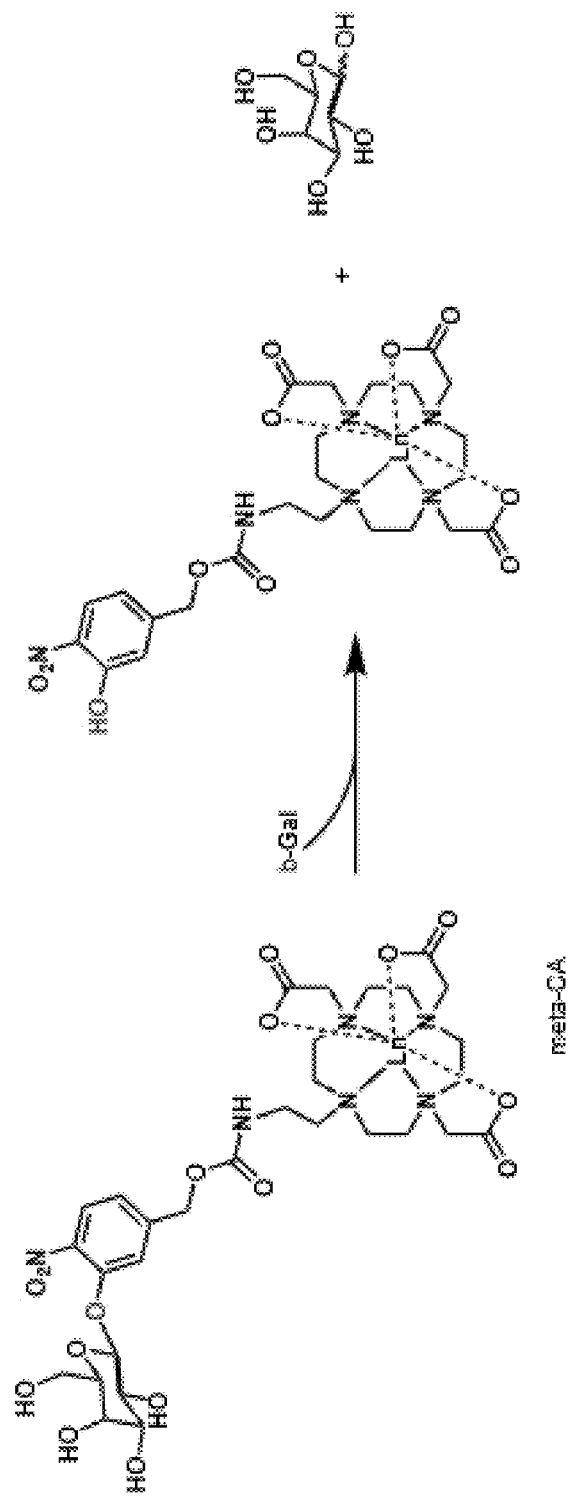

FIG. 21 Enzymatic cleavage of the meta isomer 5b in the presence of β-gal. The phenoxide must be para to the carbamate for full immolation of the linker.

Figure 22:
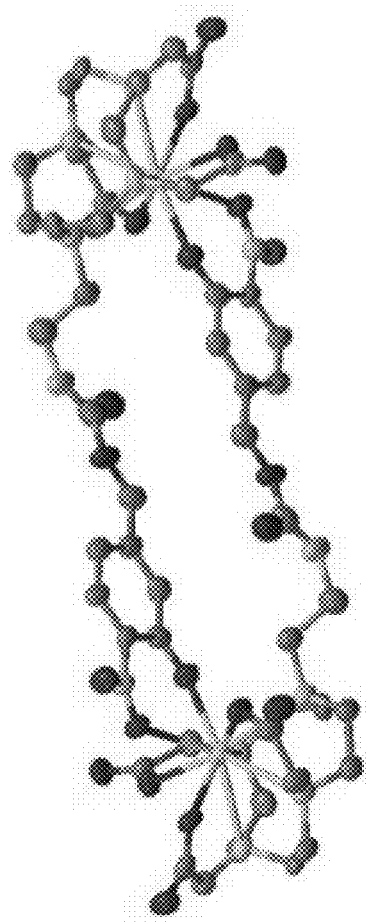

FIG. 22. X-Ray crystal structure of the "partially activated" complex 5b. The atoms are labeled as follows C black, N blue, 0 red, and Gd turquoise. H atoms have been omitted for clarity.

Figure 23:
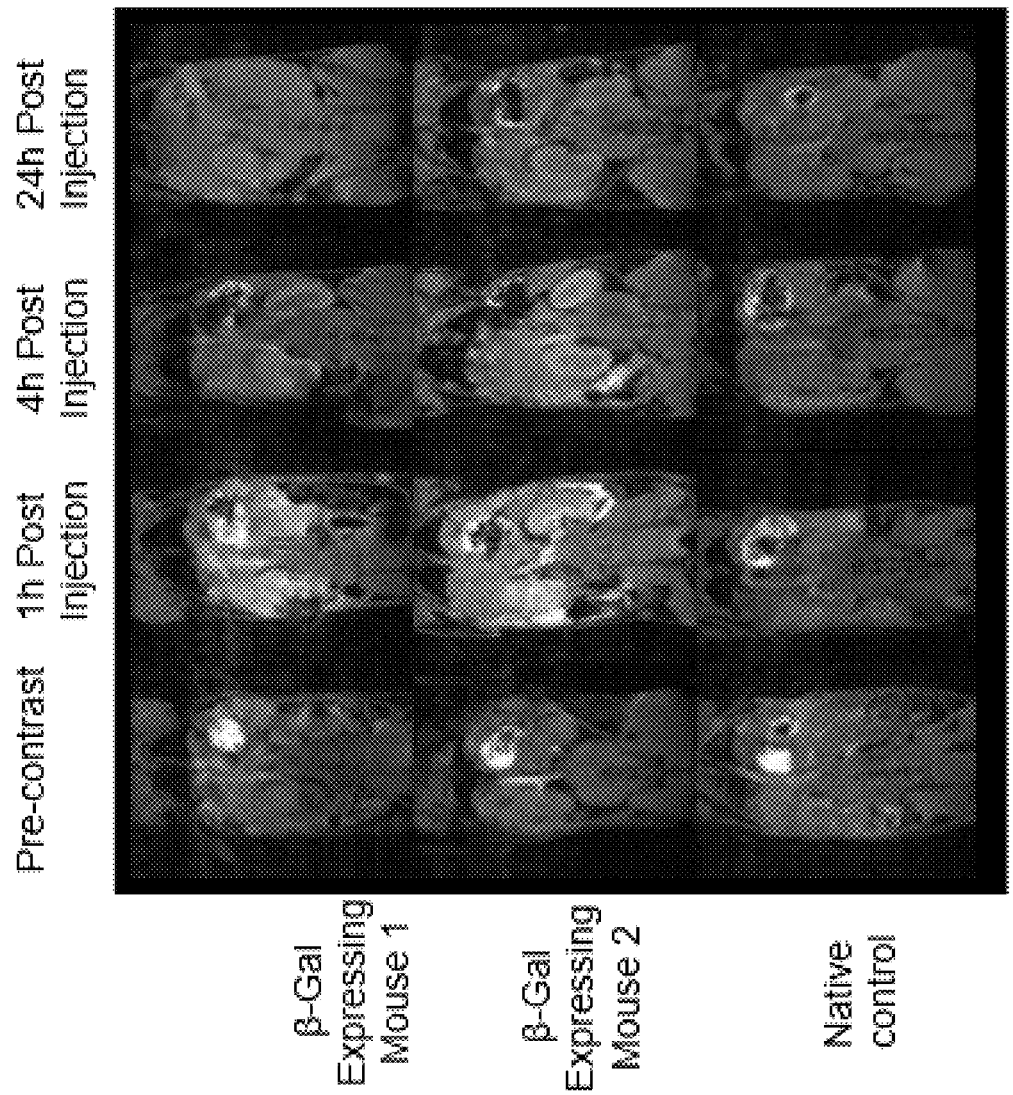

FIG. 23. Transgenic mice constitutively expressing LacZ (rows 1 and 2: Jackson Labs), and control mice (row 3) were injected intra-peritoneally (IP 200 microliters of 40 mm β-gal agent 8 mmols) with a β-galactosidase responsive agent where n=5. Coronal MR images (9.4 T) were acquired at preinjection, and 1, 4, and 24 hours post injection using a T1 weighted FLASH sequence. Scan parameters: TR/TE/alpha=100 ms/2.2 ms/45 deg, 192192 matrix, 0.234 mm inplane image resolution, and 1 mm slice thickness. Signal enhancement was noted in the liver and kidneys of the LacZ-expressing mice at 1 h post injection, returning to baseline by 24 hrs. This signal enhancement was minimal for the control mice (row 3) except for mild enhancement in the kidneys post injections.

Figure 24:
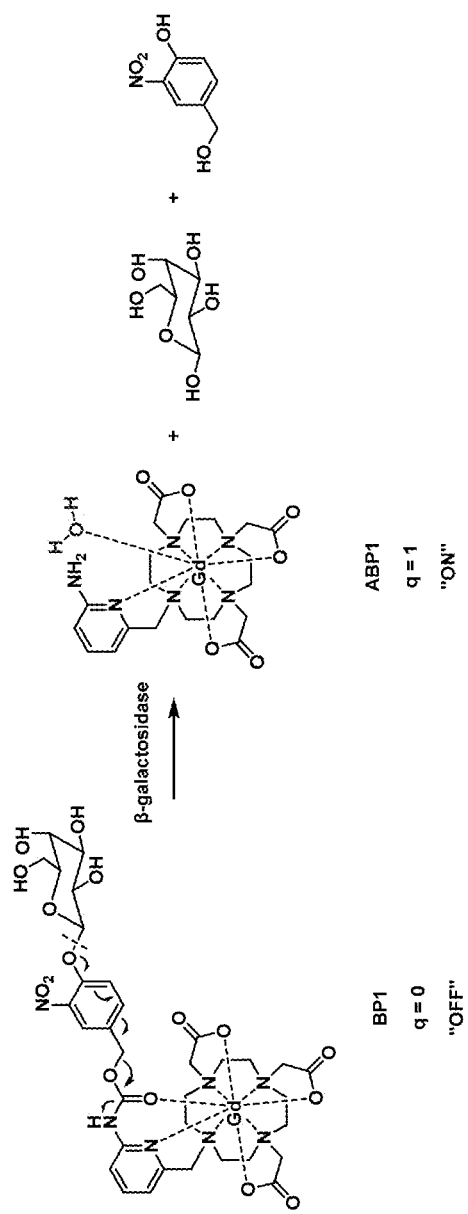

FIG. 24 shows the proposed β-gal sensing mechanism of BP1. Prior to activation, BP1 has a q of 1 hence low MR signal. In the presence of β-gal, the sugar moiety is enzymatically removed, and q increases to 1 enhancing the MR signals.

Figure 25:
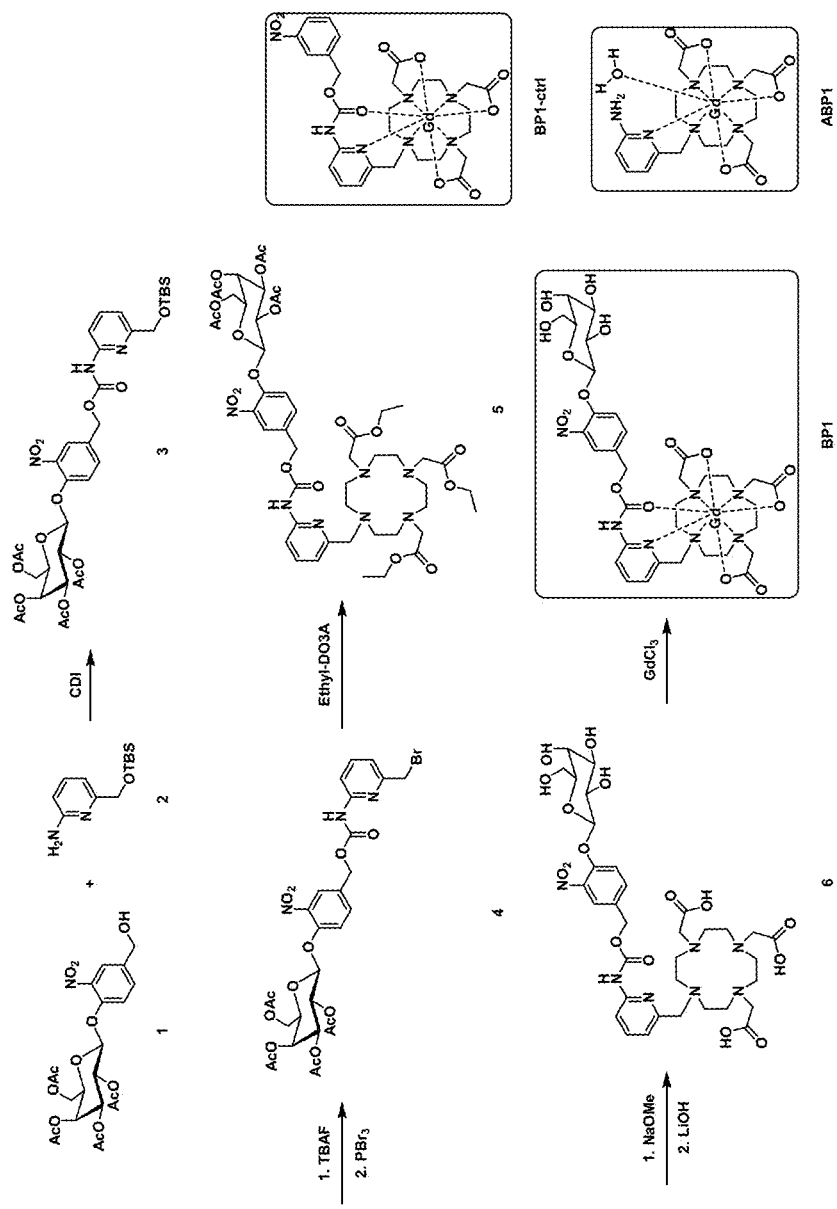

FIG. 25 shows the synthesis and structure of BP1, ABP1 and BP1-ctrl. BP1 is β-gal responsive GBCA that upon activation transforms to ABP1. BP1-ctrl is the control probe that is not responsive to β-gal as it does not contain a cleavable sugar moiety.

Figures 26A, 26B:
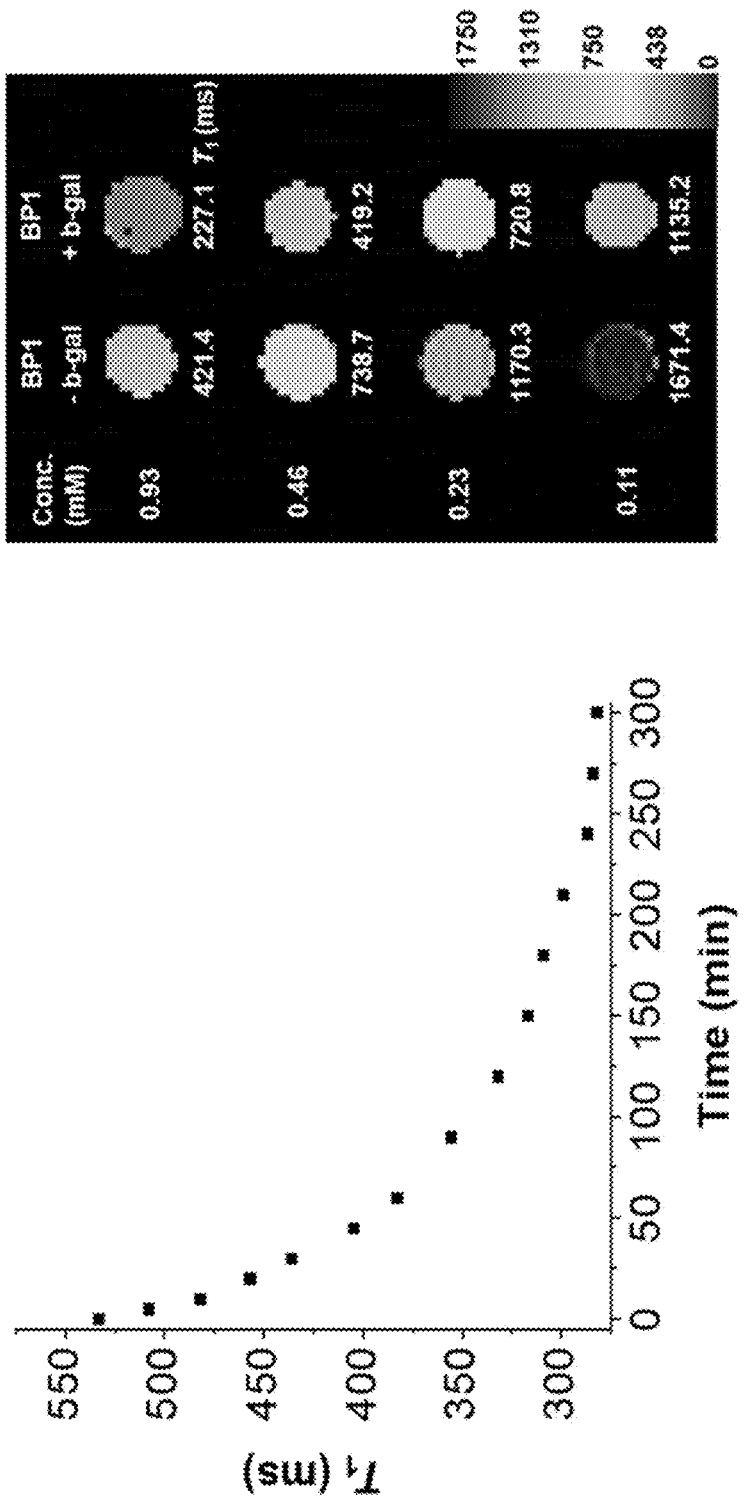

FIG. 26A shows time-dependent $T_1$ decrease of β-gal buffer solution (pH 6.6) in the presence of BP1 (1 mM) and β-gal (8 μg/mL) measured at 1.41 T. FIG. 26B shows $T_1$-weighted MR images acquired at 7 T of solution phantom with BP1 (0.93, 0.46, 0.23, 0.11 mM) incubated with β-gal overnight.

Figure 27C:
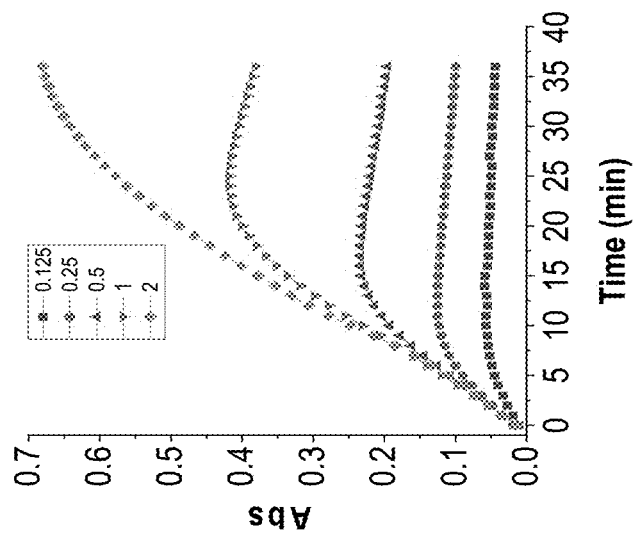
Figure 27B:
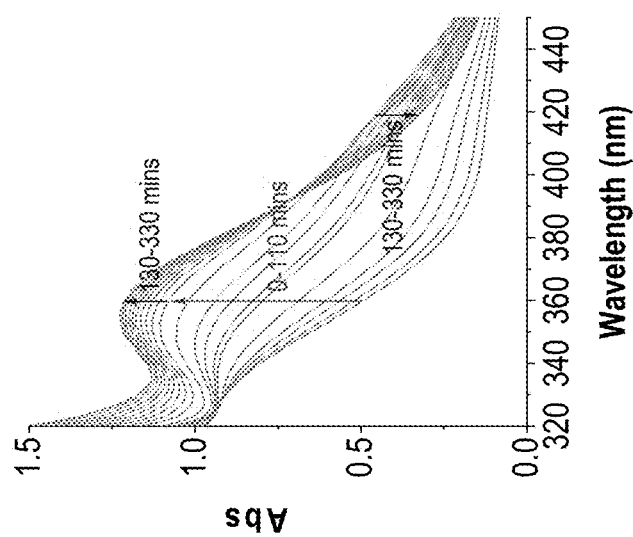
Figure 27A:
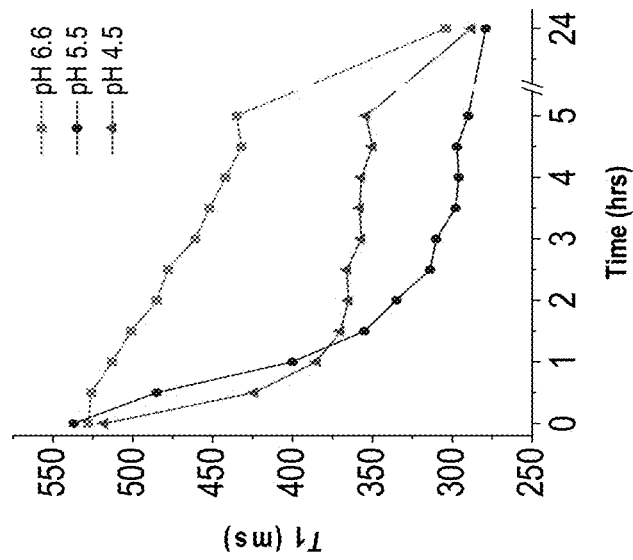

FIG. 27A shows time-dependent absorption at 340 nm of BP1 (different concentrations in mM) in the presence of β-gal (1 μg/mL) Even at the highest 2 mM concentration of BP1, the activation was completed within 35 mins, seemingly contradicting the relaxometry results which required 5 hours for full activation. FIG. 27B shows UV-Vis profile of BP1 (1 mM) incubated with β-gal (1 μg/mL). The initial 0-110 mins (red arrow) features a relatively fast hyperchromic shift in the UV region, consistent with the formation of intermediate A. The second sets of changes (blue arrow) occurred after 2 hrs, featuring a slow hypsochromic shift, indicating the formation of a new species most likely the fully activated product ABP1. FIG. 27C shows relaxometry studies of BP1 (1 mM) incubated with β-gal (1 μg/mL) at different pHs.

Figure 28:
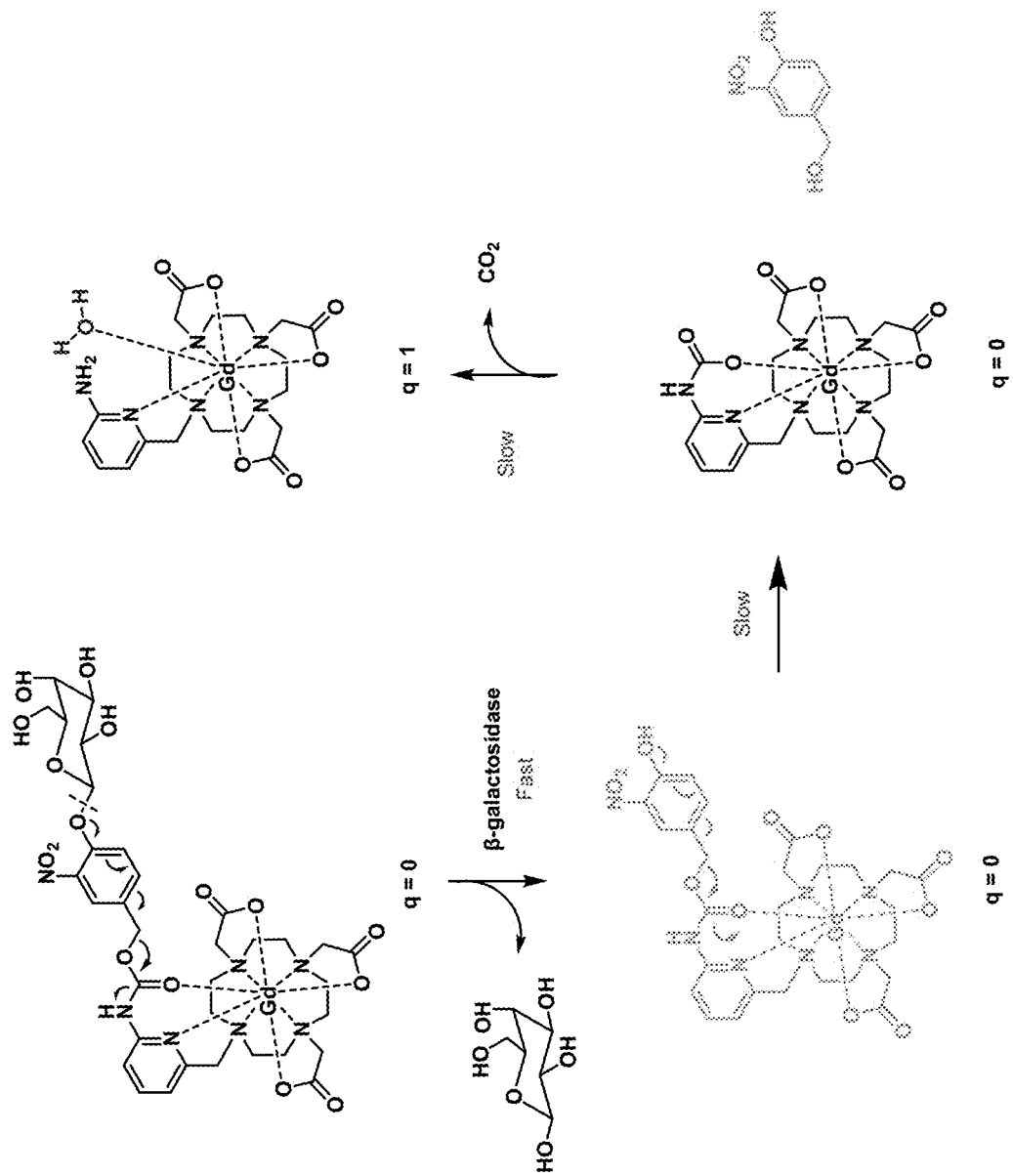

FIG. 28 shows the proposed activation mechanism of BP1. The first sugar-cleavage step is the fast step as demonstrated by the BP1 kinetics studies. The breakdown of intermediate A or B is the slow step, which would explain why absorption at 340 nm was seen shortly after the assay was initiated, while the relativity change took longer, since both A and B has q=0 just like BP1.

Figure 29:
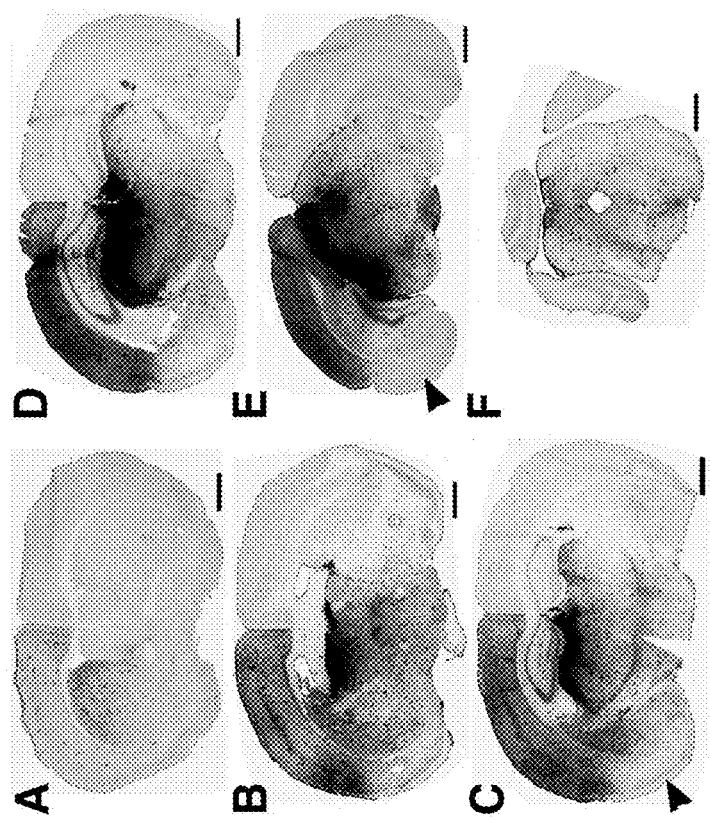
Figure 30A:
Figure 30B:
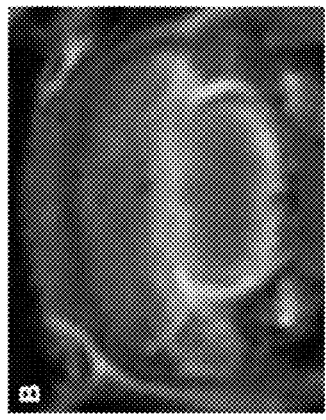
Figure 30C:
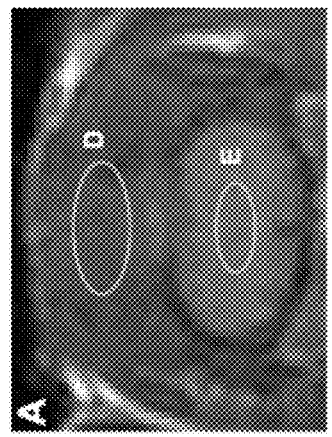
Figure 30D:
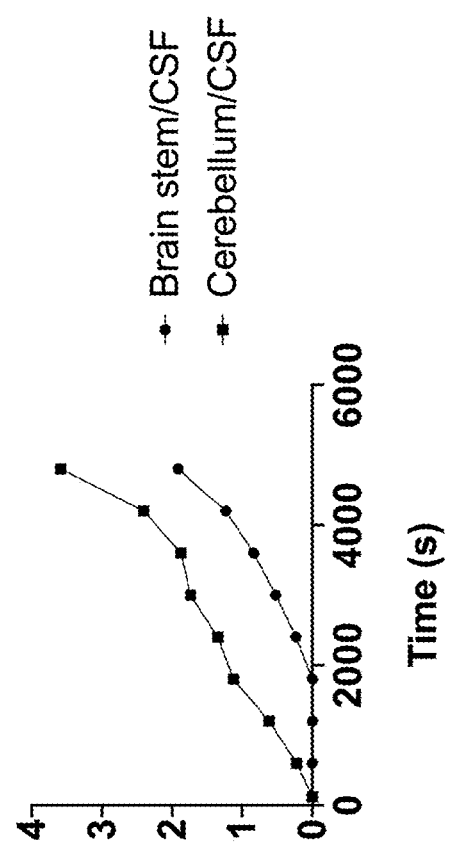

FIG. 29 shows β-gal distribution (blue) in mouse brain, one month after intracranial AAV gene therapy. scale bar: 1 mm FIG. 30A-D shows contrast agent levels following intrathecal injection of β-gal responsive contrast agent. AAV treated β-gal$^{-/-}$ mouse shows signal enhancement in cerebral spinal fluid (CSF) and parenchyma (FIG. 30A-30C) Pre contrast injection; ROIs on cerebellum (circle D in FIG. 30A) and brain stem (circle E in 30A). FIG. 30B shows contrast immediately after contrast injection. Enhancement of CSF, edges of brain stem and base of cerebellum is evident. FIG. 30C shows contrast 90 min after contrast injection. Arrows point to the enhanced areas of CSF between brain stem and cerebellum. The brain stem and cerebellum are fully enhanced. The plot shown in FIG. 30D demonstrates the increasing ratio of parenchyma over CSF signal, which indicates penetration of contrast agent from CSF to parenchyma and its subsequent activation.

FIG. 31A-31D show the kinetics of signal enhancement within the parenchyma. Representative brain MR images of an AAV treated β-gal$^{-/-}$ mouse are shown pre-contrast in FIG. 31A. FIG. 31B shows a post-contrast image showing areas (D-F) where signal changes were quantified over time. Note that ventral aspect of the brain with the greatest exposure to CSF shows the greatest enhancement (up to 70%) which reaches a plateau after 40 min. FIG. 31C shows a heat map of signal enhancement. FIG. 31D shows a plot of signal enhancement over time.

FIG. 32A-D show activation of β-gal responsive contrast agent in the ventral thalamus. Signal enhancement in ventral region of thalamus is shown 90 min following contrast injection in (FIG. 32A) AAV treated β-gal$^{-/-}$, (FIG. 32B) WT and (FIG. 32C) β-gal$^{-/-}$ mice. FIG. 32D shows a plot illustrating the percentage of signal enhancement over time.

Figures 33A, 33B:
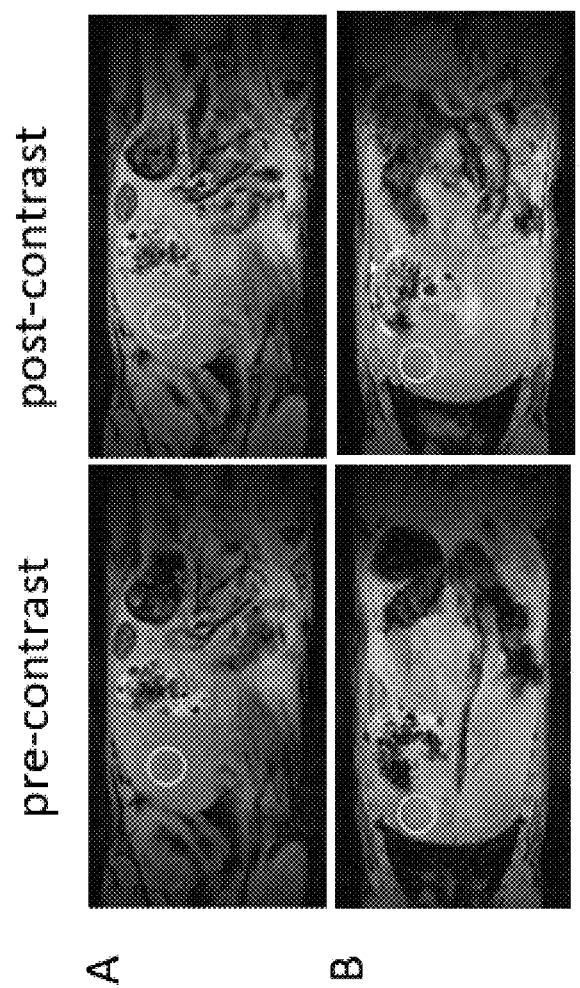
Figure 33C:
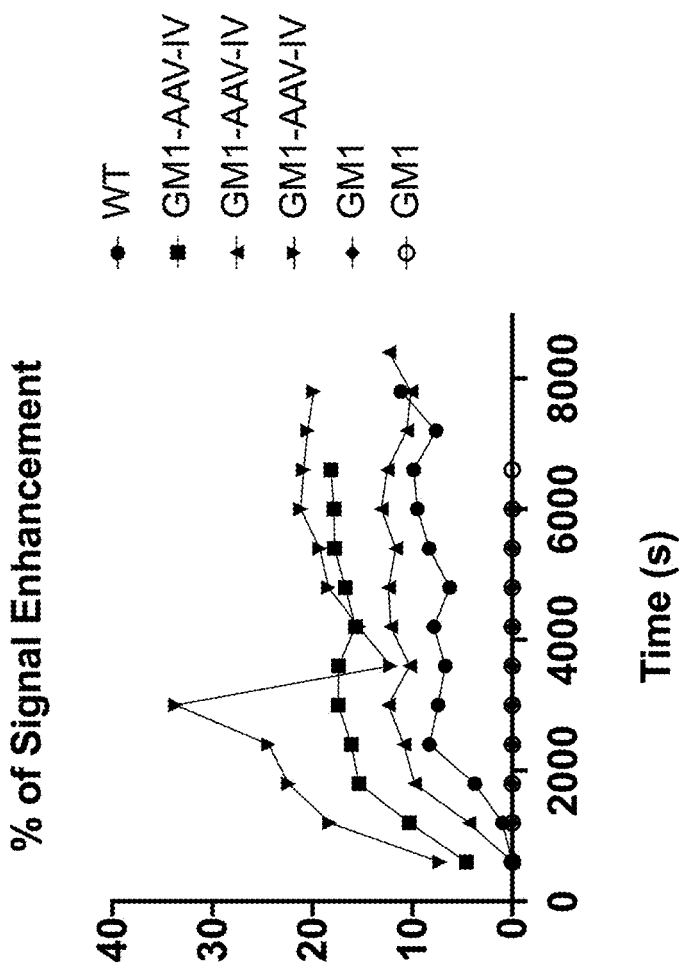
Figure 33D:
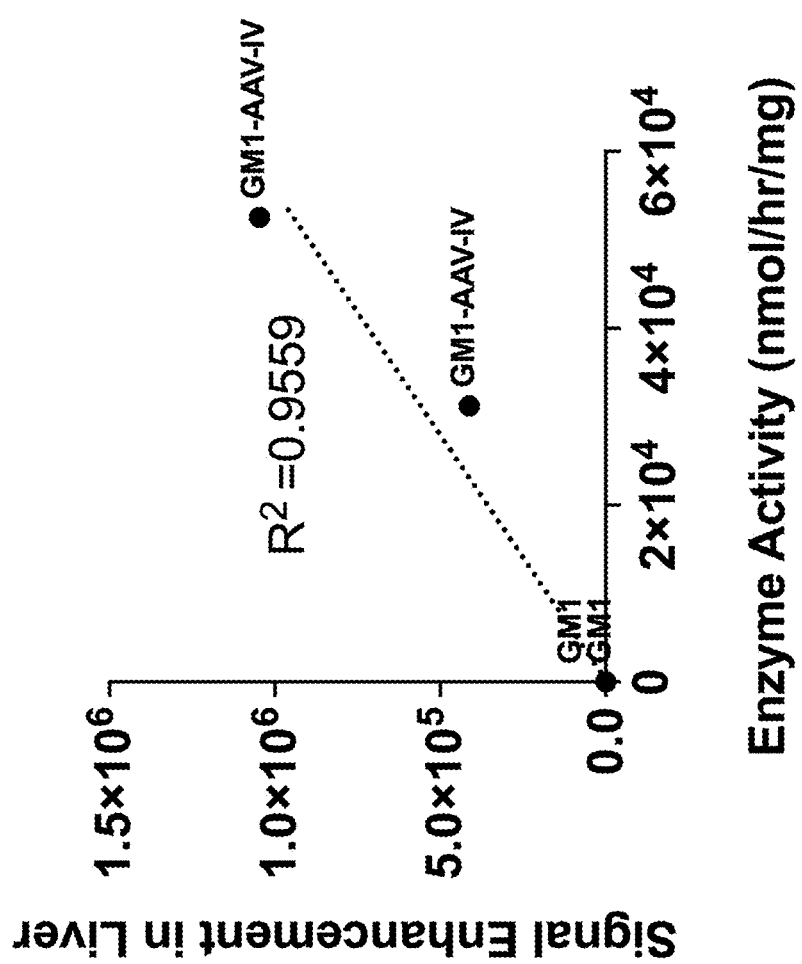

FIG. 33A-D show activation of β-gal responsive contrast agent following intraperitoneal contrast delivery. Differential activation of contrast agent in liver of (FIG. 33AA) AAV treated β-gal$^{-/-}$ mouse vs. (FIG. 33B) β-gal$^{-/-}$ mouse. FIG. 33C shows that signal enhancement of liver reaches a plateau after 40 to 50 min of contrast injection (up to 20%). FIG. 33D shows correlation of MR signal enhancement with β-gal enzyme assay signal ($R^2$=0.95).

Figure 34A:
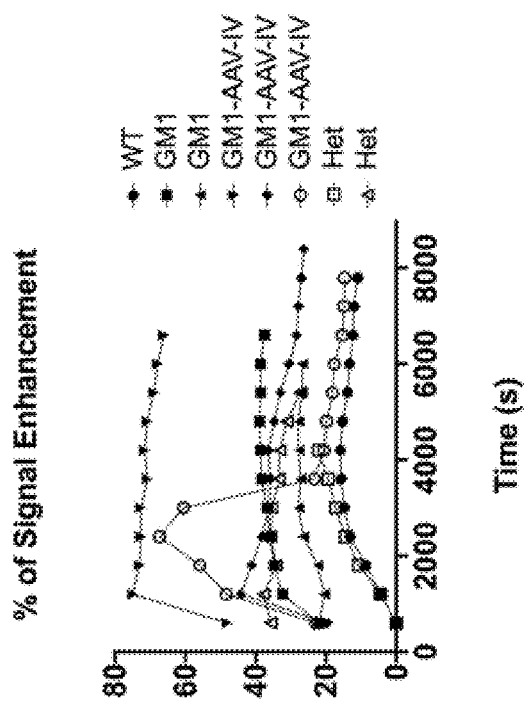
Figure 34B:
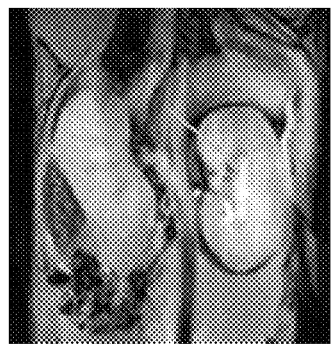
Figure 34C:

FIG. 34A-C show activation of contrast agent in the kidney. Representative kidney images of an AAV treated β-gal$^{-/-}$ mouse. (FIG. 34A) pre-contrast. (FIG. 34B) post-contrast. FIG. 34C is a plot demonstrating that signal enhancement is present in kidney of all groups of mice.

Figure 35:
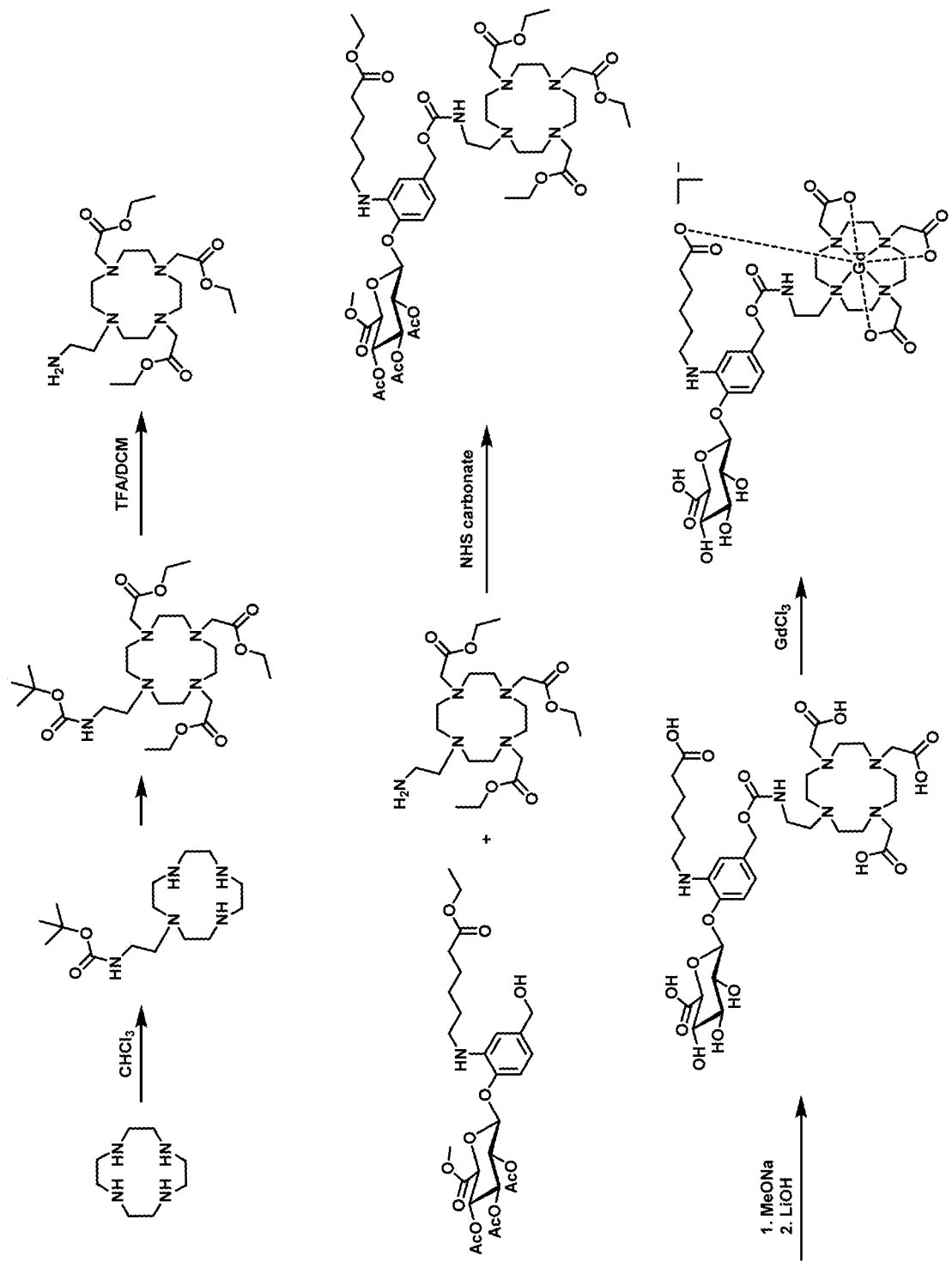

FIG. 35 shows representative methods for synthesis of a β-glucosidase responsive probe.

Figure 36:
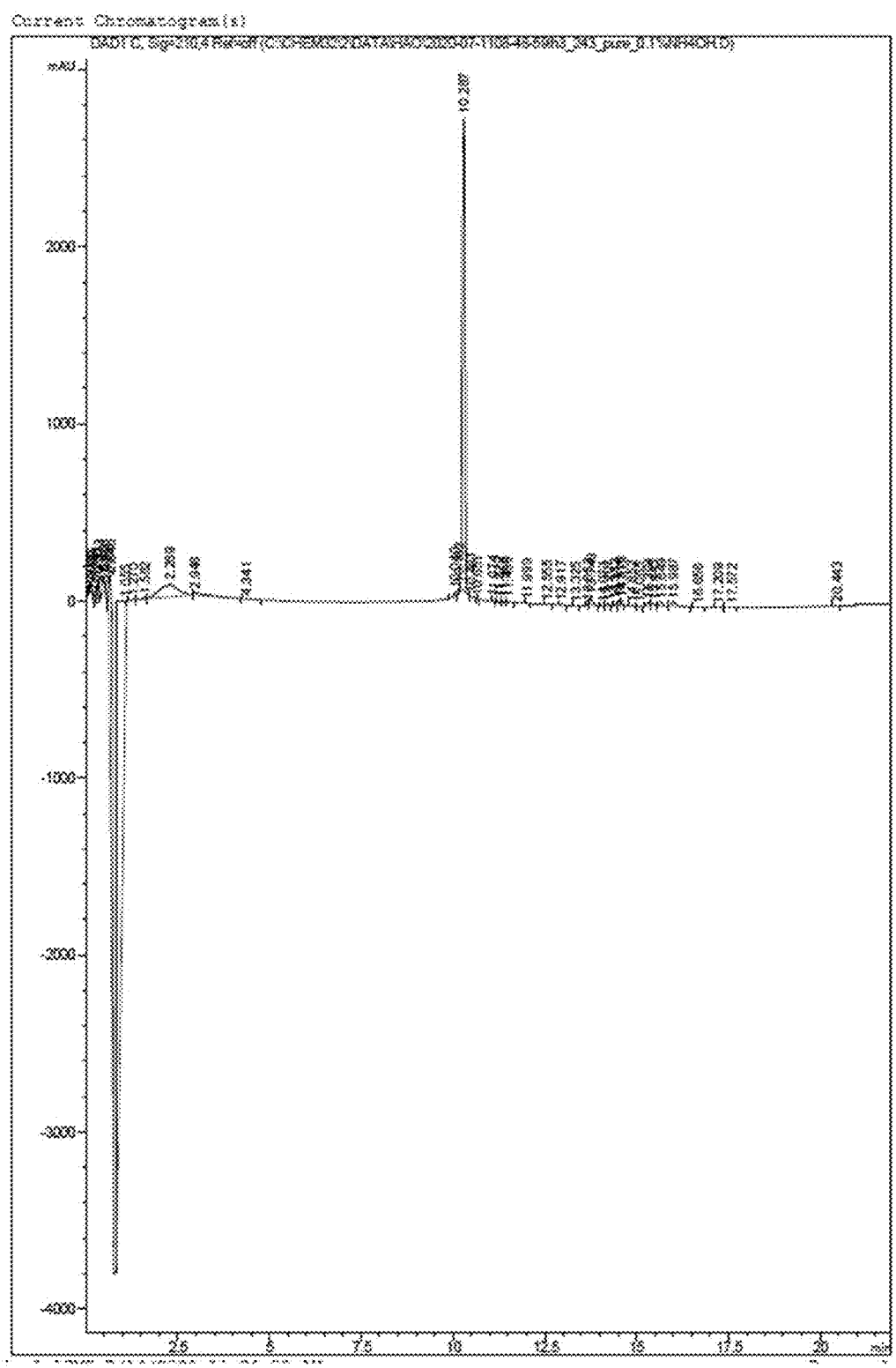

FIG. 36 shows HPLC results from the β-glucosidase responsive probe synthesized as described in FIG. 35.

Figure 37:
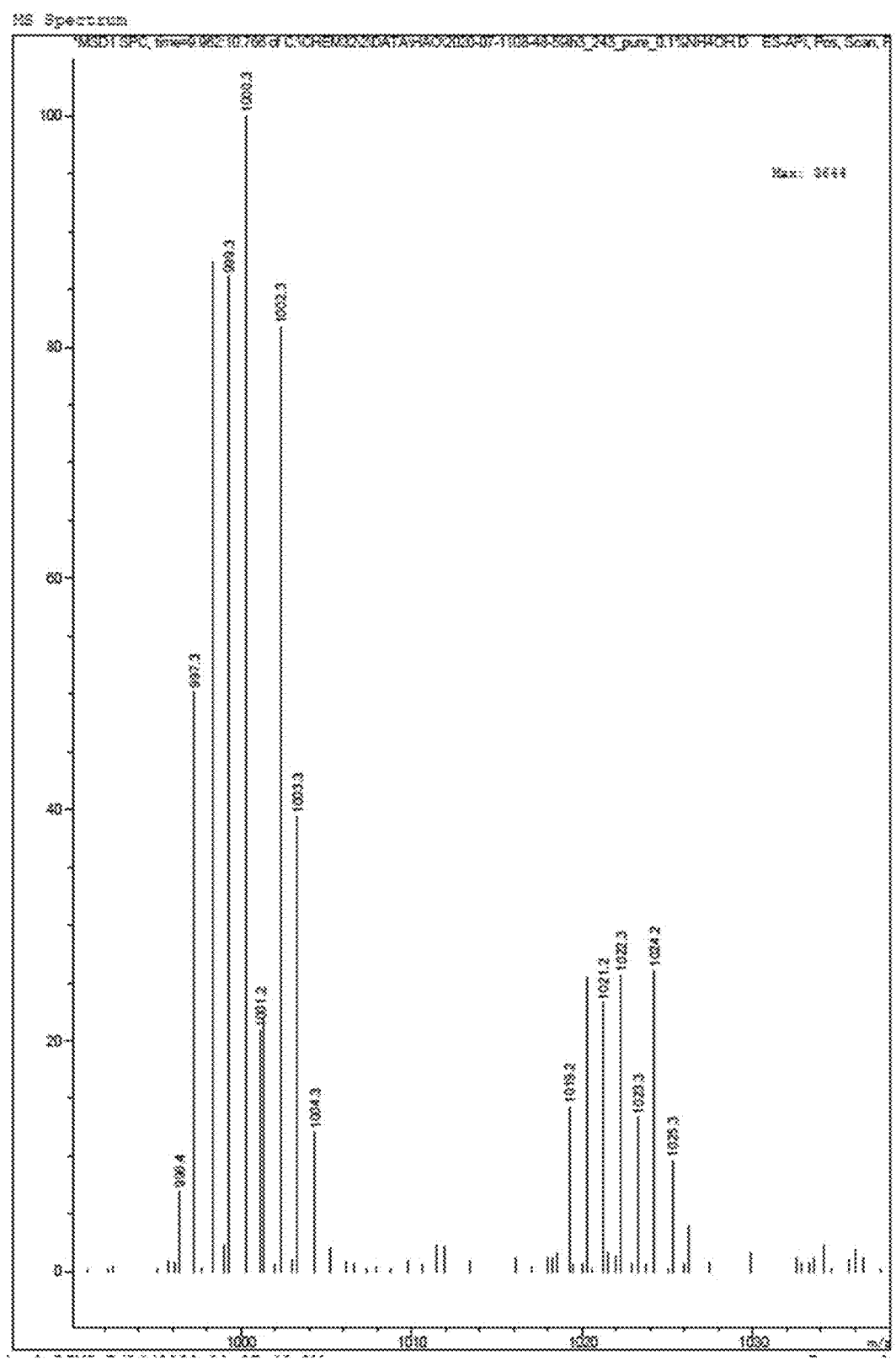

FIG. 37 shows the exact mass for the probe.

Figure 38:
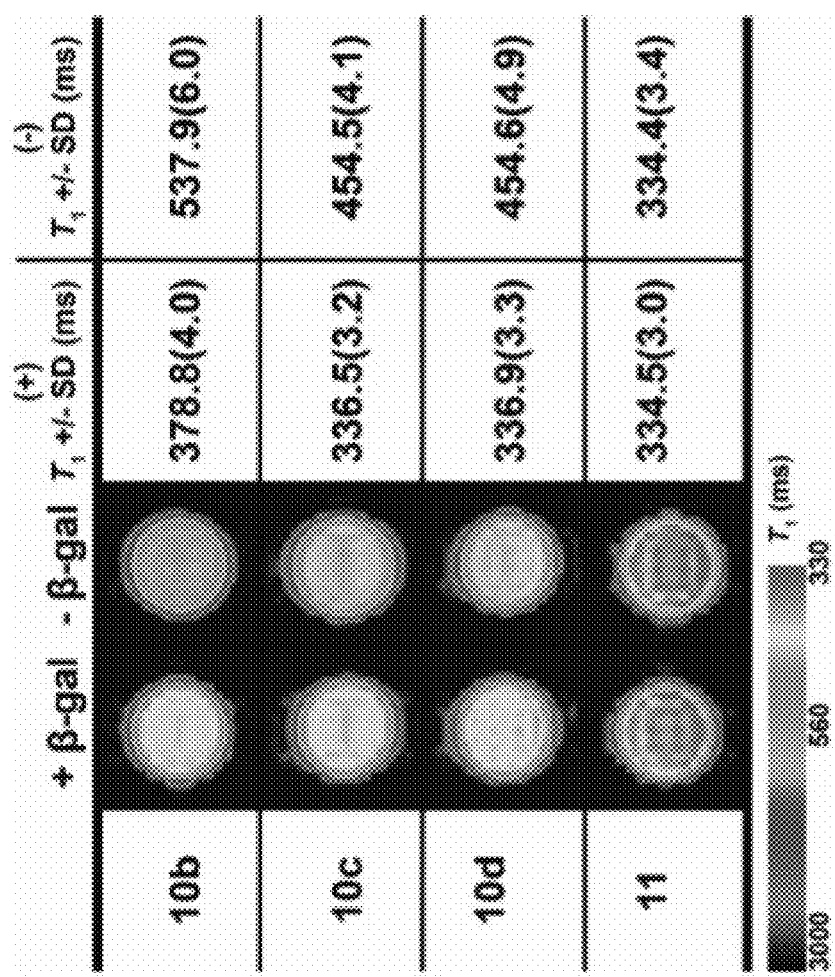

FIG. 38. MR solution phantoms of 10b, 10c, 10d, and 11+/β-gal enzyme at 7 T. A representative slice is shown and the T1 values are calculated from the average of 5 independent slices. Standard deviations are reported in parenthesis. Images were acquired at ambient temperature. +b-gal samples were incubated with 26.1 UmL$^{-1}$ of enzyme in assay buffer for 24 hours.

FIG. 39A, FIG. 39B, and FIG. 39C are tables showing exemplary lysosomal storage diseases, along with the defective enzyme associated with the same.

Figure 40:
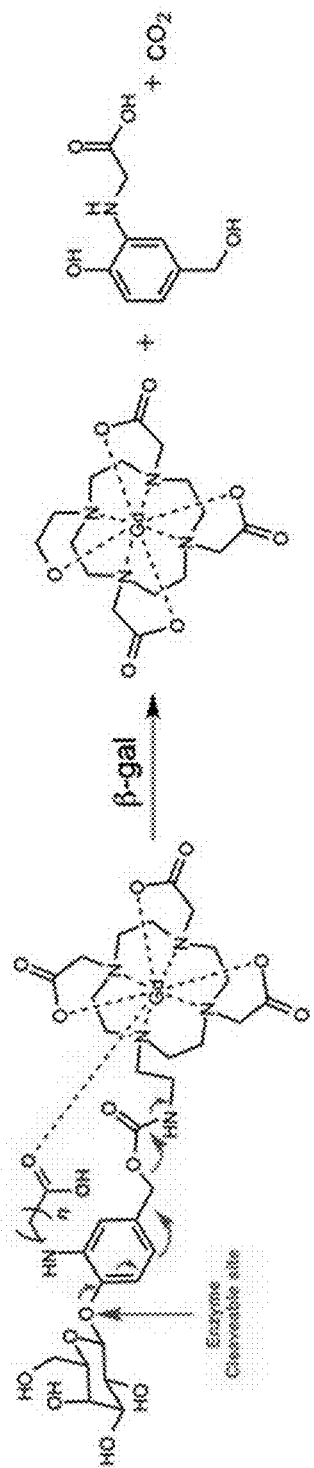
Figures 41A, 41B, 41C, 41D, 41E, 41F:
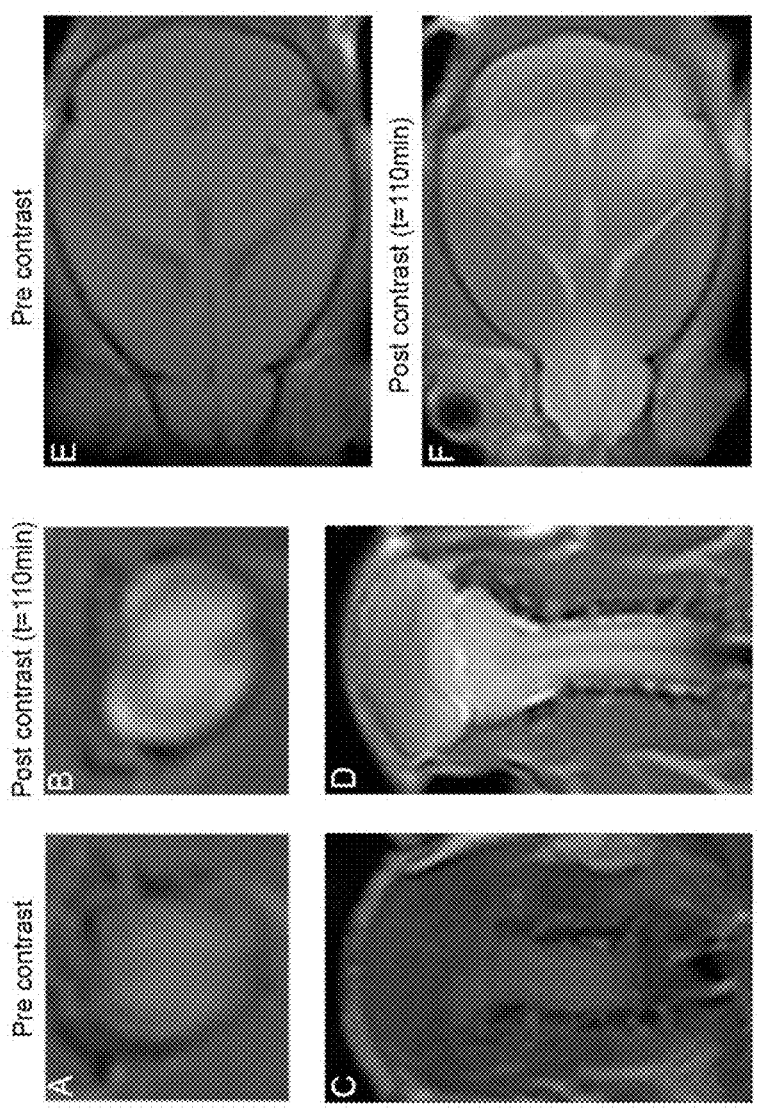

FIG. 40. Exemplary self-immolative MR agents incorporating a coordinating carboxylate (blue, where n=5). Gd(III) coordination by this functionality effectively prohibits water access to Gd(III) creating an inactive, or dark agent by MR imaging. Hydrolysis of the glycoside by βgal results in an electron cascade (red) that provides an open coordination site for water to bind to Gd(III). There is a 90% increase in the observed relativity post enzyme cleavage.

FIG. 41A-F. Representative MR images showing enhancement of the lysosomal βgal activated MRI probe in the spinal cord (A,B) and hindbrain cervical cord (C,D). There is strong enhancement of grey matter and surrounding CSF after intrathecal administration. Coronal image of mouse brain illustrating global enhancement throughout the brain parenchyma and CSF at t=110 min (E,F).

Figures 42A, 42B, 42C, 42D, 42E:
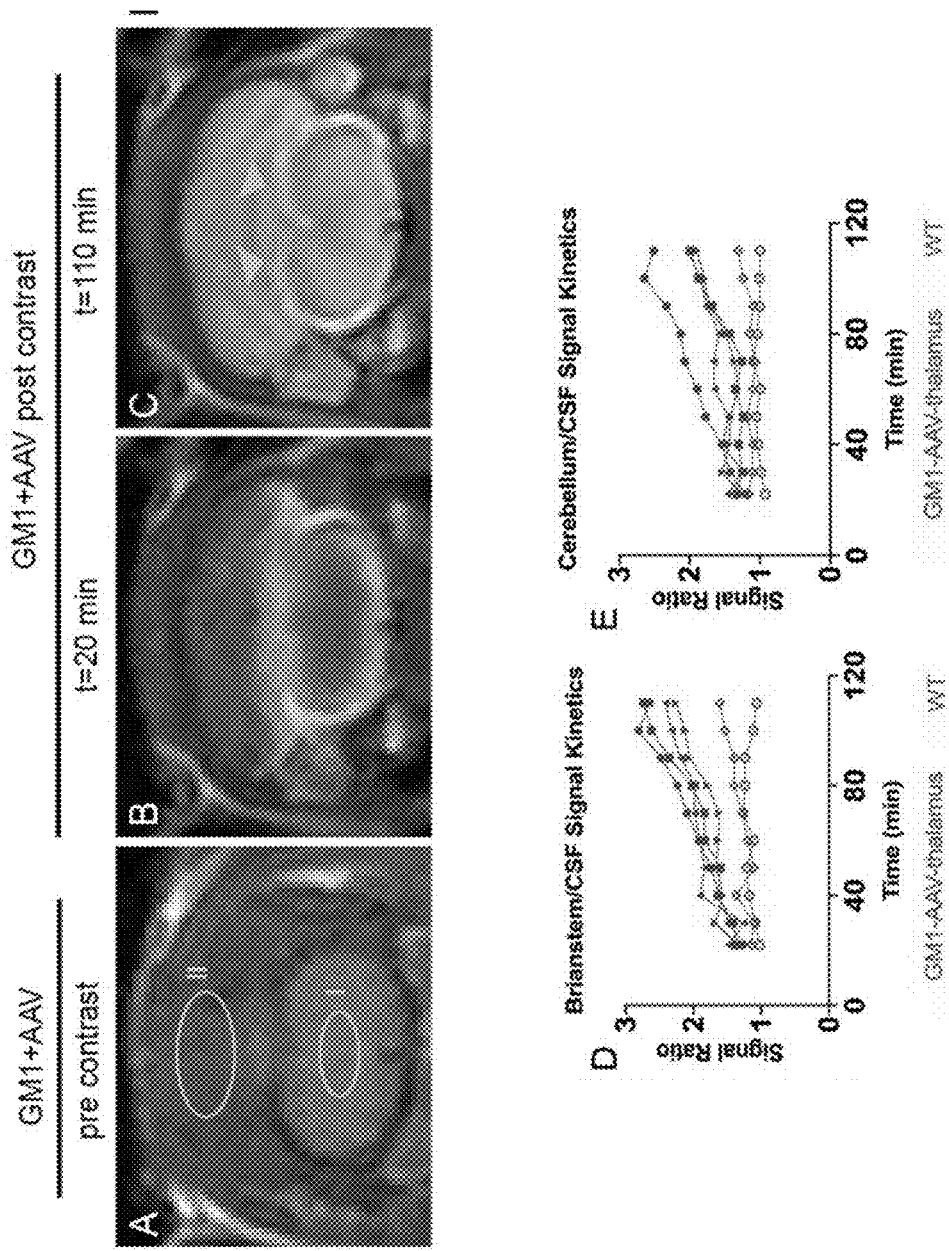
Figures 43A, 43B, 43C, 43D:
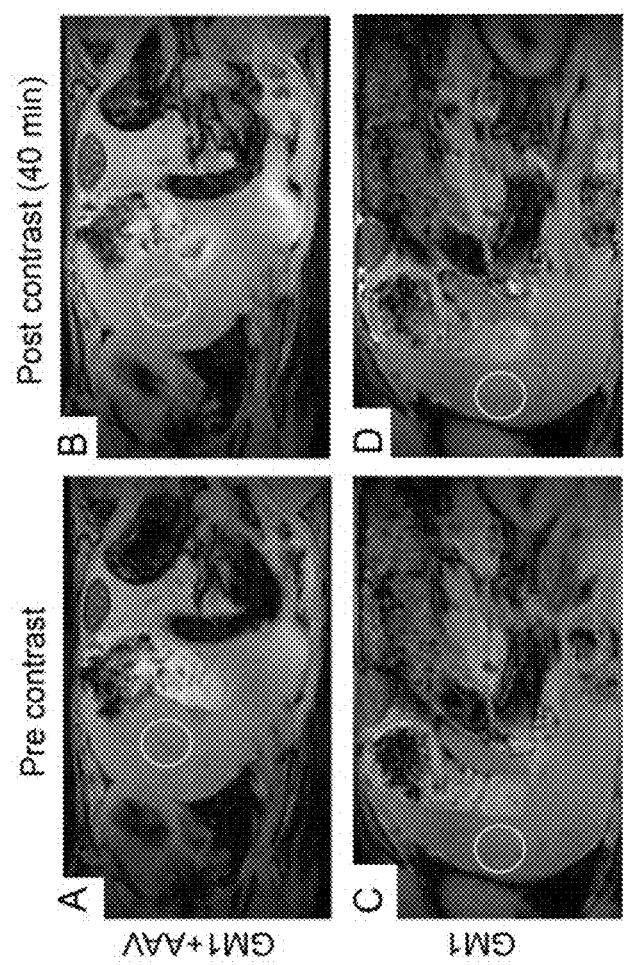
Figures 43E, 43F:
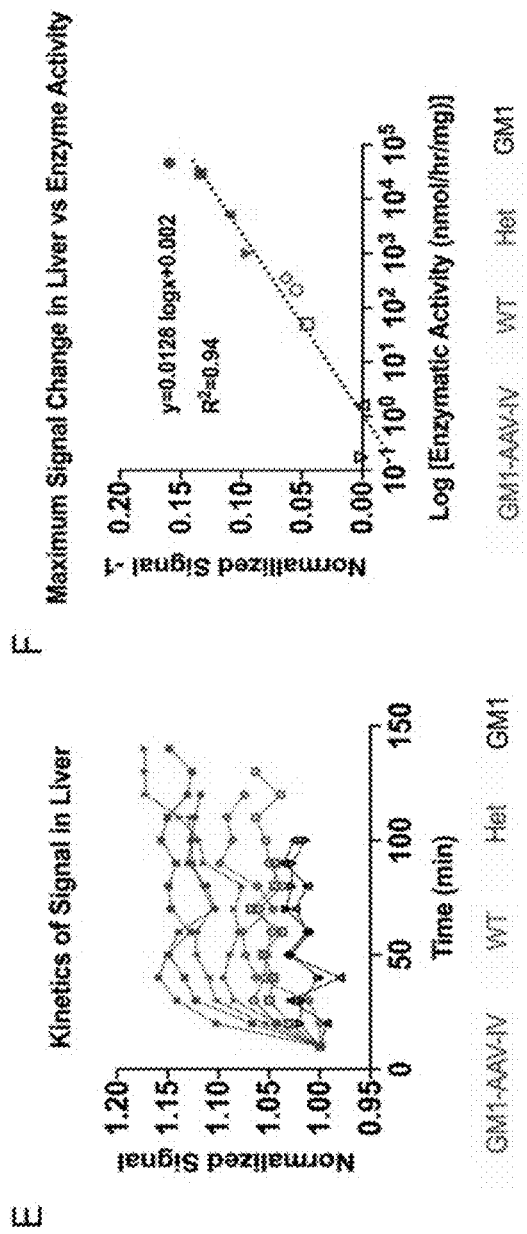

FIG. 42A-N. Activation of lysosomal βgal-responsive MRI probe in the brain after intracranial AAV gene therapy. A-E) Penetration of the probe from CSF to parenchyma over time in brainstem (I) and cerebellum (II). Arrows indicate enhanced CSF surrounding the brainstem. F-I) Signal changes were quantified in areas over time (III-V; hypothalamus, thalamus, cortex, respectively). Pseudo-color image shows signal enhancement (H). J-L) Signal enhancement in ventral region of thalamus, 110 min after contrast injection in (J) AAV treated GM1 mice (filled red squares, circles and triangles; n=4), (K) WT (wild type; open green diamonds and circles; n=2) and (L) GM1 mice (open black triangles; n=2). M) Plot of change in normalized signal over time in individual mice. While AAV treated GM1 and WT mice show signal increase, no signal increase was observed in untreated GM1 mice. N) Normalized signal shows strong corrleation with enzyme activity. Color-coded geometrical shapes in (N) correspond to individual mice shown in (M). Three AAV treated GM1 mice (closed red circle and triangles in (M) are not represented in (N) because they didn't recover from anesthesia.

FIG. 43A-F. Activation of β-gal contrast agent in liver of AAV treated GM1 mice (A,B) vs. GM1 mice (C,D). E) Normalized signal of liver was quantified (yellow circle) in AAV treated GM1 mice (filled red squares, circles, and triangles; n=4), WT (wild type; open green diamonds and circles; n=2), Het (heterozygous; open purple square; n=1) and GM1 mice (open black triangles; n=2) over time. F) Correlation of MR signal enhancement with β-gal enzyme assay signal ($R^2$=0.94). Color-coded geometrical shapes in (F) correspond to individual mice shown in (E). Signal was normalized to liver signal right after probe injection.

Figures 44A, 44B, 44C:
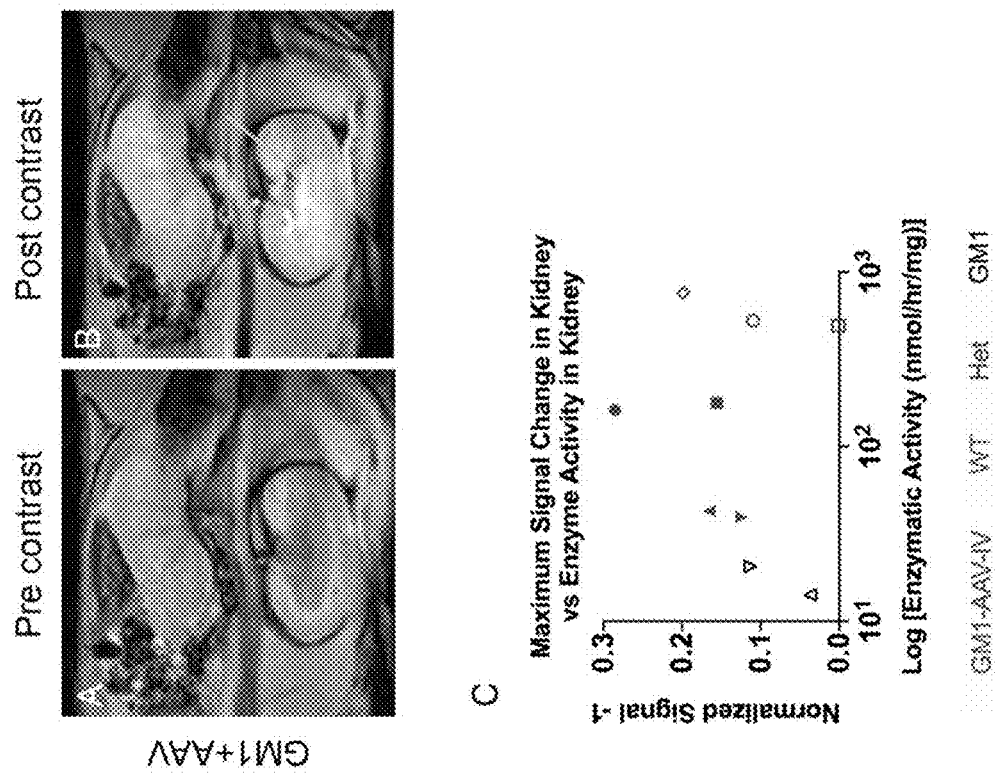
Figures 45A, 45B, 45C, 45D, 45E, 45F:
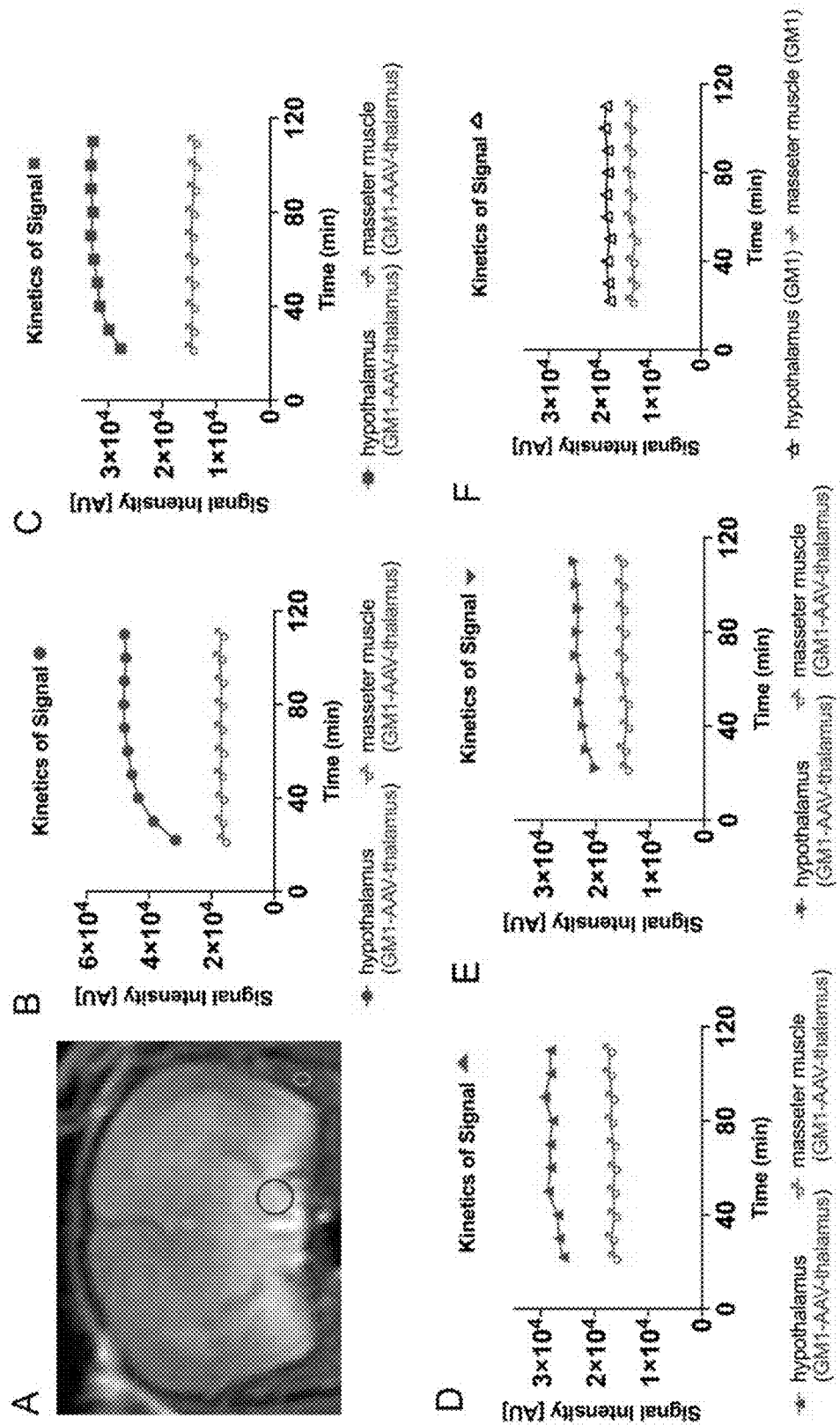

FIG. 44A-C. Representative kidney images of an AAV treated GM1 mouse. (A) pre-contrast. (B) post-contrast administration. (C) Normalized MR signal in kidney does not correlate with kidney β-gal enzyme activity ($R^2$=0.0001). Each symbol corresponds to individual mice. Correlation plot shows values for AAV treated GM1 mice (filled red squares, circles, and triangles; n=4), WT (wild type; open green diamonds and circles; n=2), Het (heterozygous; open purple square; n=1) and GM1 mice (open black triangles; n=2).

FIG. 45A-F. (A) Representative image of an AAV treated GM1 mouse thalamus. Red shows an ROI in hypothalamus and blue shows an ROI in masseter muscle used for normalization of signal acquired from thalami. (B-E) Signal intensity of four AAV-thalamus injected mice, quantified in hypothalamus and masseter muscle. Note that signal intensity of masseter muscle does not increase over time. (F) Signal intensity of a GM1 mouse quantified in hypothalamus and masseter muscle.

Figure 46:
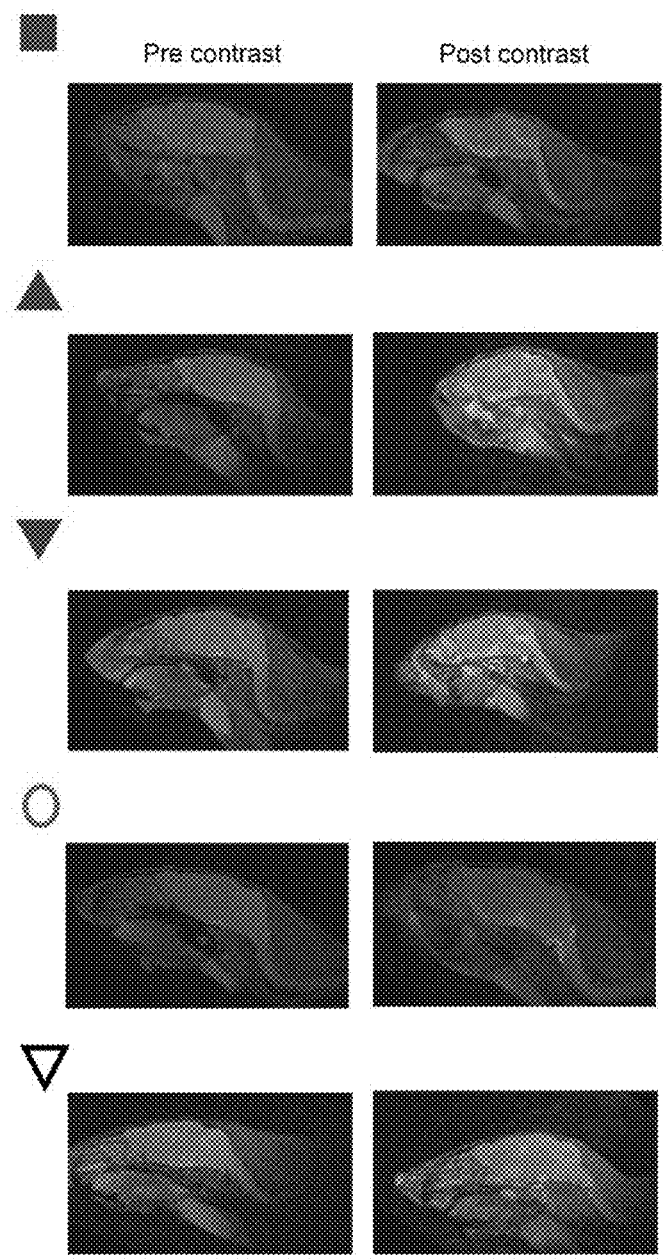

FIG. 46. Sagittal T2w MRI pre- and post-contrast administration for three AAV-thalamus injected mice (filled red square, and triangles), one WT (wild type; open green circle) and one GM1 mouse (open black triangle). T2 enhancement in the post contrast panel indicates successful injection in the intrathecal space. Geometrical shapes correspond to the mice shown in FIG. 42.

Figure 47:
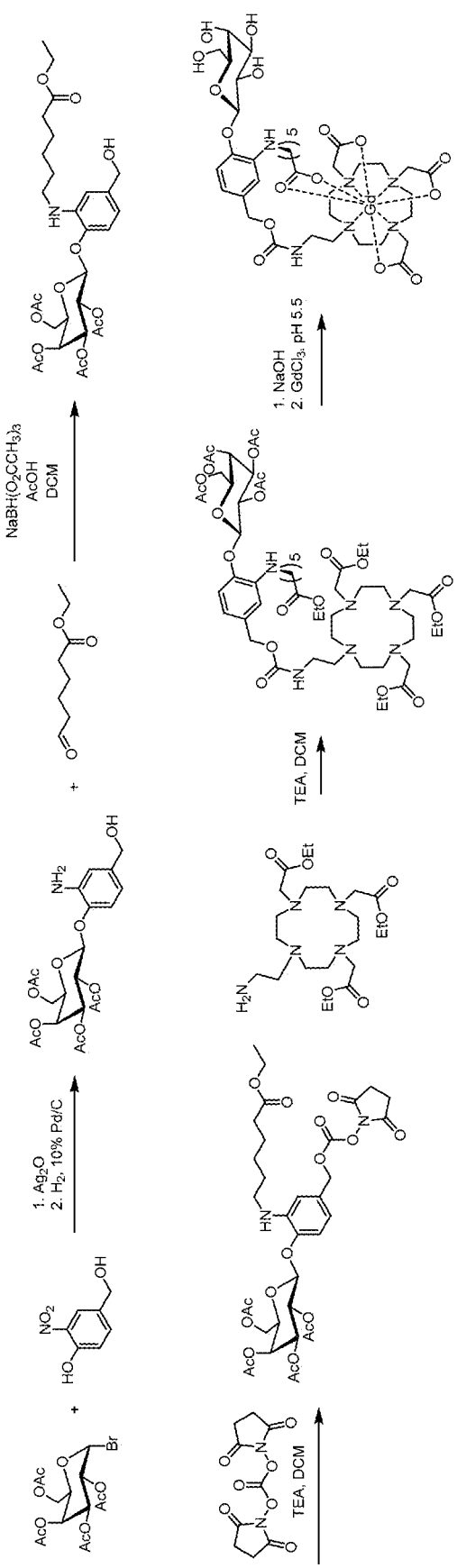

FIG. 47 shows an exemplary synthesis method for a b-gal sensitive probe as described herein.

DETAILED DESCRIPTION

In some aspects, provided herein are MRI contrast agents. In some embodiments, provided herein are conditionally activated MRI contrast agents, and methods of use thereof. In some embodiments, described herein is a class of agents that 1) respond to an in vivo metabolic event such as enzyme cleavage and/or targets a molecular biomarker of disease and 2) translate this response to an image signal detectable by MR. These agents are referred to herein as bioresponsive MRI contrast agents. These agents may comprise a contrast agent that is activated by an enzyme. For example, the contrast agent may be blocked (e.g. "dark") prior to a metabolic event (e.g. enzymatic cleavage) and activated (e.g. "bright") following the metabolic event.

1. Definitions

Although any methods and materials similar or equivalent to those described herein can be used in the practice or testing of embodiments described herein, some preferred methods, compositions, and materials are described herein. However, before the present materials and methods are described, it is to be understood that this invention is not limited to the particular molecules, compositions, methodologies or protocols herein described, as these may vary in accordance with routine experimentation and optimization. It is also to be understood that the terminology used in the description is for the purpose of describing the particular versions or embodiments only and is not intended to limit the scope of the embodiments described herein.

Unless otherwise defined, all technical and scientific terms used herein have the same meaning as commonly understood by one of ordinary skill in the art to which this invention belongs. However, in case of conflict, the present specification, including definitions, will control. Accordingly, in the context of the embodiments described herein, the following definitions apply.

As used herein and in the appended claims, the singular forms "a", "an" and "the" include plural reference unless the context clearly dictates otherwise. Thus, for example, reference to "a peptide amphiphile" is a reference to one or more peptide amphiphiles and equivalents thereof known to those skilled in the art, and so forth.

As used herein, the terms "comprise", "include", and linguistic variations thereof denote the presence of recited feature(s), element(s), method step(s), etc. without the exclusion of the presence of additional feature(s), element(s), method step(s), etc. Conversely, the term "consisting of" and linguistic variations thereof, denotes the presence of recited feature(s), element(s), method step(s), etc. and excludes any unrecited feature(s), element(s), method step(s), etc., except for ordinarily-associated impurities. The phrase "consisting essentially of" denotes the recited feature(s), element(s), method step(s), etc. and any additional feature(s), element(s), method step(s), etc. that do not materially affect the basic nature of the composition, system, or method. Many embodiments herein are described using open "comprising" language. Such embodiments encompass multiple closed "consisting of" and/or "consisting essentially of" embodiments, which may alternatively be claimed or described using such language.

The term "antibody" includes antibody fragments, as are known in the art, including Fab $Fab_2$, single chain antibodies (Fv for example), chimeric antibodies, etc., either produced by the modification of whole and bodies or those synthesized de novo using recombinant DNA technologies. In some embodiments, antibody targeting moieties are humanized antibodies or human and bodies. Humanized forms of non-human (e.g., murine) antibodies are chimeric immunoglobulins, immunoglobulin chains or fragments thereof (such as Fv, Fab, Fab', $F(ab')_2$ or other antigen-binding subsequences of antibodies) which contain minimal sequence derived from non-human immunoglobulin.

The term "bioresponsive" as used herein in reference to a MRI complex or contrast agent refers to a complex or contrast agent that is activated in response to a biological event. For example, the MIll contrast agent may be activated (e.g. exposed) following enzymatic cleavage of the blocking substrate.

The term "gene therapy" as used herein is used in the broadest sense and refers to any technique used to alter gene expression in a subject. Gene therapy is inclusive of a variety of techniques to alter gene expression, including gene insertions or gene deletions. Approaches for gene therapy include the use of vectors (e.g. viral or non-viral vectors) to deliver nucleic acid (e.g. DNA, siRNA, miRNA, etc.) to the subject. Alternative approaches for gene therapy include CRISPR based technology (e.g. CRISPR-cas9 systems). Any suitable approach for gene therapy may be provided to the subject and subsequently monitored using the MRI complexes and compositions described herein.

The term "lysosomal storage disease" or "LSD" as used interchangeably herein refer to a group of disorders resulting from defects in lysosomal function. LSDs are rare, inherited metabolic disorders that affect mostly children.

As used herein, the term "macrocycle" refers to a molecule containing a twelve or more membered ring. Common examples of macrocycles that may be used in accordance with the disclosed contrast agents are described herein, including EDTA, DTPA, DOTA, DO3 A, and the like.

As used herein, the term "magnetic resonance imaging (MRI) device" or "MRI" incorporates all devices capable of magnetic resonance imaging or equivalents. The methods of the invention can be practiced using any such device, or variation of a magnetic resonance imaging (MRI) device or equivalent, or in conjunction with any known MRI methodology. For example, in magnetic resonance methods and apparatuses, a static magnetic field is applied to a tissue or a body under investigation in order to define an equilibrium axis of magnetic alignment in a region of interest. A radio frequency field is then applied to that region in a direction orthogonal to the static magnetic field direction in order to excite magnetic resonance in the region. Magnetic field gradients are applied to spatially encode the signals. The resulting signals are detected by radio-frequency coils placed adjacent to the tissue or area of the body of interest. See, e.g., U.S. Pat. Nos. 6,144,202; 6,128,522; 6,127,775; 6,119,032; 6,111,410; 5,555,251; 5,455,512, 5,450,010, each of which is herein incorporated by reference in its entirety. MRI and supporting devices are manufactured by, e.g., Bruker Medical GMBH; Caprius; Esoate Biomedica; Fonar; GE Medical Systems (GEMS); Hitachi Medical Systems America; Intennagnetics General Corporation; Lunar Corporation; MagneVu; Marconi Medicals; Philips Medical Systems; Shimadzu; Siemens; Toshiba America Medical Systems; and Varian; including imaging systems, by, e.g., Silicon Graphics.

As used herein, the terms "paramagnetic metal ion", "paramagnetic ion" or "metal ion" refer to a metal ion that is magnetized parallel or antiparallel to a magnetic field to an extent proportional to the field. Generally, these are metal ions that have unpaired electrons. Examples of suitable paramagnetic metal ions; include, but are not limited to, gadolinium III (Gd+3 or Gd(M)), iron III (Fe+3 or Fe(III)), manganese II (Mnt2 or Mn(II)), yttrium III (Yt+3 or Yt(III)), dysprosium (Dy+3 or Dy(III)), and chromium (Cr(III) or Cr+3). In a preferred embodiment the paramagnetic ion is the lanthanide atom Gd(III), due to its high magnetic moment ($u^2$=63 BM2), a symmetric electronic ground state (S8), and its current approval for diagnostic use in humans. As used herein, the term "superparamagnetic" refers to a form of magnetism which appears in sufficiently Sill al 1 particles. Superparamagnetic materials have a larger magnetic susceptibility than paramagnetic materials. In some embodiments, superparamagnetic materials comprise iron, such as iron oxide or iron platinum particles.

The term "self-immolative" as used herein (e.g. in relation to a linker) refers to an entity that undergoes a cascade of reactions in response to an external stimuli. For example, a self-immolative linker as described herein undergoes a series of disassembly reactions in response to cleavage of the blocking substrate. Thus, a self-immolative linker will be removed from an MRI complex following a cascade of reactions initiated by enzymatic cleavage of the blocking substrate, leaving behind byproducts of the self-immolative reaction, the free blocking agent, and the free (e.g. bright) contrast agent.

As used herein, the term "subject" refers to any animal (e.g., a mammal), including, but not limited to, humans, non-human primates, rodents, and the like, which is to be the recipient of a particular treatment. Typically, the terms "subject" and "patient" are used interchangeably herein in reference to a human subject.

As used herein, the term "targeting moiety" refers to any suitable moiety that serves to target or direct the complex to a desired area. For example, the targeting moiety may refer to a functional group which serves to target or direct the complex to a particular location, cell type, diseased tissue, or target molecule within a subject.

2. MRI Complexes and Methods of Use

The need for non-invasive, disease specific biomarkers that reflect treatment efficacy is paramount. Provided herein is a new MRI-based technology to track enzymatic activity in any organ, peripheral nervous system (PNS) or central nervous system (CNS) over time and thus with the potential to be applicable to any LSD caused by an enzymatic deficiency.

Provided herein are complexes for use in magnetic resonance imaging. The complexes comprise an MRI contrast agent, and are referred to herein as MRI complexes. In some embodiments, provided herein are conditionally activated MRI complexes comprising a contrast agent and a blocking substrate. In the absence of a suitable metabolic event, the blocking substrate blocks the contrast agent, keeping the agent "dark" or inactive. Following a suitable metabolic event (e.g. enzymatic removal of the blocking substrate) the contrast agent is "bright" or activated. Accordingly, the MRI complexes described herein allow for conditional activation of the contrast agent within the complex. Accordingly, the MRI complexes and contrast agents described herein are referred to as "conditionally activated" or "bioresponsive".

Any suitable contrast agent may be used in the MRI complexes described herein. In some embodiments, the contrast agent is a paramagnetic contrast agent. Exemplary paramagnetic contrast agents suitable for use in the present compositions include, for example, stable free radicals, such as, for example, stable nitroxides, as well as compounds comprising transition, lanthanide and actinide elements. The contrast agent be in the form of a salt (e.g. inorganic or organic salt) or may be covalently or non-covalently bound to complexing agents, including lipophilic derivatives thereof, or to polypeptide-containing macromolecules. Preferable transition, lanthanide and actinide elements include, for example, Gd(III), Mn(II), Cu(II), Cr(III), Fe(II), Fe(III), Co(II), Er(II), Ni(II), Eu(III) and Dy(III). For example, paramagnetic contrast agents may comprise dysprosium ($DY^{3+}$), lanthanide metals (e.g. gadolinium), or transition metals (e.g. manganese). In some embodiments, the contrast agent is a gadolinium-based contrast agent. Any suitable gadolinium-based contrast agent may be used. For example, the contrast agent may be gadoterate, gadodiamide, gadobenate, gadopentetate, gadoteridol, gadoversetamide, gadobutrol gadopentetic acid dimeglumine, gadofosveset, gadocoletic acid, gadomelitol, gadomer 17, gadoxetic acid, etc. In some embodiments, the contrast agent is a superparamagnetic contrast agent. For example, the contrast agent may be an iron oxide contrast agent (e.g. superparamagnetic iron oxide, ultrasmall superparamagnetic iron oxide). As another example, the contrast agent may be an iron platinum contrast agent (e.g. superparamagnetic iron platinum).

In some embodiments, the contrast agent may be complexed, for example, through covalent or noncovalent association, to one or more complexing agents, including lipophilic derivatives thereof, or to polypeptide-containing macromolecules. Such complexes are also referred to herein as chelates. Preferable complexing agents for the present invention include, for example, diethylenetriaminepentaacetic acid (DTPA), ethylene-diaminetetraacetic acid (EDTA), 1,4,7,10-tetraazacyclododecane-N,N',N'',N'''-tetraacetic acid (DOTA), 1,4,7,10-tetraazacyclododecane-N,N',N''-triacetic acid (DOTA), 3,6,9-triaza-12-oxa-3,6,9-tricarboxymethylene-10-carboxy-13-phenyl-trideca noic acid (B-19036), hydroxybenzylethylenediamine diacetic acid (HBED), N,N'-bis(pyridoxy)-5-phosphate)ethylene diamine, N,N'-diacetate (DPDP), 1,4,7-triazacyclononane-N,N',N''-triacetic acid (NOTA), 1,4,8,11-tetraazacyclotetradecane-N,N',N'',N'''-tetraacetic acid (TETA), kryptands (macrocyclic complexes), and desferrioxamine. More preferably, the complexing agents are EDTA, DTPA, DOTA, DO3 A and kryptands, most preferably DTPA. Preferable lipophilic complexes include alkylated derivatives of the complexing agents EDTA, DOTA, for example, N,N'-bis-(carboxydecylamidomethyl-N-2,3-dihydroxypropyl)-ethylenediamine-N,N'-diacetate (EDTA-DDP); N,N'-bis-(carboxy-octadecylamido-methyl-N-2,3-dihydroxypropyl)-ethylenediamine-N,N'-diacetate (EDTA-ODP); N,N'-Bis (carboxy-laurylamidomethyl-N-2,3-dihydroxypropyl) ethylenediamine-N,N'-diacetate (EDTA-LDP); and the like, including those described in U.S. Pat. No. 5,312,617, the disclosures of which are hereby incorporated herein by reference, in their entirety. Preferable polypeptide-containing macromolecules include, for example, albumin, collagen, polyarginine, polylysine, polyhistidine, gamma-globulin and beta-globulin, or any polypeptide sequence.

Suitable complexes (e.g. chelates) therefore include, but are not limited to: Mn(I)-DTPA, Mn(II)-EDTA, Mn(II)-DOTA, Mn(II)-DO3 A, Mn(II)-kryptands, Gd(III)-DTPA, Gd(III)-DOTA, Gd(III)-DO3 A, Gd(III)-kryptands, Cr(II)-EDTA, Cu(I)-EDTA, or iron-desferrioxamine, especially Mn(II)-DTPA or Gd(III)-DTPA.

In particular embodiments, the contrast agent comprises a gadolinium chelate. In some embodiments, the gadolinium chelate may comprise an ionic and hydrophilic chelate (e.g. Gd-DTPA, Gd-DOTA, Gd-polyaspartate). In some embodiments, the gadolinium chelate may comprise a nonionic hydrophilic chelate (e.g. Gd-DTPA-BMA, the macrocyclic chelate analog of Gd-DOTA referred to as Gd-HP-DO3 A). In some embodiments, the gadolinium chelate may comprise an ionic lipophilic chelate (e.g. Gd-BOPTA, GD-EOB-DPTA). Suitable gadolinium chelates are described in the accompanying examples. In some embodiments, the gadolinium chelate is a macrocyclic chelate.

The MRI complexes described herein further comprise a blocking substrate. The blocking substrate prevents activation of the contrast agent in the absence of a suitable metabolic event. The blocking substrate may comprise any suitable moiety. In some embodiments, the blocking substrate comprises a sugar moiety. The sugar moiety may be a monosaccharide, a disaccharide, or a polysaccharide. In some embodiments, the sugar moiety comprises a monosaccharide. Suitable sugar moieties include, for example, moieties containing glucose, fructose, galactose, mannose, ribose or derivatives thereof. For example, the sugar moiety may comprise glucose or a derivative thereof (e.g. α-glucose or β-glucose). As another example, the sugar moiety may comprise galactose or a derivative thereof (e.g. β-galactose). As another example, the sugar moiety may comprise N-acetylgalactosamine or β-glucuronic acid (e.g. β-D-glucoronic acid).

Selection of the appropriate blocking substrate may depend on the intended use of the MRI complex. For example, the appropriate blocking substrate may depend on the intended enzymatic activity to be monitored using the disclosed MRI complexes. In some embodiments, the blocking substrate comprises a sugar moiety that may be cleaved by an enzyme provided in FIG. 39A, FIG. 39B, or FIG. 39C. For example, sugar moieties containing mannose may provide a useful blocking substrate for monitoring activity of mannosidases (e.g. α-mannosidase, β-mannosidase). As anther example, sugar moieties containing fucose may be a useful blocking substrate for monitoring activity of fucosidases (e.g. α-fucosidase). For example, moieties containing glucose or derivatives thereof may provide a useful blocking substrate for monitoring activity of glucosidases (e.g. α-glucosidase, β-glucosidase). As another example, moieties containing galactose or derivatives thereof may provide a useful blocking substrate for monitoring the activity of galactosidase enzymes (e.g. β-galactosidase). As another example, moieties containing galactose derivatives such as N-acetylgalactosamine (GalNAc) serve as useful blocking substrate for monitoring the activity of hexosaminidases (e.g. hex-A, hex-B). As another example, moieties containing β-glucuronic acid (e.g. β-D-glucuronic acid) may serve as a useful blocking substrate for monitoring the activity of β-glucoronidase.

The blocking substrate may be removed by a suitable enzyme, thus exposing the contrast agent. Accordingly, the contrast agent may be activated in response to enzymatic cleavage by any suitable enzyme. In some embodiments, the contrast agent is activated in response to an enzyme that is deficient in one or more disease states. For example, the contrast agent may be activated in response to enzymes deficient in one or more lysosomal storage diseases. Enzymes include, for example, β-gal, β-gluc, HexA, HexB, and the like. These enzymes are not limiting, the agent may be designed to be activated by any suitable enzyme, including those identified in FIG. 39A, FIB. 39B, or FIG. 39C.

In some embodiments, the MRI complex further comprises a linker. In some embodiments, the linker conjugates the contrast agent to the blocking substrate. Accordingly, the linker length may be optimized to minimize the MRI signal prior to probe activation (e.g. prior to cleavage of the blocking substrate. For example, the linker may conjugate the macrocyclic contrast agent chelate to the blocking substrate. In some embodiments, the linkers are self-immolative linkers in response to cleavage (e.g. hydrolysis) of the blocking substrate. For example, the linkers may be self-immolative in response to enzymatic cleavage of the glucose or galactose containing moiety. The linkers may also include groups to provide desired steric, solubility, and/or biocompatibility properties to the contrast agent. Exemplary groups that may be included in the linker include, but are not limited to, alkyl and aryl groups, including substituted alkyl and aryl groups and heteroalkyl (particularly oxo groups) and heteroaryl groups, including alkyl amine groups. Exemplary groups include p-aminobenzyl; substituted p-aminobenzyl, diphenyl and substituted diphenyl, alkyl furan such as benzylfuran, carboxy, and straight chain alkyl groups of 1 to 10 carbons in length. In some embodiments, groups include p-aminobenzyl, methyl, ethyl, propyl; butyl, pentyl, hexyl, acetic acid, propionic acid, aminobutyl; p-alkyl phenols, 4-alkylimidazole, carbonyls, OH, COOH glycols, etc.

In some embodiments, the MRI complex may further comprise one or more additional components that provide a desired functionality. For example, the complex may optionally comprise a targeting moiety. Preferred targeting moieties are those that allow concentration of the agents in a particular localization. For example, antibodies, cell surface receptor ligands and hormones, lipids, sugars and dextrans, alcohols, bile acids, fatty acids, amino acids, peptides and nucleic acids may all be attached to the MRI complex to localize or target the contrast agent to a particular site. In some embodiments, the targeting moiety allows targeting of the MRI agents of the invention to a particular tissue; the surface of a cell or a subcellular localization. In some embodiments, the targeting moiety is a peptide. In some embodiments, the targeting moiety is an antibody.

The MRI complexes described herein may incorporated into a pharmaceutical composition. For example, the MRI complex may be incorporated into a composition for delivery to a subject. The composition may further comprise one or more excipients, dependent on the intended mode of administration. In embodiments of the present invention, the composition can be introduced into a biological structure disposed in a subject. The mode of administration to a sample or subject can determine the sites and/or cells in the organism to which an agent will be delivered. In some embodiments, compositions can be injected into a subject parenterally, for example, intra-arterially or intravenously. In some embodiments, the compositions can be injected intrathecally. Accordingly, a suitable composition may be administered in the form of a sterile, aqueous solution; such a solution can contain other solutes, including, but not limited to, salts or glucose in quantities that will make the solution isotonic.

When a contrast enhancement agent of the present invention is administered to humans, the prescribing physician will ultimately determine the appropriate dosage for a given human subject, and this can be expected to vary according to the weight, age and response of the individual as well as the nature and severity of the patient's condition. In some embodiments, the complexes of the present invention may also be co-administered with one or more additional imaging, diagnostic, or therapeutic agents.

The MRI complexes and compositions described herein may be used in methods for monitoring a subject. For example, the complexes and compositions described herein may be used in methods for monitoring gene therapy in a subject.

In some embodiments, gene therapy may be provided to a subject deficient in one or more enzymes. For example, gene therapy may be provided to a subject deficient in one or more enzymes associated with a lysosomal storage disease (LSD). Exemplary lysosomal storage diseases, along with the defective enzyme, are shown in FIG. 39A-C (taken from Greiner-Tollersrud OK, Berg T. Lysosomal Storage Disorders. In: Madame Curie Bioscience Database Landes Bioscience; 2000-2013, the entire contents of which are incorporated herein by reference). Gene therapy targeting any suitable LSD, including any shown in FIG. 39A-39C, may be performed and monitored using the complexes described herein.

In some embodiments, gene therapy may be monitored using the complexes and compositions described herein to evaluate the activity of exemplary enzymes known to be associated with lysosomal storage diseases, including galactosidases (e.g. α-galactosidase, β-galactosidase), glucosidases (e.g. α-glucosidase, β-glucosidase), and hexosaminidases (e.g. Hex-A, Hex-B). In some embodiments, the compositions provided herein may be provided to the subject following gene therapy to monitor the delivery of the desired gene to the subject. For example, gene therapy may correct a deficiency in an enzyme or deliver a functional enzyme to the subject, and the efficacy of this enzyme may be measured using a complex or composition as described herein. For example, the blocking substrate may be cleaved in response to efficient delivery or repair of an enzyme that is otherwise deficient in one or more LSDs, such that the contrast agent is "active" if the enzyme is sufficiently functional. Accordingly, efficacy of gene therapy may be determined based upon whether or not the contrast agent is active. For example, the bioresponsive contrast agent may be designed such that the contrast agent is activated in response to β-gal activity, such that administration of the β-gal gene via gene therapy (e.g. using a vector, such as an AAV vector) will cause the agent to become bright thereby indicating successful delivery of the β-gal to the subject in need thereof. The composition may be provided to the subject at any suitable time point prior to, during, or following gene therapy in the subject to measure efficacy.

EXPERIMENTAL

Example 1

Lysosomal storage diseases (LSD) represent at least 50 monogenetic diseases, most of which are fatal. Although individually rare, collectively they have a combined prevalence similar to hemophilia. Hospital costs for patients with an LSD (mucopolysaccharidosis I) were estimated to be $56,000/year, but this does not include supportive and home health care, which consume the majority of costs for these children. As an example, reimbursable health insurance costs for one child with infantile Tay-Sachs disease currently total $2.7 million over a 3-year period. Using the range of costs cited above and U.S. vital statistics for 2007, in which there were 4.3 million live births, health care costs for children with LSDs ranged between $31.3 million (hospitalization only)—$1.5 billion (reimbursable health-related costs). For patients who have mild or no CNS involvement, treatments may be available for peripheral disease, but these can carry high risk and/or cost (bone marrow transplantation, ~$175,000; enzyme replacement therapy, ~$200,000/year for mucopolysaccharidosis I, Gaucher and Fabry diseases. To date, these treatments have shown little benefit for human LSDs with neurological involvement.

Beyond financial costs, the heartbreaking nature of these diseases is incalculable. Infantile forms of these diseases often first manifest disease signs at about 5 months of age, where developmental delay becomes apparent. Many children never learn to sit, and those that do lose this ability within 1 to 1.5 years. As disease signs increase in severity, including the inability to swallow, seizures, deafness, blindness, individuals affected by these diseases invariably progress to a semi-vegetative state. Perhaps more tragic is the case of juvenile patients, who finish kindergarten in worse condition than when they started. They stumble, stutter, and have difficulty reading. Eventually these kids lose the ability to walk, talk, feed themselves and ultimately develop blindness, deafness, spasticity, seizures and also progress to a semi-vegetate state. Due to the self-awareness of children at this age, they also suffer from depression as well as the fear and hopelessness associated with diagnosis of a fatal and untreatable disorder.

As monogenetic diseases with clearly defined genotype-phenotype relations, lysosomal storage diseases are excellent candidates for gene therapy. The transformative results documented in an AAV gene therapy clinical trial in infants affected by spinal muscular atrophy demonstrated unequivocally the potential of in vivo gene transfer to treat monogenic neurological diseases. Also, Luxturna, an AAV2 vector encoding RPE65, received FDA approval in 2017 to treat Leber's congenital amaurosis. These extraordinary events proved to the pharmaceutical industry and investment community that the current generation of in vivo gene therapies has the potential to address devastating human diseases and that a path to drug approval exists.

As a result, the number of academic and biotech led programs has risen exponentially in the last few years. It is indeed an exciting and hopeful new era for the gene therapy field, but effective clinical trials with shortened paths to approval will require robust biomarkers to track therapeutic effect. To date, there is a lack of non-invasive ways to determine biodistribution or activity levels of these therapies in the body and CNS in patients. This is a significant hinderance, leaving physicians guessing which organs or structures are effectively treated and, due to the lag time associated with clinical disease progression, this limitation ultimately impacts the evolution of treatment modalities.

The need for non-invasive, disease specific biomarkers that reflect treatment efficacy is paramount and not limited to gene therapy, but also applies to anything that augments the targeted enzyme activity (including enzyme replacement therapy (ERT), transcriptional read through agents and/or chaperone therapies). For example, ERT for Pompe and Mucopolysaccharidoses have limited distribution to the target tissues due to immunogenicity and/or reduced penetration/uptake. Herein a new MRI-based technology to track enzymatic activity enhancement in any organ, peripheral nervous system (PNS) or central nervous system (CNS) over time is described. This technology has the potential to play a critical role in the development and/or refinement of treatments for many monogenetic enzymatic deficiencies. Since these agents are specific to the disease, not the therapeutic modality, advancing this technology applies to the entire lysosomal disease field.

Described herein is a novel class of magnetic resonance imaging (MRI) contrast agents that are conditionally activated by an enzymatic reaction. The new flexible platform uses an enzyme-specific substrate to block access of water to a Gd(III) ion, thus suppressing its MRI signal, and can be rapidly adapted to report on a number of gene therapy targets. The gangliosidoses, GM1 gangliosidosis and Tay-Sachs/Sandhoff disease (GM2 gangliosidosis), are fatal neurodegenerative LSDs of children for which there is no effective treatment. GM1 gangliosidosis is caused by a mutation in GLB1, the gene encoding for the lysosomal enzyme acid β-galactosidase (β-gal; EC 3.2.1.23), whereas Tay-Sachs and Sandhoff diseases are caused by a deficiency of Hexosaminidase A (Hex-A; EC:3.2.1.52).

β-galactosidase is responsible for cleaving the terminal β-D-galactose from GM1 ganglioside and loss of enzymatic activity results in buildup of GM1 in nerves and neuronal dysfunction and death. Similarly, GM2 gangliosidosis is caused by mutations in the Hex-A (Tay-Sachs disease) or HERB (Sandhoff disease) genes encoding respectively the α and β-subunits of the heterodimeric Hex-A enzyme. This enzyme is responsible for cleaving the terminal gal-NAC residue off of GM2 ganglioside, and loss of function results in storage of GM2 ganglioside in the nervous system, cellular dysfunction and death. Clinical presentation is similar to other neuronopathic lysosomal storage diseases as described above.

Figure 1A:
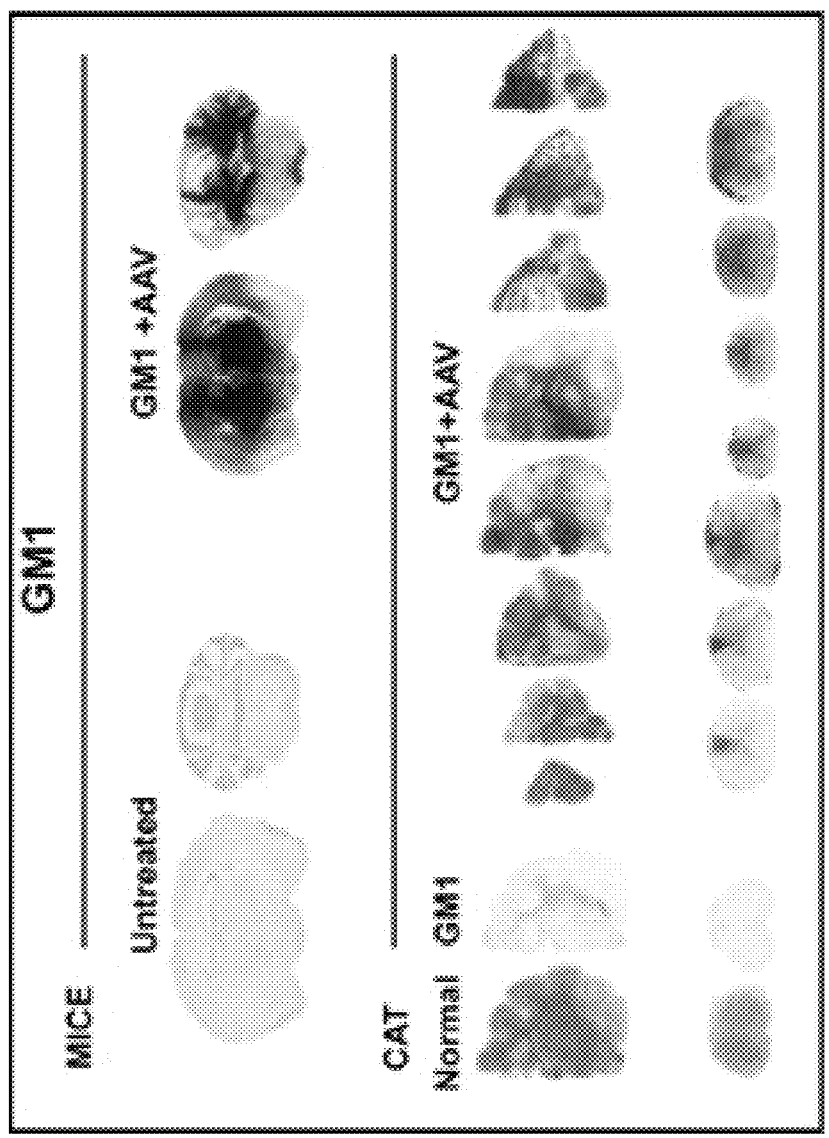
FIG. 1A-B shows biodistribution of intracranially administered AAV gene therapy in GM1 and SD animal models using histochemical stains.
Figure 1B:
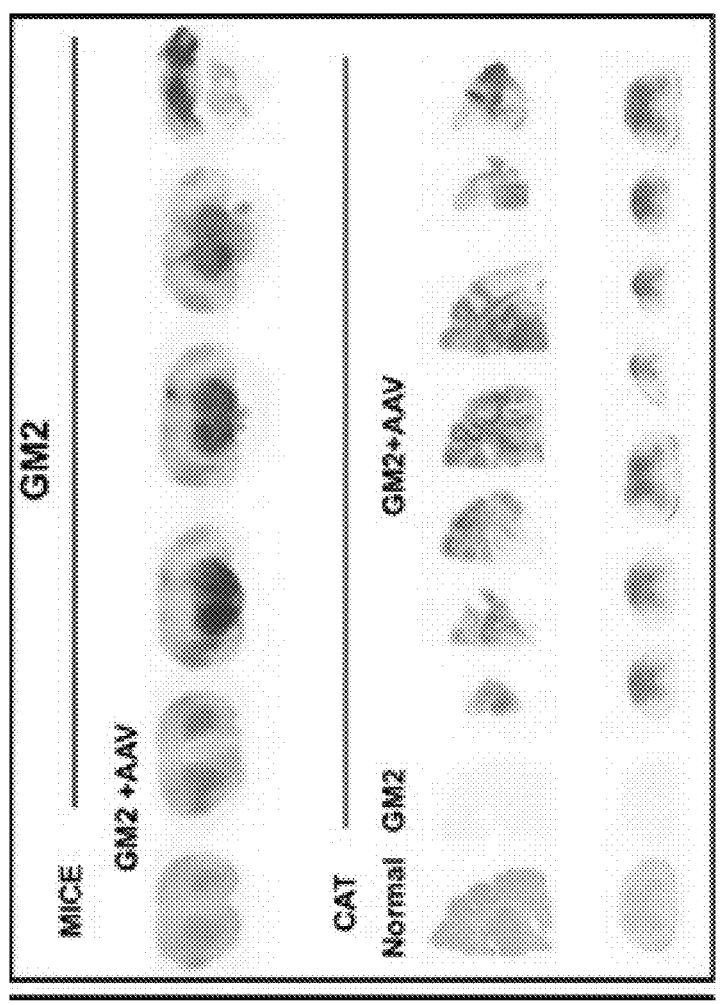

Several animal models exist to study GM1 and GM2: mice (GM1 and Sandhoff), cats (GM1 and Sandhoff), and sheep (Tay-Sachs). In mice with GM1 gangliosidosis, AAV gene therapy extends survival to 12-18 months compared to untreated mice, which usually survive until 9-10 months of age. Gene therapy results in global distribution of β-gal in the CNS and liver of GM1 mice, with highest levels in the CNS after intracranial delivery and in the liver after intravenous administration. In GM1 cats, survival has been extended dramatically from the 7-8 month in untreated animals with several animals still alive at 9 years of age (5-7). Whether AAV is injected directly into the brain or intravenously, increased β-gal activity is found throughout the CNS (FIG. 1A-1B) and also in liver. In GM2 gangliosidosis, AAV gene therapy results in an increase in median lifespan of 5.2-fold in mice and 4.3-fold in cats. Treated cats have a dramatic improvement in quality of life and survive up to 36 months of age (untreated life span is 4.4 months). Hex-A was again distributed throughout the CNS after intracranial administration (FIG. 1A-1B).

Due to the efficacy of this preclinical data in animal models, clinical trials are underway as of for both diseases. However, GM1 and GM2 are lacking a non-invasive method to determine efficacy and biodistribution. Herein, a bioresponsive MRI contrast agent to track catalytic activity of the therapeutic enzyme in patients undergoing gene therapy interventions is described.

Magnetic Resonance Imaging (MRI) is the modality of choice for evaluating neurologic disease and is a staple of clinical diagnostic radiology due to its tunable soft-tissue contrast, high spatial and temporal resolution, and lack of ionizing radiation. It is capable of true 3D imaging of biological structures at near-cellular resolution (~10 um). Detailed structural information in 3D can be obtained in minutes, and single slices in seconds. The need to differentiate regions of tissues or organs that are magnetically similar but histologically distinct has been a major impetus for the development of contrast enhancement agents. A rapidly growing body of literature documents the clinical effectiveness of paramagnetic contrast agents. Currently, four such agents are in clinical use, and more than 40% of all clinical MR exams employ contrast agents. However, current clinical MR agents are not sensitive to biochemical events such as enzyme activity in cells or organs.

Described herein is a class of agents that 1) respond to an in vivo metabolic event such as enzyme cleavage and/or targets a molecular biomarker of disease and 2) translate this response to an image signal detectable by MR imaging. The ability to monitor gene expression and molecular signatures in whole animals may provide new insights into the mechanisms of development and disease. Bio-activated (or bioresponsive) MR contrast agents for the enzymes bacterial β-galactosidase (LacZ), β-glucuronidase, and the ions Zn(II) and Ca(II) are classified as "q modulated" because they are conditionally turned on by water binding directly to the Gd(III) ion which turns them "bright" in an acquired MR image.

The platform to visualize multiple gene therapy products may be applied to human patients to visualize, in real time, specific gene therapy products. The bio-activated reporter complexes described here are designed to detect gene expression and report these events in the form of an acquired 3D-MR image. The LacZ reporter gene encoding bacterial LacZ has been used for decades with an optical output, thereby restricting its translation from in vitro to in vivo experiments. Producing a responsive MR imaging reporter of LacZ activity created the possibility of acquiring unprecedented 3D images of gene expression in whole animals.

Figure 2:
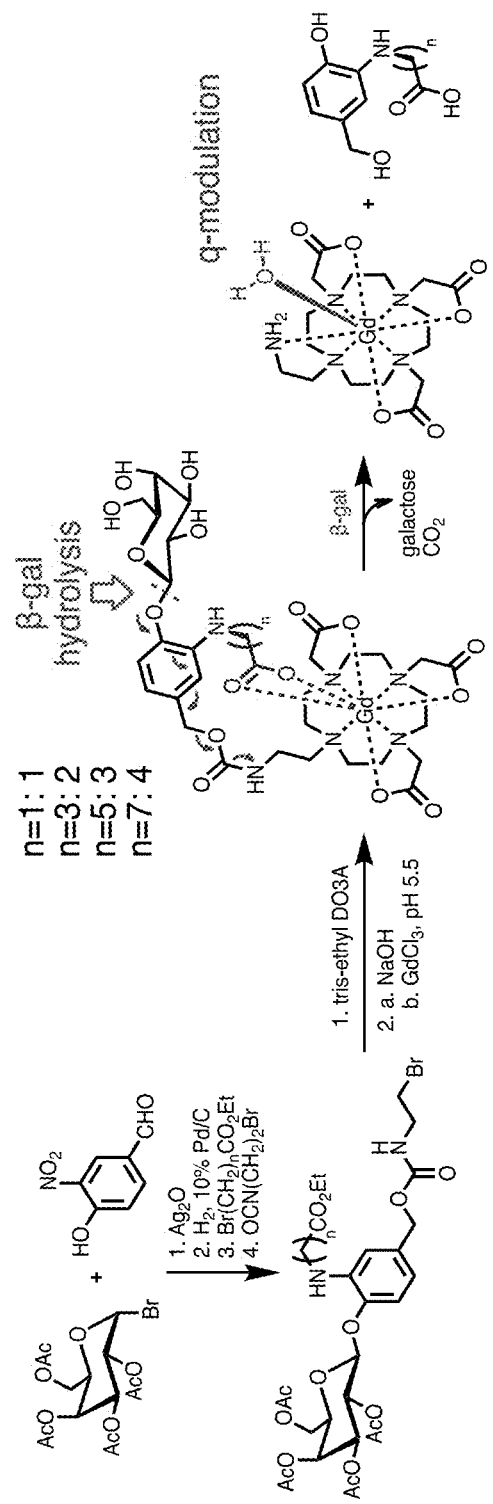
FIG. 2 shows self-immolative MR agents incorporating a coordinating carboxylate (blue) (Complexes 1-4 are increasing methylene carbons). Gd(III) coordination by this functionality will more efficiently prohibit water access to Gd(III) (than previous generations) producing an inactive, or dark agent. Hydrolysis of the glycoside by β-gal results in an electron cascade that provides an open coordination site for water to bind to Gd(III). There is a 90% increase in the relativity post enzyme cleavage.

The types of agents described herein have been designed with the potential for clinical translation. Utilizing this chemistry, targets that have direct application to assess the impact of gene therapies for lysosomal storage diseases, which are ready for clinical translation, may be evaluated. For example, the agent may be modified to reflect the active site of the enzyme produced after gene therapy (e.g., α-gal, β-gal, β-gluc and Hex-A). For example, for GM1 gangliosidosis, a distal galactose residue and an additional coordinating arm (blue) for noninvasive visualization of β-gal may be used (FIG. 2). Employing a self-immolative strategy has significantly improved the kinetics of enzyme activation of the MR agents over previous generations and these modifications were necessary for imaging processes on biologically-relevant timescales.

Figure 3:
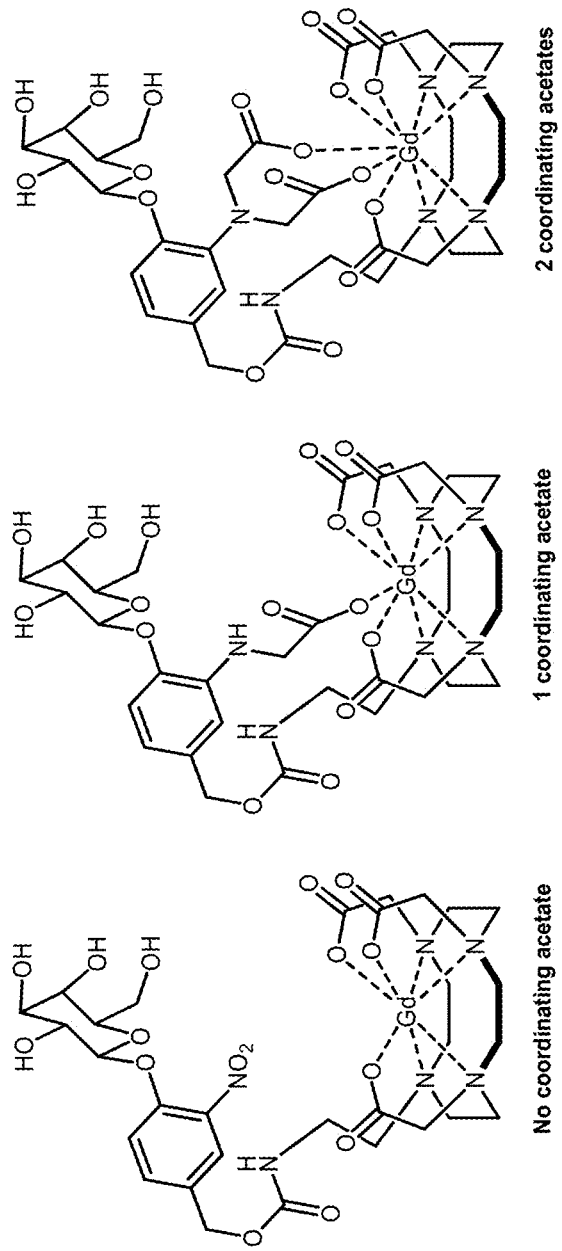
FIG. 3. Three versions of the self-immolative contrast agents were synthesized and the complex with a single coordinating acetate to Gd(III) had a significantly lower observed relaxivity (i.e., dark in an MR image).

A series of agents incorporating 0, 1 and 2 coordinating aliphatic acids to the Gd(III) ion bound by the macrocycle were synthesized (FIG. 3). The acetate arm is attached to an amine present in the linker between the macrocycle and the galactopyranose substrate. Further, using computational analysis on a related series of agents, the linker length of the self-immolative "spacer" (where n=1, 3, 5, and 7 methylene units: see FIG. 2 in blue) and discovered that complex 3 had the highest change in relaxivity (90%) when exposed to β-gal (i.e., dark to bright). Coordination of Gd(III) by this functionality significantly reduces water access prior to enzyme activation, thereby affording a "dark" agent (q~0). Hydrolysis of the glycosidic bond by β-gal restored agent efficiency following self-immolation with subsequent water binding to Gd(III) turning the agent "bright" (q~1).

Figure 4:
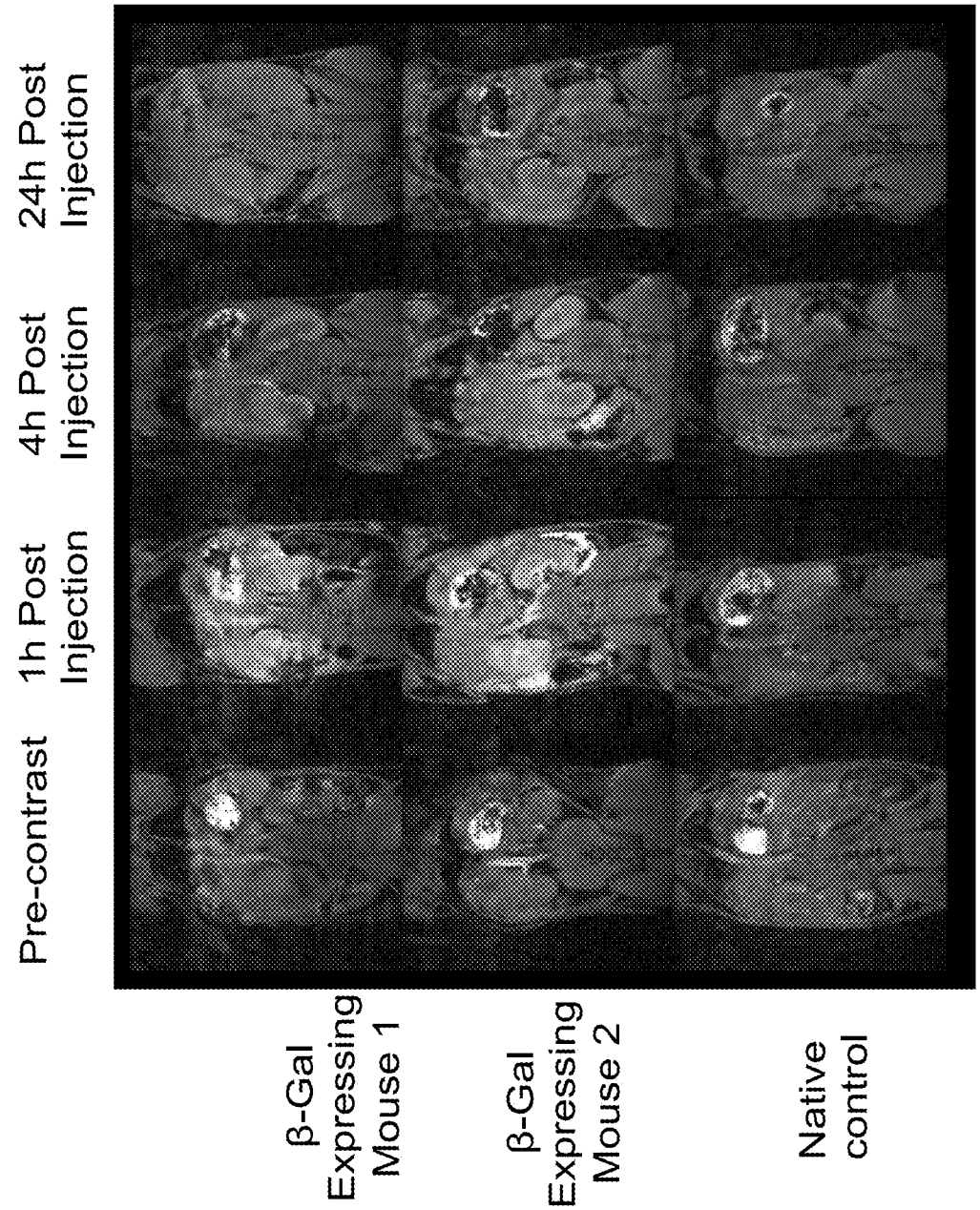
FIG. 4 Transgenic mice constitutively expressing LacZ (rows 1 and 2: Jackson Labs), and native control mice (row 3) were injected intra-peritoneally with a β-galactosidase responsive agent (IP 200 microliters of 40 mM). Coronal MR images (9.4T) were acquired at pre-injection, and at 1, 4, and 24 hours post injection using a $T_1$ weighted FLASH sequence Scan parameters: [TR/TE/alpha=100 ms/2.2 ms/45 deg, 192×192 matrix, 0.234 mm in-plane image resolution, and 1 mm slices.

To test this agent in vivo, complex 3 (FIG. 2) was synthesized and injected intraperitoneally into transgenic LacZ mice (FIG. 4, rows 1 and 2) (Jackson Labs). Global signal enhancement was observed in the lacZ-expressing mice at 1 hr. post injection (prominent in the liver and kidney. At 4 hrs. post injection, signal enhancement was present but at a reduced level. In one LacZ mouse, the bladder was visible at the 4 hour time point with a very bright MR signal, suggesting that the β-gal responsive MR agent is cleared renally. In both mice, the MR signal returned to baseline within 24 hours, suggesting that the bulk of the agent was cleared by the kidney. No signal enhancement was observed in non-transgenic native control mice (FIG. 4, row 3).

Figure 5A:
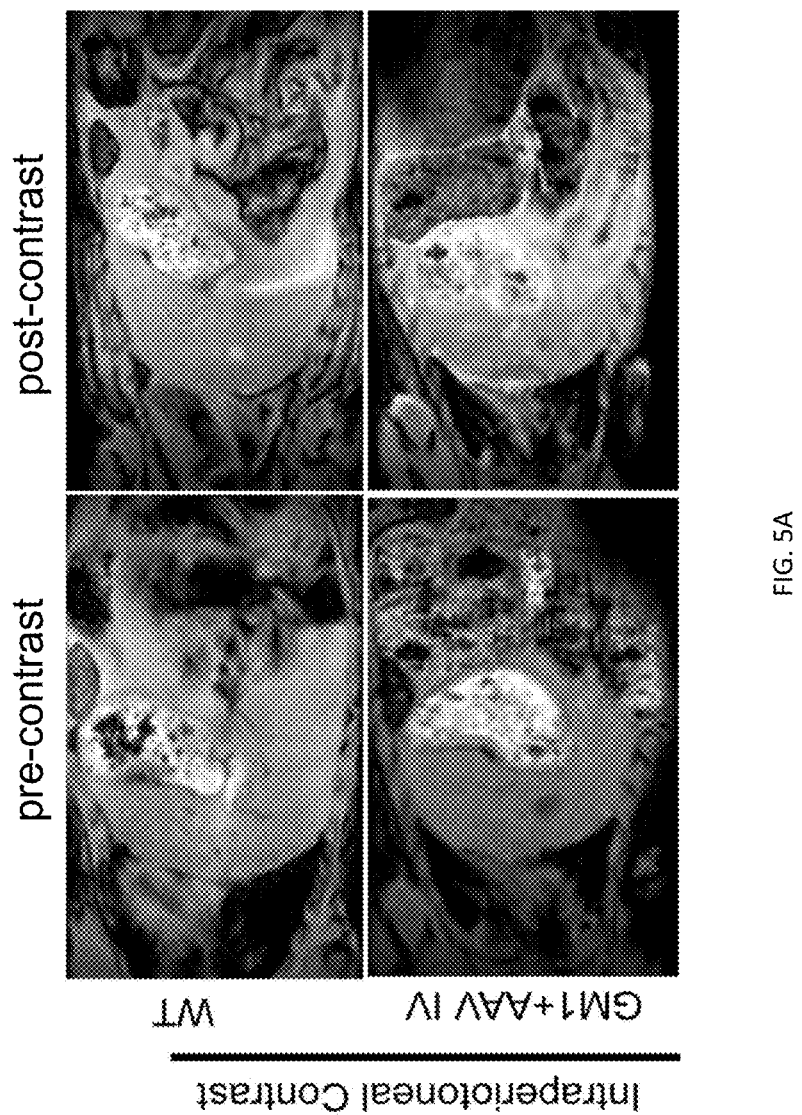
FIG. 5A-5B. The β-gal agent (complex 3) is activated by mammalian (3-galactosidase.
Figure 5B:
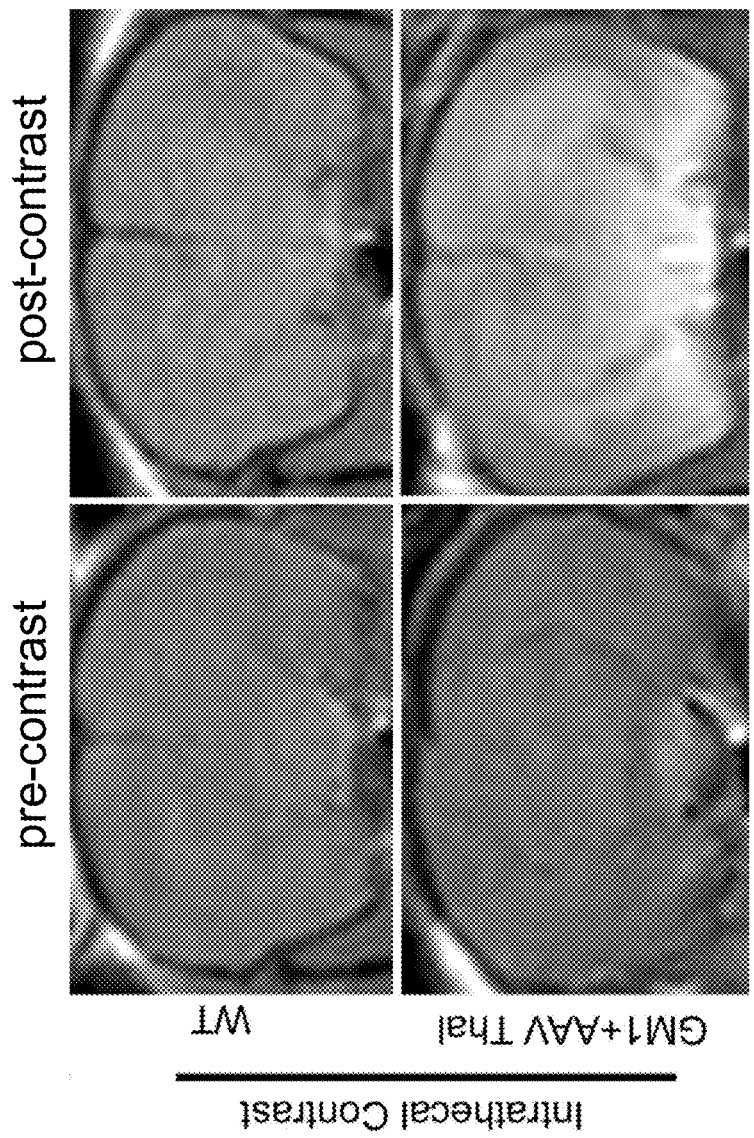
Figures 6A, 6B, 6C, 6D, 6E, 6F:
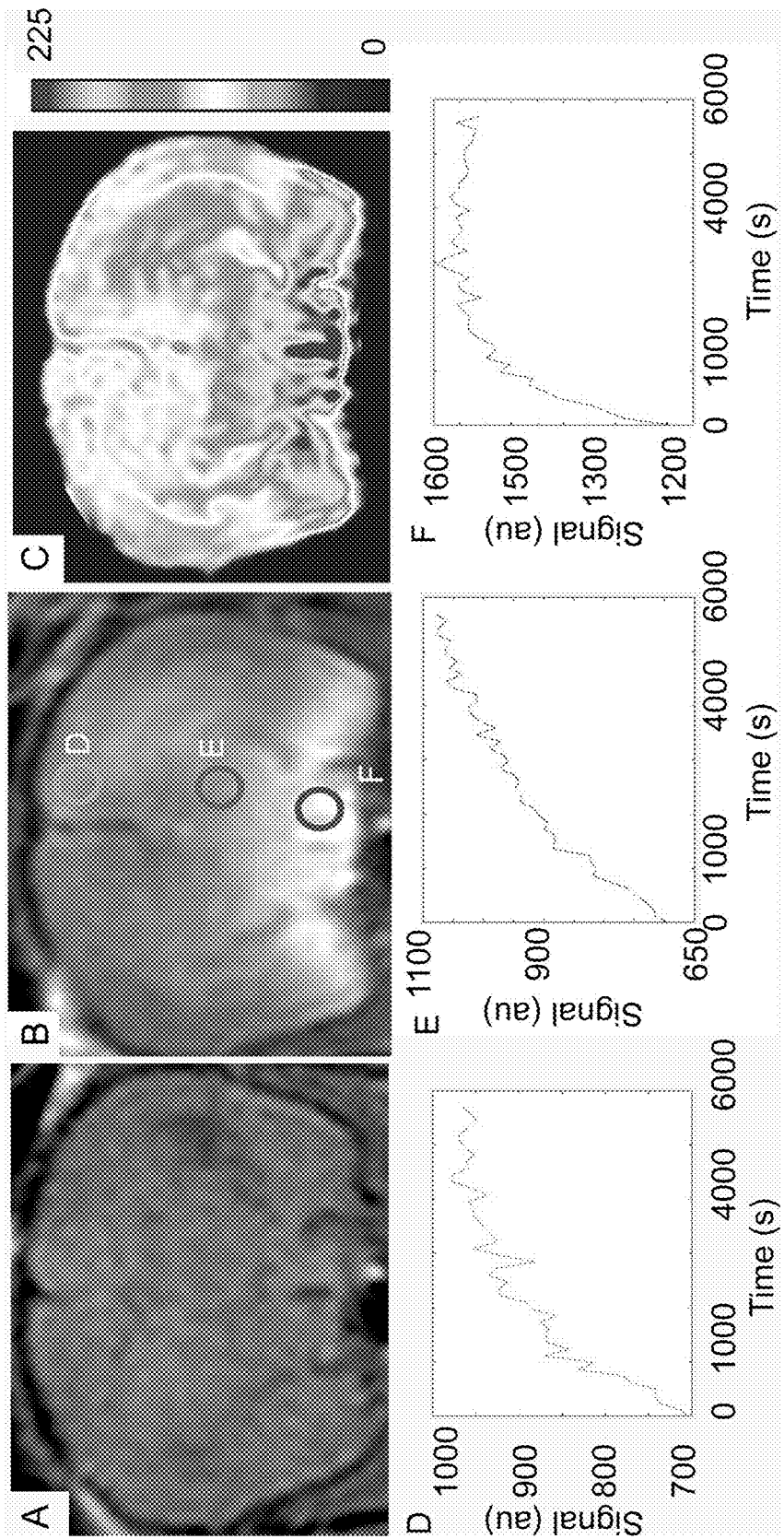
FIG. 6A-6F. Kinetics of signal enhancement by β-gal responsive contrast agent Representative brain MR images of a β-gal$^{-/-}$ mouse treated by β-gal gene therapy (A)

LacZ transgenic mice overexpress bacterial β-gal which differs from mammalian β-gal, which functions in the lysosome. LacZ is derived from *E. coli* and has been classically used as an intracellular marker. The presence of enhancement indicates that the compound is able to gain access to the cytoplasm of cells in vivo, and presumably could be metabolized by mammalian β-gal in the lysosome. This is similar to X-gal, an artificial substrate that is cleaved by both the bacterial and mammalian enzymes, which is significant because LacZ works at neutral pH and is located in the cytoplasm whereas mammalian β-gal is lysosomal and, as such works at an acidic pH (~4.2). To verify the compound activity with mammalian β-gal, the agent was tested in GM1 mice (β-gal$^{-/-}$) treated with an AAV9 vector encoding β-gal (FIG. 5A-5B). GM1 mice were injected with an AAV9-GLB1 intracranially (1E10vg, in the thalamus, unilateral) or intravenously (3E11 vg). In animals that received intraperitoneal (IP) administration of contrast agent, enhancement in the liver was pronounced (FIG. 5A). In animals that received intrathecal injection of contrast agent, strong enhancement of the CSF and brain parenchyma was observed (FIG. 5B)

Areas of enhancement matched areas of greatest enzymatic activity associated with that delivery route. The quantification of the contrast enhancement over time is shown in FIG. 6A-F. These data show agent 3 (see FIG. 2) can be used to detect mammalian β-gal activity in tissues. This state-of-the-art technology has the ability to revolutionize the use of gene therapies in a clinical setting allowing for assessment of efficacy earlier and less invasively than ever before.

AAV gene therapy for LSDs relies on modifying a small number of CNS resident cells to overexpress the deficient enzyme that leads to its secretion into the interstitial fluid (ISF). This results in broad distribution throughout the brain by diffusion, CSF flow and axonal transport. The functional enzyme then is taken up by unmodified cells via the mannose-6-phosphate receptor (M6PR) that targets it to the lysosome where it clears its substrate, in this case GM1 ganglioside (FIG. 7). This cross correction principle holds true for all soluble lysosomal enzymes.

This is illustrated in FIG. 1, where bilateral thalamic injections of AAV in mice and cats, with two different LSDs, results in widespred distribution in the CNS. Catalytically active enzyme in CSF, as suggested by contrast enhancement, represents a pool of bioavailable ß-gal for uptake by untransduced cells through receptor-mediated endocytosis. While activity of ß-gal is optimal at low pH (aka lysosomal), it has catalytic activity at neutral pH. Therefore enhancement in CSF and/or tissue (in lysosomes or ISF) is a direct representation of therapeuticaly relevant enzymatic activity regardless of the compartmentalization of the contrast agent. Cell experiments show enhancement of the agent in the pellet, suggesting the agent is able to be internalized inside the cell, suggesting tissue enhancement observed is likely a combination of the intracellular and extracellular compartments.

Described herein is a bioactivatable contrast agent platform for use in clinical trials for lysosomal storage diseases being treated with gene therapy. The chemistry described herein may be optimized to allow for the rapid substitution of functional moieties to generate a large collection of agents to report specifically on the in vivo activity of lysosomal enzymes. In addition to a β-gal specific agent, agents specific for the enzymes missing in Tay-Sachs/Sandhoff (GM2 gangliosidoses), Pompe disease, and mucopolysaccharidosis VII may be developed. The chemical synthesis methods described herein may be optimized to allow for larger scale production and enable translation to large animals and eventually human patients. As described above, the MR agents described herein are activated by β-gal and have undergone preliminary evaluation in vivo using LacZ transgenic mice and in GM1 mice treated by thalamic or IV delivery of AAV9-hGLB1 vector encoding human β-gal enzyme. Two steps in the initial synthesis methods (FIG. 2) may be modified to allow for higher synthetic throughput: 1) alkylation of the aniline in b to produce intermediate c, and 2) the addition of an arm to the tetraazamacrocycle to produce the complete, protected ligand f (FIG. 8).

A different synthesis method for the responsive agent with milder, more efficient conditions and a convergent approach that will maximize yield and purity may be used. This new synthesis describing the intermediate steps and conditions is described in green in FIG. 8 Compound c is a key intermediate and efficient isolation of large quantities is essential to increase synthetic throughput. Prior to that step, the original synthesis proceeds with high efficiency using a Koenigs-Knorr reaction using silver(I) oxide in acetonitrile to produce a, followed by a reduction by catalytic palladium on carbon under a hydrogen atmosphere to produce b. The third step comprises alkylation of the aniline. This aniline is relatively unreactive due to the steric blocking of the ortho sugar and electron donation into the aromatic ring, thus high heat and long reaction times were required to achieve substitution to the alkyl bromide (see FIG. 2).

Under these conditions, significant degradation of the sugar moiety also occurs, complicating purification and significantly lowering yields. Acylation of this aniline under mild conditions using highly-reactive acyl chlorides may be performed. For this reason, reactive electrophiles were investigated and very preliminary results show that the reaction proceeds efficiently at room temperature when the alkyl triflate is used instead of the relatively-unreactive alkyl bromide. This change enables rapid isolation of large quantities of pure product c, unlocking this key step to large-scale batch synthesis of the final probe.

The most significant hurdle in the synthesis (the addition of the completed arm to the macrocycle) will be overcome using a redesigned, convergent strategy (FIG. 8). Additions to tetraazamacrocycles are widely studied due to the broad utility of this scaffold in biological applications. Typically, an excess of the electrophile is needed to obtain adequate conversion. Further, separations of multiple species incorporating the macrocycle (i.e. unreacted starting materials or byproducts) using typical chromatographic techniques are challenges in this field. Further complications produced by side reactions between the sugar moiety and the macrocycle under typical alkylation conditions may also occur. For all of these reasons, it is extremely inefficient as the fifth step of a linear synthetic scheme: precious intermediates must be used in large excess and difficult purification lowers the final yield even further.

To circumvent these issues, a convergent synthetic strategy will be employed. In this new approach, the inefficient macrocycle addition is conducted in a separate branch of the synthesis. Intermediate e can be synthesized in high purity from common starting materials and presents a primary amine for coupling to the sugar arm (FIG. 8). This primary amine will enable rapid, efficient addition of the sugar arm using substitution of an activated mixed carbonate. The mixed carbonate (d) can be easily generated from key intermediate c by treatment with the appropriate chloroformate. This convergent strategy, while it does not reduce the number of linear steps, vastly increases the efficiency of the synthesis by bypassing the low-yielding macrocycle addition step late in the synthesis and using a more reliable coupling strategy.

This synthetic scheme may be used to increase the yields and purities of key intermediates c and f. As a result, this strategy may be used for large-scale production of the β-gal bioresponsive contrast agent for evaluation of its utility in vivo. Further to the above, a number of alternative approaches exist. First, a large number of Lewis acids have been shown to facilitate the formation of the oxazolinium intermediate necessary for the incorporation of the new sugar, and alternative reagents and solvents could be screened for improved conversion or purity. Additionally, the 2-acetylamino 2-deoxy analog of the reactive bromide used in the β-gal synthesis, though reactive, can be generated in situ and subjected to traditional Koenigs-Knorr conditions to achieve this addition. Second, as described above, the formation of the carbamate linkage that couples the immolative sugar arm to the macrocycle is offers a wide array of strategies and reagents to achieve this end.

The agents described herein may be characterized in vivo for GM1 and GM2 gangliosidoses for clinical translation. In particular, the sensitivity, specificity and kinetics of the agents in GM1 mice treated with AAV encoding human β-gal may be determined and quantitative potential may be evaluated in a large brain by testing in GM1 gangliosidosis cats after gene therapy.

The optimal dose of the contrast agents for intravenous and intrathecal administration may be determined. For example, the lowest, most responsive dose of the contrast agent in GM1 mice treated with an AAV9 vector encoding human β-galactosidase (AAV9-hGLB1) may be determined. The data shown in FIG. 5 used a single administration of the contrast agent at 0.2 mmol/kg, which was based on dosing recommended for FDA approved gadolinium-based contrast agents. Preclinical safety studies for intravenous delivery of Magnevist, showed safety to 50× the normal dose. A dose response curve may be generated by administering 100× of the dose with ½ log reductions (20-0.02 mmol/kg), (n=6 per dose, 3 males and 3 females after treatment with AAV9-hGLB1 IV). For intrathecal contrast delivery, Magnevist has been shown to enhance at a 0.004 mmol/kg dose, which is far below the tested dose of 0.06 mmol/kg. Due to solubility of the agent and reduced distensibility of the intrathecal space, the maximum dose achieved will be near what was administered in the previous studies (FIG. 5). Once the maximum soluble concentration is determined, it may be administered as a top dose and the dose may be reduced at ½ log increments (a total of 4 doses; n=6 per dose as above intrathecally) or until loss of signal enhancement. Normal and untreated GM1 mice may be included to determine whether enhancement can be detected with normal GLB1 tissue levels using maximum doses of contrast agent.

MR Imaging:

Mice may be imaged using a high-resolution 3D $T_1$ weighted MRI dynamic sequence, which allows for accurate quantitation of enhancement of any brain region over time. A pre-MRI may be collected immediately before administration of the agent and a second, post-injection dynamic scan will be continued until enhancement stabilization is noted in the tissue of interest (thalamus or liver).

Image Analysis:

MR images may be analyzed in relation to baseline, prior to injection and enhancement thereafter will be determined as shown in FIG. 6 throughout the brain. Areas of enhancement may be determined using a semi-automated process after segmentation using a mouse brain atlas. In the periphery, the same analysis will be performed in the liver, heart, kidney, spleen, pancreas, quadriceps and bladder.

Post Mortem Assessments:

After completion of MRI, mice may be euthanized and trans-cardially perfused with ice cold phosphate buffered saline (PBS). The brain may be removed and sectioned into 6 coronal sections and subdivided into hemispheres. One hemisphere may be flash frozen and stored at −80° C. for quantitation of β-gal enzymatic activity and gadolinium content. The other hemisphere may be fresh frozen in OCT for distribution assessment of β-gal (X-gal histochemical stain). Major organs, liver, spleen, kidney and heart mat be collected in 10% neutral buffered formalin for paraffin sections, flash frozen for enzymatic assays as well as OCT for frozen sections. To look for signs of acute toxicity, blood may be collected for complete blood count (CBC) and serum chemistry (Chem). Blood and CSF may also be collected for enzymatic assay and gadolinium content measurements.

As shown in FIG. 5, GM1 mice were treated with the doses of AAV that were previously shown to be efficacious, but resulted in widespread distribution of β-gal. To determine the sensitivity of the agent, lower doses of AAV may be tested to elucidate levels of enhancement over a range of enzyme activities and/or incomplete distribution. Mice may be treated with AAV at doses of 3E10vg, 1E10 vg or 3E9 vg bilaterally in the thalamus, or 1E12 vg, 3E11 vg, 1E11 vg intravenously. After MRI animals may be euthanized and tissues harvested for postmortem assessment as described above.

The time to peak signal enhancement and signal loss in GM1 mice treated with AAV9-hGLB1 at the full doses by thalamic (3E10vg) or IV (1E12vg) delivery may be evaluated. To quantify the kinetics, a dynamic scan may be performed until the contrast agent enhancement returns to baseline in liver and brain. Normal and untreated GM1 mice may be included as controls. Postmortem analyses for enzymatic assessments and gadolinium content may be performed. The times of clearance of the compound by MRI may be compared with the pharmacokinetics determined as described below.

Pharmacokinetics/Pharmacodynamics of IV and CSF Administration:

After intravenous administration, the pharmacokinetics of gadopentate dimeglumine follows a two-compartment, open-model with a distribution and elimination half-lives of 0.2 and 1.6 hours. Elimination is exclusively through the kidney, with ~83% of the dose excreted in the urine within 6 hours and 91% by 24 hours. The volume of distribution is equal to the extracellular space (~266 mL/kg). It has not been shown to bind to human serum protein. To determine the pharmacokinetics, collect plasma, serum, CSF and urine may be collected after IV or intrathecal administration of compound in normal mice. Appropriate sampling times may be optimized, but an approximate sampling schedule may be at 0, 15 minutes, 30 minutes, and hourly there after until 6 hours and again at 24 hours, 48 hours and 72 hours. For urine, the amount of clearance based on the mass (volume)

and density of urine collected may be evaluated. Tissues may be harvested at each time point. Experiments elucidating the pharmacodynamics may be correlated with the PK data.

Nephrogenic Systemic Fibrosis (NSF) and Gadolinium [Gd(III)] Retention:

Free Gd(III) ions are toxic to biological systems and a suitable ligand or chelate must bind the lanthanide to form a bio-unavailable and nontoxic complex. Several factors influence the stability of chelate complexes including enthalpy and entropy effects (denticity, charge and basicity of coordinating groups, ligand field, and conformational effects). In 2006, concern associated with the use of Gd(III) agents was reported due to an apparent link to a disabling condition known as NSF. Two clinically approved contrast agents have been associated with the onset of NSF: Omniscan, and Magnevist. These are all linear Gd(III) chelates based on the structure of diethylenetriamine penta-acetic acid (DTPA). Linear chelates for Gd(III) are not used herein.

Macrocyclic chelates, like those described here, have significantly higher thermodynamic stability constants than linear chelates and have never been associated with NSF. The reduced thermodynamic stability constants of linear chelates is thought to be the cause of NSF because Gd(III) can be displaced by naturally occurring metals at very low pH. Beyond NSF, safety concerns regarding the retention of Gd(III) in the central nervous system (CNS) have intensified after cases of prolonged signal enhancement in the brain were reported, particularly in patients experiencing repeated contrast administration. The specific nature of the chelate plays a crucial role, with Gd(III) deposition in the CNS from linear chelates. Such deposition is not found with the macrocyclic GBCAs. Additionally, Gd(III) contrast agents have an excellent safety profile, with severe adverse events in only 1 in 40,000 injections. As a result, approximately 40% of clinical MR scans today employ Gd(III) chelates for contrast imaging (>20 million/year).

A macrocyclic framework can be chemically modified without perturbing the binding ability of the ligand or in vivo stability of the metal complex. The macrocyclic ligand 1,4,7,10-tetraazacyclo-dodecane-N,N',N'',N'''-tetracetic acid (DOTA) has been thoroughly studied in laboratory tests involving animals and humans. The complex is conformationally rigid, has an extremely high formation constant (log K=26.5), and displays very slow dissociation kinetics at physiological pH.

In Vivo Assessment of Renal Toxicity.

To determine if there is toxicity associated with the agent, normal mice may undergo repeated IV administration or repeated CSF administration (intrathecal or intracerebroventricular catheter injections depending on feasibility of repeated IT injections) of the optimal dose or vehicle alone, bi-weekly over a two-month period (n=10 per group, 5 males and 5 females). Patents would likely undergo MRI every three months; therefore this dosing interval should predict presence of toxicity. Animals may undergo bi-weekly CBC chemistries and physical examinations. Tissues may be harvested with special emphasis on histopathology. One brain hemisphere may be collected fresh and immediately frozen in liquid nitrogen and stored at −80° C.; the other brain hemisphere may be fixed in formalin for histopathologic evaluation. The major organs and skin may be collected for ICP-MS (Inductively Coupled Mass Spectrometry) to quantify the amount (if any) of Gd(III).

Validation of the β-gal activated contrast agent in a large animal brain. The mouse brain is small and of reduced complexity (lisencephalic), therefore studying the distribution of contrast agent in a larger and more complex brain (with gyri and sulci) may further be employed to assess the feasibility of using it in human patients. To effectively determine the brain biodistribution properties of the agent in a large brain, the agent may be tested the best dose, which may be determined as described herein in GM1 cats after treatment with AAV9 encoding feline β-galactosidase (AAV9-fGLB1). GM1 cats may be treated by bilateral thalamic (1E12 vg) or intravenous injection (1.5E13 vg/kg) and compared to normal and untreated GM1 cat controls. Cats may be imaged using a 7T Siemens Magnetom large bore MRI using a 32-channel head coil (Nova).

A pre-MRI scan may be performed to determine baseline tissue intensity followed by intravenous or intrathecal injection (intrathecal dose based on brain weight a 40-fold increase) of contrast agent and scanning will continue until enhancement declines in the target tissues (thalamus or liver). Maximum enhancement may be measured in the frontal cortex, striatum, parietal cortex, temporal lobe, thalamus, occipital cortex, cerebellum and brainstem. Animals may be euthanized after MRI and tissues harvested for post-mortem analysis. Brain and spinal cord may be cut into 6 mm coronal blocks, and the right brain hemisphere blocks may be frozen in OCT medium for x-gal staining. Alternating sections of the left hemisphere may be snap frozen at −80° C. for enzymatic assays or fixed in 10% neutral buffered formalin. H&E sections may be used for routine evaluation of histopathology throughout the brain. The same analyses may be performed on the heart, liver, spleen, kidney, and skeletal muscle (quadriceps).

The agents described herein may not cross the blood brain barrier (BBB) due to the molecular size of the agent. Therefore, strong enhancement of the brain tissue after intravenous contrast administration may not occur. Accordingly, intrathecal administration of the contrast agent may be preferable, as CSF gains access to the brain by way of the Virchow-Robin spaces and this perivascular area allows for exposure of the brain parenchyma without the limitations imposed by the BBB.

The platform described herein may be expanded for other enzyme targets, including hexoaminidase A (Hex-A), which is missing in the GM2 gangliosidoses (Tay-Sachs/Sandhoff). For example, Hex-A specific agents may be tested in SD mice and Sandhoff (cats) disease treated with gene therapy. Additionally, agents targeting β-glucuronidase, and α-glucosidase may be generated using the platform described herein.

MR agents activated by the enzyme β-glucuronidase (β-gluc) may be developed having a coordinating arm in the bridge that will cleaved (as in the β-gal agent described above) (FIG. 9). Mucopolysaccharidosis type VII (MPS VII), known as Sly syndrome, is caused by mutations in the GUSB gene a progressive condition that affects most tissues and organs. Patients develop mild intellectual impairment, but majority of morbidity is associated with growth retardation, bone deformities and cardiovascular malformations. In 2017, enzyme replacement therapy (ERT) for MPS VII was approved and, as mentioned above, a bio-active contrast agent could be critical to improve the efficiency of enzyme replacement therapy by reporting on β-gluc delivery to individual tissues. While ERT therapy has alleviated many of the morbidities experienced by patients, severe cardiovascular and bony abnormalities persist in the face of treatment. Therefore, this agent may help determine efficacy of new therapeutics targeting these current limitations.

The optimized synthesis of the β-gal agent described above may be applied to synthesize a β-glue sensitive MR contrast agent by incorporating β-glucose rather than β-galactose as the pendant sugar. The synthesis may mirror that described in FIG. 8. Notably, the sugar displays strikingly similar coupling and protecting chemistry to β-galactose and only minor optimization of reaction conditions is needed to incorporate the new sugar moiety. The agent (and intermediates) may be tested in vitro and fully characterized by mass spec, relaxivity measurements, cell-uptake and enzyme kinetics.

Development of an α-Glucosidase Responsive Contrast Agent (Pompe):

This glycogen storage disease is caused by an inherited deficiency of the acid α-glucosidase. The impact of Pompe disease is the accumulation of glycogen in muscle cells that causes irreversible damage. It manifests by insufficient respiratory function and impaired skeletal muscle issues. The optimized synthesis in FIG. 8 may be modified to incorporate α-glucose (FIG. 10). Initial coupling conditions will be modified to favor the α-linkage, rather than β; replacing the silver (I) oxide Lewis acid in step 1 of FIG. 8 with boron trifluoride ethyl etherate ($BF_3OEt_2$) has been shown to accomplish this goal. The agent may be characterized by NMR and Mass spectrometry and be tested with the enzyme to determine the kinetics of processing the agent from dark to bright in an acquired MR image (phantom controls in the presense and absence of the enzyme).

Development of a Hexosaminidase a Responsive Contrast Agent:

The GM2 gangliosidoses (Tay-Sachs and Sandhoff disease) are caused by a deficiency in the enzyme hexosaminidase A (Hex-A). Hex-A cleaves the terminal gal-NAC from GM2 ganglioside, and in the absence of the Hex-A enzyme, GM2 ganglioside builds up in neurons resulting in dysfunction and death. Clinical trials for treatment of GM2 gangliosidosis (Tay-Sachs and Sandhoff disease) are under way in 2019 using AAV gene therapy vectors encoding Hex-A.

β-GalNAc is a 2-acetylamino 2-deoxy derivative of β-galactose and is suitable for the synthesis that is very similar to that described above. The one modification from the proposed synthesis in FIG. 8 is shown at the top of FIG. 11. Because the corresponding 2-acetylamino 2-deoxy glycopyranosyl bromide is unstable, the trans-peracetylated form may be used. As a result of this substitution, traditional Koenigs-Knorr conditions are not preferred for the activation of the anomeric position and addition of 4-hydroxy-3-nitrobenzaldehyde. Rather, trimethylsilyl triflate has been shown to promote efficient additions through an identical oxazolinium intermediate.

Validation of the New Responsive MR Agents (β-Gluc, α-Gluc & Hex-A) In Vitro and In Vivo.

Favorable enzymatic cleavage kinetics and MR activation parameters may be confirmed for each new bio-responsive contrast agent. This may be performed in vitro and in vivo (mice) and may mirror the experimental procedures described for the β-gal agent (FIGS. 5-7). For example, enzyme kinetics may be monitored by HPLC that is equipped with a diode array, fluorescence and an in-line mass spectrometer. This provides data validating that the agent is being enzymatically converted into an active MR contrast agent (see FIG. 2). MR imaging of the injected agent in whole animal studies may be performed to confirm efficacy (following the procedures described for the β-gal agent: (See FIG. 4 and FIG. 5). Fibroblasts from MPS VII and Pompe disease patients may be used to compare with normal controls.

Quantifying Detection Limits of MR Agents.

The detection limit of Gd(III) chelates is dependent on a number of factors that include the molecular relaxivity of the agent, field strength, and the intrinsic $T_1$ values of the tissue being imaged are key components. Therefore, the detection limit may be determined for each imaging scenario. At 9.4T, the lower limit can be approximated to be 10 µM for a Gd(III) chelate with a relaxivity of 7 $mM^{-1}s^{-1}$. (68-72) Cellular uptake and toxicity may be evaluated for all agents using ICP-MS.

Testing of Hex-A Specific Contrast Agent and Identification of Optimal Dosing In Vivo.

The top candidate of the Hex-A responsive contrast agents may be tested in SD mice. The optimal dose of this agent may be determined in SD mice after treatment with gene therapy. Animals may be imaged 4 weeks after treatment with intracranial delivery of the two monocistronic AAV vectors (AAV.rh8_hHex-A; AAV.rh8_hHexB) at a 1:1 ratio using a 3E10 vg total dose. For IV delivery, SD mice treated with the bicistronic AAV9 vector (AAV9 hHex-AB; n=6 per group, equal number of males and females) at a total dose of 4E12 vg may be used. To generate a dose response curve, 100× the dose estimated by in vitro studies may be administered intravenously, and the dose may be reduced by ½ log intervals until signal is lost. Normal and untreated SD mice may be included to determine whether enhancement can be detected with normal HEX-A tissue levels using maximum doses of contrast agent (n=6 per group, 3 males and 3 females). For intrathecal administration, the highest soluble dose with ½ log reductions may be administered until signal is lost. MR imaging may be performed. Postmortem analysis may be performed as described below.

Postmortem Assessments:

After completion of MRI, mice may be euthanized and tissues processed as described above. Histopathology and gadolinium content may be evaluated. To look for signs of acute toxicity, blood may be collected for CBC/Chem. Blood and CSF may also be collected for enzymatic assay and Gd(III) content measurements bu ICP-MS.

Determine Sensitivity of the Optimal Dose.

Various doses of AAV administered intravenously and intracranially in SD mice may be tested. Mice may be treated by 3E10vg, 1E10 vg or 3E9 vg bilaterally in the thalamus or 4E12 vg, 1E12 vg, 4E11 vg intravenously and imaged 1 month later. The optimal contrast agent determined may be administered and MRI and postmortem analysis will be performed.

Mri Kinetics.

The timing of contrast enhancement and signal loss in tissues of interest may be conducted as described above.

Pharmacodynamics of IV and CSF Administration.

Due to the similarity of the compounds, PK/PD studies will be performed as described above.

Safety after Repeated Dosing.

The MRI interval for patients with GM2 gangliosidosis is typically the same as those with GM1 gangliosidosis, therefore the same toxicity evaluations for repeated dosing is applicable. Mice may be injected with the optimal dose biweekly and in life/postmortem monitoring for toxicity may be performed.

Validation of Responsive Contrast Agents in Large Animal Brains.

To evaluate the biodistribution effects in the large animal brain, SD cats may be injected in the thalami or intravenously with AAVs encoding Hex, α-gluc, or β-gluc. The MRI contrast agents may be administered 1 month after treatment using a suitable dose (e.g. the optimal dose as determined above) and compared to normal and untreated SD cat controls. MRI and postmortem analysis may be performed using enzymatic assays using fluorogenic substrates and biodistribution using the histochemical substrate naphthol.

Example 2

β-Galactosidase-Responsive Probes

This example demonstrates the generation of self-immolative β-galactosidase responsive probes and their use for in-vivo imaging in a mouse model.

Magnetic resonance imaging (MRI) is a powerful clinical and research modality capable of excellent spatiotemporal resolution and an unlimited depth of penetration. It is the modality of choice for evaluating many disease, and is a staple of clinical diagnostic radiology due to its tunable soft-tissue contrast, high spatial and temporal resolution, and lack of ionizing radiation. An observed signal is derived from water protons and surrounding tissue. This technique provides high quality tomographic images with an impressive resolution, but it is difficult to generate signal that depends on a specific biochemical reaction.

In order to differentiate regions that are magnetically similar but histologically distinct, paramagnetic probes or contrast agents (CAs) are commonly used. Chelated Gd(III) is the most commonly used magnetic resonance contrast agent. Gd(III) shortens the intrinsic $T_1$ relaxation rates of water, which results in positive contrast in an MR image. $T_1$ modulation is largely due to Gd(III) possessing a slow electron relaxation time and S=7/2 ground state. While free Gd(III) is toxic, it can be made safe by using strong chelating with KD values ≈$10^{25.3}$ m$^{-1}$ for [Gd$^{III}$DOTA]$^-$ measured at ambient temperature. The efficiency of Gd(III) chelates at shortening the $T_1$ of $H_2O$ depends on the chelate's physiochemical properties and is referred to as relaxivity ($r_1$ mM$^{-1}$s$^{-1}$). The observed signal intensity of an MR contrast agent can be modulated by varying one of several physical parameters including: q, the number of bound waters to the GD", the rate of molecular tumbling, and the rate of water exchange. The methods described herein focus on the modulation of the inner-coordination sphere water molecules, or q. This class of chelating ligands is designed to have two distinct states: $r_1$,off—where the Gd(III) is coordinatively saturated and the resulting image is "darker" and $r_1$,on— where water is allowed to access the Gd(III) center resulting in increased image brightness. Gd(III) agents that modulate inner coordination sphere in response to a biochemical event are referred to as q modulated.

Relaxation enhancement by a Gd(III) chelate is described by Eq. 1, with a larger r1 corresponding to a more effective contrast agent:

$$\frac{1}{T_{1,obs}} = \frac{1}{T_{1,d}} + r_1[Gd^{III}]\qquad\text{Eq. 1}$$

Detection of gene expression has been a long-standing area of research for the MR community and the development of new enzyme activated probes will bring MRI closer to the goals of molecular imaging. Reporter genes, such as lacZ produce optically detectable enzyme products that offer insight into the expression landscape of a cell. The lacZ gene produces the enzyme β-galactosidase (β-gal) and has been historically important in the fields of molecular and developmental biology. Moreover, β-gal is incorporated into a large number of model mammalian systems. In vivo detection of lacZ is limited by currently available visualization techniques that require the organism be sacrificed and the tissues of interest stained for the presence of β-gal. A β-gal activated Gd(III) MR probe would overcome this shortcoming and allow for the visualization of gene expression, over time.

Here, two mechanisms for q-modulated contrast agents activated by β-gal were investigated (FIG. 12). The first is an intermolecular approach, wherein a series of structural isomers to were designed to maximize coordination of endogenous $CO_3^{2-}$. The second approach involves an intramolecular mechanism in which a pendant coordinating carboxylate ligand is incorporated with various linker lengths to optimize coordination within the same chelate scaffold. Both of these approaches employ a self-immolative linker that undergoes an electron cascade when the galactose moiety is hydrolyzed by β-gal. This carbamate linker was selected for its rapid kinetics; the galactose substrate is positioned away from the sterically bulky Gd(III) chelate, allowing for easier access by the enzyme. Byproducts of activation include $CO_2$ gas, galactose, and either a nitrophenol (intermolecular) or an alkylated aniline (intramolecular).

The intramolecular activation strategy employed the para-configuration of the self-immolative linker to maximize activation kinetics. A pendant coordinating carboxylate was incorporated via the aniline (reduced from the nitro group) with a 2, 4, 6, or 8 carbon linker (2C, 4C, 6C, 8C respectively). The challenge in achieving intramolecular coordination is to impart enough flexibility to the linker to create a situation where the carboxylate coordination is more favorable than either carbamate or intermolecular $CO_3^{2-}$ coordination. In the presence of the enzyme, both the inter and intramolecular mechanisms self-immolate to the identical product, which was independently synthesized and characterized in this study.

Materials and Methods

General Considerations:

HPLC-grade acetonitrile, methanol, hexanes, ethyl acetate, dichloromethane, and 70% nitric acid were obtained from VWR. Cyclen, GdCl3.6H$_2$O, and Pd/C (10 wt. %) were obtained from Strem. Ethyl 8bromooctanoate was obtained from Santa Cruz Biotechnology. Hydrogen was obtained from Airgas. Triethylamine, N,N-diisopropylethylamine, and acetonitrile were dried using a Glass Contour solvent system. Water was obtained from a Millipore Milli-Q Synthesis purifier. All other reagents and solvents were purchased from Sigma Aldrich and used without further purification. Standard grade 60 Å, 230-400 mesh silica gel (Sorbent Technologies) was used for flash chromatography. Thin layer chromatography (TLC) was performed on EMD 60F 254 silica plates (Macherey-Nagel). Compounds containing unmetalated cyclen derivatives were visualized with an iodoplatinate stain, while all other compounds were visualized with Hanessian's Stain and ninhydrin. NMR spectra were collected on a Brukker Avance III 500 MHz spectrometer equipped with DHC CryoProbe, all spectra are referenced to CDCl$_3$. Electrospray ionization mass spectrometry (ESI-MS) was performed on a Bruker AmaZon X equipped with an Agilent 1200 series HPLC system and a quadrupole ion trap and high-resolution MS spectra were collected on an Agilent 6210 A LC-TOF. The GdIII analogues of the cleaved agent were synthesized as previously reported. The TbIII analogue of this was synthesized in the same manner but metalated with $TbCl_3$. All complexes were purified by semi-preparative HPLC.

Synthesis

Synthesis of "Ethyl DO3 A": 1,4,7,10-Tetraazacyclododecane-1,4,7-tris(ethyl acetate) HBr To a 250 mL RBF were added cyclen (9.5036 g, 55.16 mmol, 1 eq.), sodium acetate (13.575 g, 165.5 mmol, 3 eq.), and dimethyl acetamide (130 mL). Ethyl bromoacetate (18.38 mL, 165.5 mmol, 3 eq.) was added dropwise to the mixture at 0° C. over 30 minutes, and the reaction mixture was allowed to warm to room temperature and stirred for 6 days. The reaction slurry was poured out into 700 mL DI water, producing a clear, yellow solution. The pH was adjusted to 9 with the addition of solid sodium carbonate, and the volume was adjusted to 1300 mL with DI water. KBr (9.5201 g, 79.99 mmol, 1.45 eq.) was added, along with 10 mL diethyl ether. The solution was extracted in batches with chloroform (3 times) and concentrated in vacuo. The remaining yellow liquid was taken up in chloroform and washed 6 times with DI water, then dried over sodium sulfate and concentrated in vacuo. The yellow oil was dissolved in 100 mL ethyl acetate, and an equal portion of diethyl ether was added, forming a cloudy mixture, which was placed in a freezer for three days to allow for precipitation to occur (attempting this procedure too quickly led to an oil instead of the desired solid). The resulting off-white solid was washed with diethyl ether and dried, yielding 10.429 g (37% yield). ESI-MS: m/z (M+H)+: 431.2

TLC Visualization Stains

Iodoplatinate Stain—150 mg $K_2PtCl_6$, 10 mL 1 M HCl, 90 mL $H_2O$, 3 g KI

Hanessian's Stain—2.5 g $(NH_4)_6Mo_7O_{24}$ 4 $H_2O$, 1 g $Ce(NH_4)_4(SO_4)_4$ 2 $H_2O$ Ninhydrin Stain—1.5 g ninhydrin in 100 mL of n-butanol, 3 mL of glacial acetic acid Synthesis of the intermediates and final complexes with the substrate appended at the ortho, meta and para positions of the nitrobenzene core (FIG. 19). Three □-gal activated CAs were designed and synthesized to evaluate intermolecular $CO_3^{2-}$ coordination and subsequent enzymatic activation. Each agent was based around a tri-substituted benzene core where the galactose linkage was ortho (a), meta (b), or para (c) to the benzaldehyde that subsequently becomes a carbamate linkage. The nitro group is in the para position for a and b while it must be in the meta position for c. The carbamate linkage positioned in the para fashion is known to weakly coordinate GdIII, creating an 8-coordinate complex and not allowing for a near q=0 state.30 In the ortho position, the galactose substrate increases steric interactions between the sugar moiety and the macrocycle. We postulated this would decrease the coordination of the carbamate oxygen and facilitate $CO_3^{2-}$ coordination. For completeness, the meta isomer was included to evaluate possible steric interactions.

1-(2-formyl-4-nitrophenyl)-2,3,4,6-tetra-O-acetyl-β-D-galactopyranose (1a): MeCN (120 mL) was added to a 250 mL round bottom flask charged with 2,3,4,6-tetra-O-acetyl-α-Dgalactopyranosyl bromide (3.71 mmol, 1 eq.). Silver(I) oxide (14.8 mmol, 4.0 eq.) was added, followed by 2-hydroxy-5-nitrobenzaldehyde (6.30 mmol, 1.7 eq.). The resulting slurry was stirred in the dark for four hours and monitored for completeness by TLC. The mixture was diluted with EtOAc, filtered through celite, and the filtrate was concentrated in vacuo. The residue was taken up in 200 mL EtOAc and washed six times with saturated sodium bicarbonate (100 mL). The organic layer was dried over sodium sulfate, filtered, and concentrated in vacuo, yielding a white solid (98% yield). 1H NMR (500 MHz, Chloroform-d3) δ 10.34 (s, 1H), 8.73 (d, J=2.65 Hz, 1H), 8.43 (dd, J=9.13, 2.95 Hz, 1H), 7.26 (d, J=7.37 Hz, 1H), 5.63 (dd, J=10.31, 8.25 Hz, 1H), 5.52 (d, J=3.24 Hz, 1H), 5.30 (s, 1H), 5.19 (dd, J=10.31, 3.54 Hz, 1H), 4.10-4.27 (m, 3H), 2.22, 2.09, 2.08, 2.05, (4s, 4×3H); 13C NMR (126 MHz) δ 187.02, 170.28, 170.06, 170.00, 169.31, 162.00, 143.29, 130.14, 125.72, 124.45, 115.67, 98.75, 71.74, 70.21, 67.99, 66.48, 61.24, 20.68, 20.64, 20.55. ESI-MS m/z [M+H]+ 498.07 g/mol.

1-(5-formyl-2-nitrophenyl)-2,3,4,6-tetra-O-acetyl-β-D-galactopyranose (1b): MeCN (35 mL) was added to a 100 mL round bottom flask charged with 2,3,4,6-tetra-O-acetyl-α-Dgalactopyranosyl bromide (7.31 mmol, 1 eq.). Silver(I) oxide (14.6 mmol, 4.0 eq.) was added, followed by 3-hydroxy-4-nitrobenzaldehyde (12.4 mmol, 1.7 eq.), and the resulting slurry was stirred in the dark for four hours and monitored for completeness by TLC. The mixture was diluted with EtOAc, filtered through celite, and the filtrate was concentrated in vacuo. The residue was taken up in EtOAc (50 mL) and washed six times with saturated sodium bicarbonate (100 mL). The organic layer was dried over sodium sulfate, filtered, and concentrated in vacuo, yielding a beige solid (88% yield). 1H NMR (500 MHz, Chloroform-d3) δ 10.05 (s, 1H), 7.897.91 (m, 1H), 7.70 (dd, J=8.17, 1.40 Hz, 1H), 5.57 (dd, J=10.53, 8.78 Hz, 1H), 5.50 (d, J=3.07 Hz, 1H), 5.18 (d, J=7.90 Hz, 1H), 5.13 (dd, J=10.53, 3.51 Hz, 1H), 4.17-4.26 (m, 3H), 2.20 (s, 3H), 2.14 (s, 6H), 2.02 (s, 3H); 13C NMR (126 MHz) δ 189.67, 170.67, 170.16, 170.10, 169.31, 149.60, 144.53, 139.50, 125.67, 125.56, 117.91, 100.39, 77.23, 72.02, 70.40, 67.57, 66.89, 61.94, 20.63, 20.57. ESI-MS m/z [M+H]+: 498.09 g/mol.

1-(4-formyl-2-nitrophenyl-2,3,4,6-tetra-O-acetyl-β-D-galactopyranose (1c): 2,3,4,6-tetra-Oacetyl-α-D-galactopyranosyl bromide (2.4 mmol, 1 eq) and 50 mL MeCN were added to a 100 mL round bottom flask fit with a stir bar were added and stirred to dissolve. Silver(I) oxide (10.7 mmol, 4.5 eq.) was added, followed by 4-hydroxy-3-nitrobenzaldehyde (4.0 mmol, 1.7 eq.), and the resulting slurry was purged with nitrogen and stirred in the dark for four hours. Reaction progress was monitored by TLC. The mixture was diluted with acetonitrile, filtered through celite, and the filtrate was concentrated in vacuo yielding a yellow/brown solid. The solid was dissolved in ethyl acetate (75 mL) and washed with saturated sodium bicarbonate (6×100 mL) and brine (2×100 mL). The organic layer was dried over sodium sulfate, filtered, and concentrated in vacuo. The resulting yellow/white solid was stored at −20° C. in an opaque container (78% yield). 1H NMR (500 MHz, Chloroform-d) δ 9.95 (s, 1H), 8.28 (d, J=2.0 Hz, 1H), 8.04 (dd, J=8.6, 2.1 Hz, 1H), 7.46 (d, J=8.7 Hz, 1H), 5.56 (dd, J=10.4, 7.8 Hz, 1H), 5.49-5.42 (m, 1H), 5.19 (d, J=7.9 Hz, 1H), 5.11 (dd, J=10.4, 3.4 Hz, 1H), 4.28-4.03 (m, 3H), 2.19 (s, 3H), 2.10 (s, 3H), 2.06 (s, 3H), 2.00 (s, 3H). 13C NMR (126 MHz) δ 188.55, 170.24, 170.07, 169.16, 153.45, 141.22, 133.96, 131.46, 126.84, 118.78, 100.07, 77.04, 71.82, 70.35, 67.59, 66.58, 61.36, 20.67, 20.62, 20.60, 20.56. ESI-MS m/z [M+Na]+: 520.10 g/mol.

1-(2-hydroxymethyl-4-nitrophenyl)-2,3,4,6-tetra-O-acetyl-β-D-galactopyranose (2a): A mixture of 1:4 IPA:DCM (60 mL) was added to a 250 mL round bottom flask charged with 1a (6.30 mmol, 1 eq.). Silica gel (5 g) was then added. The reaction mixture was cooled to 0° C. and NaBH4 (75.6 mmol, 12 eq.) was added portion-wise. The reaction was maintained at 0° C. and monitored for completeness by TLC. Upon completion, the mixture was filtered through celite, concentrated in vacuo, and recrystallized from hot ethanol, yielding colorless crystals (53% yield). NMR (500 MHz, Chloroform-d3) δ 8.29 (d, J=2.7 Hz, 1H), 8.17-8.12 (m, 1H), 7.09 (d, J=9.1 Hz, 1H), 5.60-5.49 (m, 2H), 5.31 (s, 1H), 5.19 (ddd, J=14.6, 10.9, 5.6 Hz, 2H), 4.67 (d, J=6.3 Hz, 2H), 4.28-4.11 (m, 4H), 2.77 (t, J=6.4 Hz, 1H), 2.21 (s, 3H), 2.12 (d, J=6.5 Hz, 3H), 2.10-2.07 (m, 3H), 2.06-2.01 (m, 3H). 13C NMR (126 MHz) δ 170.28, 170.10, 170.06, 169.95, 158.60, 143.13, 131.79, 124.69, 124.59, 113.73, 98.66, 71.58, 70.24, 68.43, 66.60, 61.31, 60.25, 20.82, 20.65, 20.64, 20.54. ESI-MS m/z [M+Na]+: 522.10 g/mol.

1-(5-hydroxymethyl-2-nitrophenyl)-2,3,4,6-tetra-O-acetyl-β-D-galactopyranose (2b): A mixture of 1:4 IPA:DCM (32 mL) was added to a 100 mL round bottom flask charged with 1b (3.04 mmol, 1 eq.). Silica gel (5 g) was then added. The reaction slurry was cooled to 0° C. and NaBH4 (36.5 mmol, 12 eq.) was added portion-wise. The slurry was maintained at 0° C. and monitored for completeness by TLC. The mixture was filtered through celite, concentrated in vacuo, and recrystallized from hot ethanol, yielding colorless crystals (49% yield). 1H NMR (500 MHz, Chloroform-d3) δ 7.80 (d, J=8.30 Hz, 1H), 7.43 (s, 1H), 7.14 (d, J=8.3 Hz, 1H), 5.56 (dd, J=10.55, 7.8 Hz, 1H), 5.47 (d, J=3.05 Hz, 1H), 5.10 (dd, J=9.90 Hz, 3.90 Hz, 2H), 4.77 (d, J=5.95 Hz, 2H), 4.24-4.31 (m, 1H), 4.04-4.09 (m, 1H), 4.13-4.21 (m, 1H), 2.19 (s, 3H), 2.13 (s, 3H), 2.07 (s, 3H), 2.02 (s, 3H); 13C NMR (126 MHz) δ 170.28, 170.09, 170.01, 158.16, 155.53, 143.22, 128.01, 124.82, 123.87, 114.26, 99.03, 71.59, 70.39, 68.10, 66.64, 61.37, 60.55, 42.83, 32.23, 20.72, 20.67, 20.65, 20.56. ESI-MS m/z [M-OAc+H]+: 457.26 g/mol.

1-(4-hydroxymethyl-2-nitrophenyl)-2,3,4,6-tetra-O-acetyl-β-D-galactopyranose (2c): A 1:4 mixture of IPA and DCM (300 mL) was added to a 500 mL round bottom flask charged with 1c (8.2 mmol, 1 eq.). Silica gel (5 g), was then added. The reaction slurry was cooled to 0° C. and NaBH4 (98 mmol, 12 eq.) was added portion-wise. The reaction was maintained at 0° C. and monitored for completeness by TLC. The mixture was filtered through celite, concentrated in vacuo, and recrystallized from hot ethanol, yielding pale white crystals (61% yield). 1H NMR (500 MHz, Chloroform-d) δ 7.81 (d, J=1.8 Hz, 1H), 7.52 (dd, J=8.6, 1.9 Hz, 1H), 7.35 (d, J=8.6 Hz, 1H), 5.53 (dd, J=10.5, 8.0 Hz, 1H), 5.47 (d, J=3.1 Hz, 1H), 5.10 (dd, J=10.5, 3.4 Hz, 1H), 5.06 (d, J=8.0 Hz, 1H), 4.73 (s, 2H), 4.30-4.14 (m, 2H), 4.08 (t, J=6.6 Hz, 1H), 2.33 (s, 1H), 2.20 (s, 3H), 2.13 (s, 3H), 2.08 (s, 3H), 2.02 (s, 3H); 13C NMR (126 MHz) δ 170.41, 170.25, 170.21, 169.56, 148.41, 141.23, 137.22, 131.79, 123.22, 119.89, 100.80, 77.31, 77.26, 77.06, 76.80, 71.36, 70.53, 67.83, 66.71, 63.37, 61.34, 20.69, 20.67, 20.59. ESI-MS m/z [M-OAc+H]+: 457.24 g/mol.

1-(2-(2-bromo-ethylcarbamoyloxymethyl)-4-nitrophenyl)-2,3,4,6-tetra-O-acetyl-β-Dgalactopyranose (3a): In a 50 mL round bottom flask under a nitrogen atmosphere and charged with 2a (1.08 mmol, 1 eq.) was added DMF (20 mL). 2-bromoethyl isocyanate (1.13 mmol, 1.05 eq.) was added, and the mixture was stirred at 45° C. for 24 hours. After cooling to room temperature, the solution was taken up in 100 mL EtOAc and washed three times with water and three times with brine. The organic layer was dried over sodium sulfate and concentrated in vacuo. The residue was purified by column chromatography (1% to 5% MeOH in DCM) yielding a clear oil (74% yield). 1H NMR (500 MHz, Chloroform-d3) δ 8.27 (dd, J=14.5, 7.5 Hz, 1H), 8.21-8.14 (m, 1H), 7.16-7.06 (m, 1H), 5.55 (ddd, J=14.8, 11.3, 6.0 Hz, 1H), 5.50 (s, 1H), 5.39 (t, J=5.7 Hz, 1H), 5.24-5.12 (m, 3H), 5.06 (d, J=14.3 Hz, 1H), 4.71-4.64 (m, 1H), 4.28-4.08 (m, 4H), 3.68 (pd, J=11.1, 5.6 Hz, 2H), 3.52 (ddd, J=13.6, 8.8, 4.3 Hz, 2H), 2.21 (s, 3H), 2.12 (d, J=8.9 Hz, 3H), 2.08 (d, J=3.2 Hz, 3H), 2.04 (d, J=2.2 Hz, 3H); 13C NMR (126 MHz) δ 188.60, 170.29, 170.12, 169.21, 153.47, 141.15, 134.02, 131.41, 126.90, 118.72, 100.03, 71.78, 70.34, 67.54, 66.55, 61.36, 60.43, 20.71, 20.66, 20.63, 20.60, 14.22. ESIMS m/z [M+Na]+: 671.06 g/mol.

1-(5-(2-bromo-ethylcarbamoyloxymethyl)-2-nitrophenyl)-2,3,4,6-tetra-O-acetyl-β-D-galactopyranose (3b): In a 100 mL round bottom flask under a nitrogen atmosphere and charged with 2b (3.42 mmol, 1 eq.) was added DMF (60 mL). 2-bromoethyl isocyanate (4.10 mmol, 1.20 eq) was added, and the mixture was stirred at 45° C. for 24 hours. After cooling to room temperature, the solution was taken up in 100 mL of EtOAc and washed three times with water and three times with brine. The organic layer was dried over sodium sulfate and concentrated in vacuo. The residue was purified by column chromatography (1% to 5% MeOH in DCM) yielding a clear oil (74% yield) 1H NMR (500 MHz, Chloroform-d3) δ 7.83-7.77 (m, 1H), 7.46-7.36 (m, 1H), 7.17-7.11 (m, 1H), 5.57 (ddd, J=10.4, 9.2, 5.2 Hz, 1H), 5.48 (t, J=3.4 Hz, 1H), 5.19-5.08 (m, 3H), 4.77 (s, 1H), 4.52-4.05 (m, 4H), 3.79-3.38 (m, 3H), 2.22-2.17 (m, 3H), 2.16-2.12 (m, 3H), 2.11-2.06 (m, 3H), 2.01 (d, J=9.0 Hz, 3H). 13C NMR (126 MHz) δ 170.63, 179.21, 170.13, 169.45, 149.61, 147.91, 140.22, 125.36, 121.23, 117.70, 100.65, 71.74, 70.56, 67.88, 67.01, 63, 86, 61.81, 20.68 20.65, 20.58. ESI-MS m/z [M+Na]+: 671.07 g/mol.

1-(4-(2-bromo-ethylcarbamoyloxymethyl)-2-nitrophenyl)-2,3,4,6-tetra-O-acetyl-β-Dgalactopyranose (3c): DMF (20 mL) was added to a 100 mL round bottom flask charged with 2c (5.21 mmol, 1 eq.). DMAP (7.77 mmol, 1.5 eq) and 2-bromoethyl isocyanate (7.77 mmol, 1.5 eq) were added, and the mixture was stirred at 45° C. for 24 hours. After cooling to room temperature, the solution was taken up in 100 mL EtOAc and washed three times with water and three times with brine. The organic layer was dried over sodium sulfate and concentrated in vacuo. The residue was purified by column chromatography (1% to 5% MeOH in DCM) yielding a clear oil (39% yield). 1H NMR (500 MHz, Chloroform-d3) δ 7.81 (s, 1H), 7.52 (d, J=7.5 Hz, 1H), 7.35 (d, J=8.2 Hz, 1H), 7.25 (d, J=7.0 Hz, 1H), 7.18 (d, J=5.5 Hz, 1H), 5.55 (t, J=8.7 Hz, 1H), 5.47 (s, 1H), 5.29 (s, 1H), 5.15-5.03 (m, 4H), 4.29-4.21 (m, 1H), 4.21-4.13 (m, 1H), 4.08 (s, 1H), 3.52 (dd, J=64.5, 29.6 Hz, 4H), 2.36 (s, 1H), 2.19 (s, 3H), 2.13 (s, 3H), 2.08 (s, 3H), 2.02 (s, 3H); 13C NMR (126 MHz) δ 170.34, 170.19, 170.16, 169.41, 155.67, 149.01, 141.16, 133.22, 132.59, 124.68, 119.73, 100.69, 71.41, 70.49, 67.74, 66.67, 64.99, 61.32, 42.74, 32.31, 20.70, 20.66, 20.59. ESI-MS m/z [M+Na]+671.09 g/mol.

1-(2-(2-(1-(4,7,10-trisethylcarboxymethyl-(1,4,7,10-tetraazacyclododecyl)))ethylcarbamoyloxymethyl)-4-nitrophenyl)-2,3,4,6-tetra-O-acetyl-β-D-galactopyranose (4a): Ethyl DO3 A (1.69 mmol, 1.2 eq) and K₂CO₃ (1.69 mmol, 1.5 eq) were added to a stirring solution of 3a (1.30 mmol, 1 eq.) in MeCN (15 mL). The mixture was stirred at 40° C. under nitrogen for 48 hours. The mixture was concentrated in vacuo and purified by column chromatography (10% MeOH in DCM) to yield a light yellow oil (16% yield). ESI-MS m/z [M+H]+: 998.9 g/mol.

1-(5-(2-(1-(4,7,10-trisethylcarboxymethyl-(1,4,7,10-tetraazacyclododecyl)))ethylcarbamoyloxymethyl)-2-nitrophenyl)-2,3,4,6-tetra-O-acetyl-β-D-galactopyranose (4b): Ethyl DO3 A (3.24 mmol, 1.2 eq) and K₂CO₃ (5.13 mmol, 1.5 eq) were added to a stirring solution of 3b (3.42 mmol, 1 eq.) in MeCN (20 mL). The mixture was stirred at 40° C. under nitrogen for 48 hours. The mixture was concentrated in vacuo and purified by column chromatography (10%

MeOH in DCM) to yield a light yellow oil (47% yield). ESI-MS m/z [M+H]+: 999.60 g/mol.

1-(4-(2-(1-(4,7,10-trisethylcarboxymethyl-(1,4,7,10-tetraazacyclododecyl))) ethylcarbamoyloxymethyl)-2-nitrophenyl)-2,3,4,6-tetra-O-acetyl-β-D-galactopyranose (4c): Ethyl DO3 A (3.59 mmol, 1.2 eq) and $Cs_2CO_3$ (4.48 mmol, 1.5 eq) were added to a stirring solution of 3c (2.99 mmol, 1 eq.) in MeCN (100 mL), The mixture was stirred at 40° C. under nitrogen for 48 hours. The mixture was concentrated in vacuo and purified by column chromatography (10% MeOH in DCM) to yield a light yellow oil (13% yield). ESI-MS m/z [M+H]+ 999.66 g/mol.

Synthesis of the Gd(III) and Tb(III) Complexes (5a-c)

Deprotection and Metalation Procedure with Gd(III) and Tb(III)

In a 100 mL round bottom flask the penultimate compound (4a-c, 9a-d) was suspended in 10 mL of 1 M NaOH and stirred at 0° C. in a nitrogen atmosphere for one hour. During this time the ethyl and acetate protecting groups were globally removed, driving the solids into solution. The pH was adjusted to between 5.5-6 using 1 M HCl and the corresponding $Ln(Cl3) \cdot 6H2O$ (Ln=Gd or Tb) was added. The metalation was stirred at room temperature under a nitrogen atmosphere for 1-3 days. During the course of the reaction, a pH of 5.5-6 was maintained with small additions of 1 M NaOH until no further change in pH was observed. When the reaction was complete, the pH of the reaction mixture was brought to 12 using 1 M NaOH to precipitate excess, unchelated $Ln(OH)_3$ that was removed by two successive rounds of centrifugation and decanting. The resulting supernatant was lyophilized to yield fluffy solids. Final complexes were purified by semi-preparative HPLC and characterized by high-resolution ESI-MS. NMR analysis of these compounds could not be used due to paramagnetic line broadening from the presence of the LnIII.

Gadolinium(III)-1-(2-(2-(1-(4,7,10-triscarboxymethyl-(1,4,7,10tetraazacyclododecyl)))ethylcarbamoyloxymethyl)-4-nitrophenyl)-β-D-galactopyranose (5a, ortho): (16% yield) ESI-MS m/z [M+H]– calcd: 903.20 g/mol, observed: 903.19 g/mol.

Terbium(III)-1-(2-(2-(1-(4,7,10-triscarboxymethyl-(1,4,7,10tetraazacyclododecyl)))ethylcarbamoyloxymethyl)-4-nitrophenyl)-β-D-galactopyranose (5a', ortho): (17% yield) ESI-MS m/z [M+Na]+ calcd: 925.19 g/mol, observed: 925.20/mol.

Gadolinium(III)-1-(5-(2-(1-(4,7,10-triscarboxymethyl-(1,4,7,10tetraazacyclododecyl)))ethylcarbamoyloxymethyl)-2-nitrophenyl)-β-D-galactopyranose (5b, meta): (15% yield) ESI-MS m/z [M+H]+ calcd: 903.20 g/mol, observed: 903.33/mol.

Terbium(III)-1-(5-(2-(1-(4,7,10-triscarboxymethyl-(1,4,7,10tetraazacyclododecyl)))ethylcarbamoyloxymethyl)-2-nitrophenyl)-β-D-galactopyranose (5b', meta): (8% yield) ESI-MS m/z [M+Na]+ calcd: 925.19 g/mol, observed: 925.20/mol.

Gadolinium(III)-1-(4-(2-(1-(4,7,10-triscarboxymethyl-(1,4,7,10tetraazacyclododecyl)))ethylcarbamoyloxymethyl)-2-nitrophenyl)-β-D-galactopyranose (5b, para): (12% yield) ESI-MS m/z [M+H]+ calcd: 903.20 g/mol, observed: 903.20/mol.

Terbium(III)-1-(4-(2-(1-(4,7,10-triscarboxymethyl-(1,4,7,10tetraazacyclododecyl)))ethylcarbamoyloxymethyl)-2-nitrophenyl)-β-D-galactopyranose (5c', para): (10% yield) ESI-MS m/z [M+Na]+ calcd: 925.62 g/mol, observed: 925.64/mol.

Intermolecular Design: Enzyme kinetics, determination of q, relaxivity measurements and X-Ray structure. The intermolecular approach improves endogenous carbonate binding by modulating steric bulk around the aromatic ring, placing the galactose substrate either ortho, meta, or para to the aromatic ring (FIG. 19). The carbamate oxygen of the linker has been found to weakly coordinate the GdIII center. Placing the pendant galactose ortho may increase steric interactions between the sugar and macrocycle, reducing the interaction between the carbamate oxygen and the GdIII center. This may favor the more effective bidentate coordination of $CO3^{2-}$, reducing the relaxivity prior to enzyme activation and maximizing signal enhancement.

Previous generations of □-gal sensitive MR contrast agents were reported to have very slow kinetics (>1200 min) unsuitable for Michaelis-Menten analysis. These poor catalytic efficiencies may be attributed to the close proximity between the enzyme substrate and the sterically demanding chelate in these complexes (FIG. 12). For both the intermolecular and intramolecular series investigated in this study, the distance between the galactose and the chelate has been increased by the inclusion of a self-immolative linker to improve enzyme kinetics. Enzyme kinetics of the self-immolative linker indeed allow for measurable rates, similar in magnitude to their small molecule counterparts (ONPG and PNPG) (Table 2).

Catalytic efficiencies for five substrates, 5a-c, ONPG, and PNPG were evaluated by UV-vis spectroscopy (Table 3). ONPG and PNPG are literature standards that were used to ensure the assay was performed adequately and to serve as benchmarks of activation kinetics in the absence of the GdIII chelate. The para complex (5c) has the most favorable kinetics, with the highest catalytic efficiency as defined by the Michaelis-Menten steady state approximation $k_{cat}/K_m = 5.93$ $M^{-1}s^{-1}$. Catalytic efficiency is directly related to the imaging window wherein activation to the r1, on state is competing with clearance. Despite the fact that the kinetic rate of 5c is nearly an order of magnitude slower than PNPG, the catalytic efficiencies of the two are comparable. In contrast, the ortho (5a) and meta (5b) have less desirable catalytic efficiencies $k_{cat}/K_m = 2.34$ $M^{-1}$ $s^{-1}$ and 0.90 $M^{-1}$ $s^{-1}$, respectively.

It should be noted here that the meta isomer (5b) cannot undergo the same electron cascade as 5a and 5c as the mechanism is predicated on the hydroxyl positioned para to the benzyl-oxygen (FIG. 19). 5b does however, have significant absorbance from the free nitrophenol at 420 nm. Analogous kinetic measurements for the intramolecular approach were not possible without the nitro as a spectroscopic handle.

An alternative reaction cleavage mechanism for 5b is described in FIG. 21. Structural evidence for this mechanism can be deduced from the crystal structure which was isolated as a degradation product from HPLC purification (FIG. 22). The complex crystallizes as a dimer where each GdIII ion is nonacoordinate, where 7 coordination sites are afforded from the DO3 A scaffold, four from the cyclen N (Ncyclen) and three from the carboxy-O (Ocarboxy). The final two coordination sites are afforded from the co-crystallized molecule phenoxy-O (Ophenoxy) and nitro-O (Onitro). The average GdIII-Ncyclen bond length is 2.64(2) Å with an average ∠Ocarboxy-GdIII-Ncyclen 71.55° and ∠Ncyclen-GdIII-Ncyclen 68.51°. The average GdIII-Ophenoxy bond length is 2.30(3) Å and the average GdIII Onitro bond length is somewhat longer 2.51(7) Å.

X-Ray Structure Determination

Single crystals of the "partially" activated complex (5b) after enzymatic cleavage, the Gd(III) analogue were obtained by the addition of aqueous $NaPF_6$ followed by diffusion of acetonitrile. The yellow tablet crystal was mounted using oil Infineum V8612 on a glass fiber. All measurements were made on a Bruker Apex-II CCD Diffractometer with graphite monochromatic Cu☐☐ radiation. Data were processed using SINTPLUS by direct methods and expanded using Fourier techniques using the Bruker SHELXTL3.

Intermolecular Design: q measurements, intermolecular carbonate coordination:

The q number in the absence and presence of $CO_3^{2-}$ was determined using TbIII analogues (5a', 5b', 5c', and 11'). Given the similarities in chemistry amongst the lanthanides, TbIII luminescence is a convenient and established method for determining the coordination environment in corresponding GdIII chelates. The narrow $5D_3 \rightarrow 7F_2$ emission at 543 nm and the relatively long lived 0.4 ms excited state lifetime for $Tb(H_2O)_x$ facilitates accurate assessment of the inner-coordination sphere, differentiating between coordination of OH, OD, NH, and ND oscillators. 38 Luminescent decay curves were fit to the empirically derived Horrock's equation (Eq. 2). It was expected that the ortho position would have the lowest q in the presence of $CO_3^{2-}$, creating a "dark" state with the lowest relaxivity.

The q values are reported in pure water and MOPS/$CO_3^{2-}$ buffer for 5a', 5b', 5c', and 11' (Table 1). 5a' shows the highest q (1.1) in pure water, likely due to a decrease in the affinity of the carbamate oxygen for the GdIII center. The carbamate affinity was increased in 5b' and 5c' (meta/para) compared to 5a', where both displayed lower q values 0.4 and 0.7 respectively. In MOPS/$CO_3^{2-}$ buffer at pH=7.4 all three complexes 5a'-c' have comparable coordination environments indicating the $CO_3^{2-}$ is able to outcompete the carbamate oxygen. Thus, isomeric position of the galactose does not significantly modulate the ability of $CO_3^{2-}$ to coordinate the GdIII ion. This is in contrast to the q=1 activated complex 11' in both pure water and MOPS/$CO_3^{2-}$.

Intermolecular Design: Relaxivity Measurements

While measurements of q indicate how well an agent can restrict water access to the GdIII center, the most important property for a bio-activated contrast agent is the change in relaxivity upon enzymatic cleavage (r1). To evaluate the signal change in the presence of $CO_3^{2-}$, relaxivities of the intermolecular activated agents were measured in two different buffer conditions, the non-coordinating buffer MOPS and MOPS/$CO_3^{2-}$.

FIG. 13a shows each r1 value plotted individually for 5a-c as well as the cleaved agent 11 (see FIG. 1 in the main manuscript) both buffer conditions. Importantly, 11 does not change relaxivity in the presence of $CO_3^{2-}$, suggesting that the free amine is stably coordinated to the GdIII center, yielding an 8-coordinate q=1 complex. Additionally, all of the complexes show a decrease in r1 in the presence of $CO_3^{2-}$ due to the restriction of inner-sphere water molecules as a result of bidentate carbonate binding. FIG. 13b shows the r1 values of each of the agents in the intermolecular series. Here, r1 is reported as a percent change in relaxivity when going from the "dark" to the "bright" state. For a bioactivated contrast agent to be considered applicable in vivo, a positive r1 of at least 20% is necessary for validation in the resulting MR image. The meta complex 5b meets this benchmark with a r1 of 26% relative to the cleaved complex (11) (FIG. 13b). However, this complex cannot undergo the electron cascade, and the change in q upon activation is minimal. Both the ortho and para configurations (5a and 5c) have a negative r1 and would result in a "bright" to "dark" signal change in the resulting image, which is undesirable for distinguishing molecular activation.

Synthesis of the Intramolecular Intermediates and Lanthanide Complexes (10a-d) 2-amino-4-(hydroxymethyl)phenyl-2,3,4,6-tetra-O-acetyl-β-D-galactopyranose 6 (see FIG. 20) (1.3 mmol) and MeOH:DCM (60 mL, 3:5 mixture) were added to a 250 mL, two-necked flask fit with a stir bar. An inert nitrogen atmosphere was established followed by the addition of a catalytic amount of Pd/C (10 wt. %). A hydrogen atmosphere (1 atm.) was established and the reaction was stirred for four hours (monitored by TLC, visualizing the appearance of the aniline by ninhydrin stain). The mixture was then filtered through celite and concentrated in vacuo. The resulting solid was purified by silica gel chromatography (2-5% MeOH in DCM) resulting in a white foam (52% yield). 1H NMR (500 MHz, Chloroform-d) δ 6.88 (d, J=8.2 Hz, 1H), 6.69 (d, J=2.0 Hz, 1H), 6.61 (dd, J=8.2, 2.0 Hz, 1H), 5.50-5.38 (m, 2H), 5.10 (dd, J=10.5, 3.4 Hz, 1H), 4.92 (d, J=7.9 Hz, 1H), 4.50 (s, 2H), 4.22 (dd, J=11.3, 7.0 Hz, 1H), 4.14 (dd, J=11.3, 6.3 Hz, 1H), 4.04 (ddd, J=7.0, 6.2, 1.2 Hz, 1H), 3.84 (s, 2H), 2.16 (s, 3H), 2.07 (s, 3H), 2.04 (s, 3H), 2.00 (s, 3H). 13C NMR (126 MHz) δ 170.41, 170.27, 170.12, 170.10, 143.92, 137.54, 137.00, 116.59, 115.74, 114.37, 100.86, 77.34, 77.29, 77.09, 76.83, 71.01, 70.58, 68.83, 66.88, 64.90, 61.33, 20.93, 20.66, 20.65, 20.59. ESI-MS m/z [M+Na]+: 492.1 g/mol.

4-hydroxymethyl-2-((2-ethoxy-2-oxoethyl)amino)-phenyl-2,3,4,6-tetra-O-acetyl-β-D-galactopyranose (7a): 6 (0.27 mmol, 1 eq.) was dissolved in 10 mL MeCN and added to a 50 mL round bottom flask. KI (67 μmol, 0.25 eq.) was added followed by DIPEA (0.54 mmol, 2 eq.). Ethyl bromoacetate (0.5364 mmol, 2 eq.) was then added in four portions, with two hours between each addition, and the mixture was refluxed for 2 days. The resulting mixture was adsorbed to silica and concentrated in vacuo, followed by purification via silica gel chromatography (1-4% MeOH in DCM) yielding a white foam (69% yield). 1H NMR (500 MHz, Chloroform-d) δ 6.92 (s, 1H), 6.62 (s, 1H), 6.51 (s, 1H), 5.51 (s, 1H), 5.45 (s, 1H), 5.11 (s, 1H), 4.96 (s, 1H), 4.56 (s, 2H), 4.20 (s, 4H), 4.05 (s, 1H), 3.91 (s, 2H), 2.18 (s, 3H), 2.09 (s, 3H), 2.05 (s, 3H), 2.01 (s, 3H), 1.27 (s, 3H). 13C NMR (126 MHz) δ 170.69, 170.37, 170.26, 170.13, 170.10, 143.88, 138.35, 136.99, 115.64, 115.38, 109.45, 100.80, 77.29, 77.25, 77.04, 76.78, 71.03, 70.68, 68.74, 66.88, 65.40, 61.35, 61.18, 45.39, 20.85, 20.68, 20.60, 14.23. ESI-MS m/z [M+Na]+: 578.2 g/mol.

4-hydroxymethyl-2-((4-ethoxy-4-oxobutyl)amino)-phenyl-2,3,4,6-tetra-O-acetyl-β-D-galactopyranose (7b): 6 (0.59 g, 1.26 mmol 1 eq.) and 30 mL toluene were added to a 100 mL round bottom flask fit with a stir bar. KI (1.26 mmol, 1 eq.) was added, followed by triethylamine (5.1 mmol, 4 eq.) and ethyl 4bromobutyrate (5.1 mmol, 4 eq.) and the mixture was stirred at 90° C. for 2 days. The resulting mixture was adsorbed to silica and concentrated in vacuo, followed by silica gel chromatography (1-4% MeOH in DCM) yielding a clear oil (84% yield). 1H NMR (500 MHz, Chloroform-d) δ 6.86 (s, 1H), 6.63 (s, 1H), 6.57 (s, 1H), 5.47 (s, 2H), 5.12 (s, 1H), 4.95 (s, 1H), 4.58 (s, 2H), 4.15 (s, 5H), 4.06 (s, 1H), 3.17 (s, 2H), 2.44 (s, 2H), 2.19 (s, 3H), 2.08 (s, 3H), 2.06 (s, 3H), 2.02 (s, 3H), 1.95 (s, 2H), 1.26 (s, 4H). 13C NMR (126 MHz) δ 173.22, 170.36, 170.22, 170.10, 170.05, 143.59, 139.10, 136.88, 114.41, 114.21, 109.15, 100.63, 77.28, 77.23, 77.03, 76.78, 71.02, 70.50, 68.86, 66.82, 65.57, 61.33, 60.45, 42.59, 31.67, 24.61, 20.95, 20.67, 20.60, 14.25. ESIMS m/z [M+Na]+: 606.2 g/mol.

4-hydroxymethyl-2-((6-ethoxy-6-oxohexyl)amino)-phenyl-2,3,4,6-tetra-O-acetyl-β-D-galactopyranose (7c): 6 (0.63 mmol, 1 eq.) was added to a 50 mL round bottom flask fit with a stir bar. The solid was suspended in toluene (15 mL) and KI (0.63 mmol, 1 eq.) was added. Triethylamine (3.1 mmol, 5 eq.) and ethyl 6bromohexanoate (3.1 mmol, 5 eq.) were added and a nitrogen atmosphere was established. The mixture was stirred at 90° C. for 2 days yielding a brown solution. The resulting mixture was adsorbed to silica and concentrated in vacuo, followed by purification via silica gel chromatography (1-4% MeOH in DCM) yielding a yellow oil (62% yield). 1H NMR (500 MHz, Chloroform-d) δ 6.84 (d, J=8.1 Hz, 1H), 6.58 (s, 1H), 6.53 (s, 1H), 5.44 (s, 2H), 5.10 (s, 1H), 4.93 (s, 1H), 4.55 (s, 2H), 4.12 (s, 6H), 3.07 (s, 2H), 2.30 (s, 2H), 2.16 (s, 3H), 2.04 (s, 6H), 1.99 (s, 3H), 1.64 (s, 4H), 1.43 (s, 2H), 1.23 (s, 3H). 13C NMR (126 MHz) δ 173.68, 170.35, 170.23, 170.04, 170.00, 143.50, 139.29, 136.93, 114.15, 114.13, 109.10, 100.57, 77.36, 77.31, 77.11, 76.86, 70.96, 70.49, 68.84, 66.85, 65.43, 61.34, 60.39, 60.26, 43.20, 34.23, 34.16, 29.05, 26.60, 24.75, 21.03, 20.95, 20.64, 20.57, 14.24, 14.19. ESI-MS m/z [M+Na]+: 634.2 g/mol.

4-hydroxymethyl-2-((8-ethoxy-8-oxooctyl)amino)-phenyl-2,3,4,6-tetra-O-acetyl-β-D-galactopyranose (7d): 6 (0.63 mmol, 1 eq.) was added to a 50 mL round bottom flask fit with a stir bar. The solid was suspended in toluene (15 mL) and KI (0.63 mmol, 1 eq.) was added. Triethylamine (3.1 mmol, 5 eq.) and ethyl 8-bromooctanoate (3.1 mmol, 5 eq.) were added and a nitrogen atmosphere was established. The mixture was stirred at 90° C. for 2 days yielding a brown solution. The resulting mixture was adsorbed to silica and concentrated in vacuo, followed by purification via silica gel chromatography (1-4% MeOH in DCM) yielding a yellow oil (0.1850 g, 36% yield). 1H NMR (500 MHz, Chloroform-d) δ 6.84 (s, 1H), 6.58 (s, 1H), 6.53 (s, 1H), 5.44 (s, 2H), 5.10 (s, 1H), 4.92 (s, 1H), 4.55 (s, 2H), 4.13 (s, 6H), 3.06 (s, 2H), 2.27 (s, 2H), 2.16 (s, 3H), 2.04 (s, 6H), 1.99 (s, 4H), 1.60 (s, 4H), 1.35 (s, 6H), 1.22 (s, 3H). 13C NMR (126 MHz) δ 172.84, 169.33, 169.22, 169.02, 168.95, 142.50, 138.38, 135.94, 113.22, 113.06, 108.08, 99.61, 76.35, 76.30, 76.10, 75.84, 69.95, 69.50, 67.81, 65.85, 64.44, 60.33, 59.17, 42.38, 33.30, 28.30, 28.05, 28.03, 27.96, 27.86, 27.55, 25.90, 23.89, 19.93, 19.63, 19.56, 13.24. ESI-MS m/z [M+Na]+: 662.3 g/mol.

4-(2-bromo-ethylcarbamoyloxymethyl)-2-((2-ethoxy-2-oxoethyl)amino)-phenyl-2,3,4,6-tetra-O-acetylβ-D-galactopyranose (8a): 7a (0.60 mmol, 1 eq.) and DMAP (0.15 mmol, 0.25 eq.) were added to a 100 mL round bottom flask fit with a stir bar. The solids were dissolved in dry DCM and a nitrogen atmosphere was established. 2-bromoethyl isocyanate (0.90 mmol, 1.5 eq.) was slowly added and the reaction was stirred at room temperature for 3 days (monitored by TLC). Solvent was removed in vacuo. The product was purified via silica gel chromatography (1-3% MeOH in DCM), yielding a yellow oil (64% yield). 1H NMR (500 MHz, Chloroform-d) δ 6.89 (s, 1H), 6.62 (s, 1H), 6.45 (s, 1H), 5.46 (d, J=31.7 Hz, 2H), 5.12 (d, J=27.5 Hz, 2H), 4.96 (s, 3H), 4.81 (s, 1H), 4.18 (s, 4H), 4.03 (s, 1H), 3.88 (s, 2H), 3.56 (s, 2H), 3.44 (s, 2H), 2.16 (s, 3H), 2.07 (s, 3H), 2.03 (s, 3H), 1.99 (s, 3H), 1.25 (s, 4H). 13C NMR (126 MHz) δ 169.55, 169.33, 169.22, 169.07, 169.05, 155.12, 143.25, 137.24, 131.05, 116.11, 114.15, 109.58, 99.62, 76.28, 76.23, 76.03, 75.95, 75.77, 70.04, 69.62, 67.67, 66.11, 65.83, 60.33, 60.18, 44.35, 41.72, 31.48, 19.82, 19.65, 19.57, 13.21, 13.18. ESIMS m/z [M+Na]+: 727.2 g/mol.

4-(2-bromo-ethylcarbamoyloxymethyl)-2-((4-ethoxy-4-oxobutyl)amino)-phenyl-2,3,4,6-tetra-Oacetyl-β-D-galactopyranose (8b): 7b (0.14 mmol, 1 eq.) and DMAP (34 μmol, 0.25 eq.) were added to a 25 mL round bottom flask fit with a stir bar. The solids were dissolved in dry DCM (10 mL) and a nitrogen atmosphere was established. 2-bromoethyl isocyanate (0.21 mmol, 1.5 eq.) was slowly added and the reaction was stirred at room temperature for 3 days (monitored by TLC). Solvent was removed in vacuo. The product was purified via silica gel chromatography (1-3% MeOH in DCM), yielding a white foam (76% yield). 1H NMR (500 MHz, Chloroform-d) δ 6.59 (d, J=12.1 Hz, 2H), 5.47 (s, 2H), 5.21 (s, 1H), 5.12 (s, 1H), 5.01 (s, 2H), 4.95 (s, 1H), 4.29 (s, 1H), 4.17 (s, 5H), 4.06 (s, 1H), 3.60 (s, 2H), 3.47 (s, 2H), 3.16 (s, 2H), 2.44 (s, 2H), 2.18 (s, 3H), 2.07 (s, 6H), 2.02 (s, 3H), 1.94 (s, 2H), 1.60 (s, 2H), 1.26 (s, 3H). 13C NMR (126 MHz) δ 173.23, 170.35, 170.20, 170.11, 170.03, 143.94, 139.02, 131.98, 115.77, 114.01, 110.16, 100.51, 77.28, 77.23, 77.03, 76.96, 76.77, 71.05, 70.46, 68.84, 67.25, 66.81, 61.34, 60.46, 42.77, 42.56, 32.55, 31.65, 24.54, 20.95, 20.69, 20.67, 20.60, 14.26. ESI-MS m/z [M+Na]+: 755.2 g/mol.

4-(2-bromo-ethylcarbamoyloxymethyl)-2-((6-ethoxy-6-oxohexyl)amino)-phenyl-2,3,4,6-tetra-Oacetyl-β-D-galactopyranose (8c): 7c (0.24 mmol, 1 eq.) and DMAP (96 μmol, 0.25 eq.) were added to a 25 mL round bottom flask fit with a stir bar. The solids were dissolved in dry DCM (10 mL) and a nitrogen atmosphere was established. 2-bromoethyl isocyanate (0.58 mmol, 1.5 eq.) was slowly added and the reaction was stirred at room temperature for 3 days (monitored by TLC). Solvent was removed in vacuo. The product was purified via silica gel chromatography (1-3% MeOH in DCM), yielding a clear oil (91% yield). 1H NMR (500 MHz, Chloroform-d) δ 6.85 (s, 1H), 6.56 (s, 2H), 5.46 (s, 2H), 5.22 (s, 1H), 5.11 (s, 1H), 4.99 (s, 2H), 4.94 (s, 1H), 4.14 (s, 6H), 3.58 (s, 2H), 3.45 (s, 2H), 3.08 (s, 2H), 2.32 (s, 2H), 2.17 (s, 3H), 2.05 (s, 6H), 2.01 (s, 3H), 1.67 (s, 4H), 1.45 (s, 2H), 1.24 (s, 3H). 13C NMR (126 MHz) δ 173.68, 170.34, 170.20, 170.03, 170.01, 156.22, 143.94, 139.25, 131.93, 115.62, 113.93, 110.16, 100.47, 77.32, 77.26, 77.06, 76.81, 71.02, 70.46, 68.80, 67.33, 66.82, 61.35, 60.27, 43.15, 42.76, 34.24, 32.51, 29.02, 26.61, 24.76, 20.97, 20.68, 20.66, 20.59, 14.27. ESI-MS m/z [M+Na]+: 783.2 g/mol.

4-(2-bromo-ethylcarbamoyloxymethyl)-2-((8-ethoxy-8-oxooctyl)amino)-phenyl-2,3,4,6-tetra-O-acetylβ-D-galactopyranose (8d): 7d (0.24 mmol, 1 eq.) and DMAP (72 μmol, 0.25 eq.) were added to a 25 mL round bottom flask fit with a stir bar. The solids were dissolved in dry DCM (10 mL) and a nitrogen atmosphere was established. 2-bromoethyl isocyanate (0.43 mmol, 1.5 eq.) was slowly added and the reaction was stirred at room temperature for 3 days (monitored by TLC). Solvent was removed in vacuo. The product was purified via silica gel chromatography (1-3% MeOH in DCM), yielding a clear oil (58% yield). 1H NMR (500 MHz, Chloroform-d) δ 6.85 (s, 1H), 6.55 (s, 2H), 5.45 (s, 2H), 5.21 (s, 1H), 5.11 (s, 1H), 5.00 (s, 2H), 4.94 (s, 1H), 4.13 (s, 6H), 3.58 (s, 2H), 3.44 (s, 2H), 3.06 (s, 2H), 2.28 (s, 2H), 2.17 (s, 3H), 2.05 (s, 6H), 2.00 (s, 3H), 1.61 (s, 4H), 1.37 (s, 6H), 1.23 (s, 3H). 13C NMR (126 MHz) δ 173.82, 170.33, 170.20, 170.02, 169.96, 156.22, 143.94, 139.35, 131.93, 115.58, 114.02, 110.21, 100.51, 77.33, 77.28, 77.08, 76.82, 71.01, 70.48, 68.78, 67.37, 66.83, 64.32, 61.35, 60.18, 43.35, 42.76, 34.34, 34.30, 32.51, 29.30, 29.10, 29.07, 28.99, 28.89, 28.58, 26.94, 25.75, 24.93, 24.86, 20.96, 20.68, 20.65, 20.59, 14.27. ESI-MS m/z [M+Na]+: 811.2 g/mol.

1-(4-(2-(1-(4,7,10-trisethylcarboxymethyl-(1,4,7,10-tetraazacyclododecyl))) ethylcarbamoyloxymethyl)-2-((2-ethoxy-2-oxoethyl)amino)phenyl)-2,3,4,6-tetra-O-acetyl-β-D-galactopyranose (9a): 8a (0.27 mmol, 1 eq.), Cs2CO3 (0.41 mmol, 1.5 eq.), and ethyl-DO3 A.HBr (0.32 mmol, 1.2 eq.) were dissolved/suspended in dry MeCN (10 mL) in a 25 mL round bottom flask fit with a stir bar. A nitrogen atmosphere was established and the reaction mixture was stirred at room temperature for 1.5 days. The reaction mixture was adsorbed to silica gel in vacuo and run through a silica plug with a gradient of 5-10% MeOH in DCM to remove the majority of the remaining ethyl-DO3 A. The resulting white foam was carried on without further purification.

1-(4-(2-(1-(4,7,10-trisethylcarboxymethyl-(1,4,7,10-tetraazacyclododecyl))) ethyl carb amoyloxymethyl)-2-((4-ethoxy-4-oxobutyl)amino)phenyl)-2,3,4,6-tetra-O-acetyl-β-D-galactopyranose (9b): 8b (0.43 mmol, 1 eq.), Cs2CO3 (0.29 mmol, 1.5 eq.), and ethyl DO3 A.HBr (0.36 mmol, 1.2 eq.) were dissolved/suspended in dry MeCN (10 mL) in a 25 mL round bottom flask fit with a stir bar. A nitrogen atmosphere was established and the reaction mixture was stirred at room temperature for 1.5 days. The reaction mixture was adsorbed to silica gel in vacuo and run through a silica plug with a gradient of 5-10% MeOH in DCM to remove the majority of the remaining ethyl DO3 A. The resulting white foam was carried on without further purification.

1-(4-(2-(1-(4,7,10-trisethylcarboxymethyl-(1,4,7,10-tetraazacyclododecyl))) ethylcarbamoyloxymethyl)-2-((6-ethoxy-6-oxohexyl)amino)phenyl)-2,3,4,6-tetra-O-acetyl-β-D-galactopyranose (9c): 8c (0.33 mmol, 1 eq.), Cs2CO3 (0.21 mmol, 1.5 eq.), and ethyl DO3 A.HBr (0.26 mmol, 1.2 eq.) were dissolved/suspended in dry MeCN (10 mL) in a 25 mL round bottom flask fit with a stir bar. A nitrogen atmosphere was established and the reaction mixture was stirred at room temperature for 1.5 days. The reaction mixture was adsorbed to silica gel in vacuo and run through a silica plug with a gradient of 510% MeOH in DCM to remove the majority of the remaining ethyl DO3 A. The resulting white foam was carried on without further purification.

S15

1-(4-(2-(1-(4,7,10-trisethylcarboxymethyl-(1,4,7,10-tetraazacyclododecyl))) ethylcarbamoyloxymethyl)-2-((8-ethoxy-8-oxooctyl)amino)phenyl)-2,3,4,6-tetra-O-acetyl-β-D-galactopyranose (9d): 9c (0.16 mmol, 1 eq.), Cs2CO3 (0.25 mmol, 1.5 eq.), and ethyl DO3 A.HBr (0.20 mmol, 1.2 eq.) were dissolved/suspended in dry MeCN (10 mL) in a 25 mL round bottom flask fit with a stir bar. A nitrogen atmosphere was established and the reaction mixture was stirred at room temperature for 1.5 days. The reaction mixture was adsorbed to silica gel in vacuo and run through a silica plug with a gradient of 5-10% MeOH in DCM to remove the majority of the remaining Ethyl DO3 A. The resulting white foam was carried on without further purification.

Deprotection of the Ligands and Metalation with Gd(III) and Tb(III)

In a 100 mL round bottom flask the penultimate compound (4a-c, 9a-d) was suspended in ~10 mL of 1 M NaOH and stirred at 0° C. in a nitrogen atmosphere for one hour. During this time the ethyl and acetate protecting groups were globally removed, driving the solids into solution. The pH was adjusted to between 5.5-6 using 1 M HCl and the corresponding Ln(Cl3).6H2O (Ln=Gd or Tb) was added. The metalation was stirred at room temperature under a nitrogen atmosphere for 1-3 days. During the course of the reaction, a pH of 5.5-6 was maintained with small additions of 1 M NaOH until no further change in pH was observed. When the reaction was complete, the pH of the was brought to 12 using 1 M NaOH to precipitate excess, unchelated Ln(OH)3 that was removed by two successive rounds of centrifugation and decanting. The resulting supernatant was lyophilized to yield fluffy solids. Final complexes were purified by semipreparative HPLC and characterized by high-resolution ESI-MS. NMR analysis of these compounds could not be used due to paramagnetic line broadening from the presence of the LnIII.

Gadolinium(III)-1-(4-(2-(1-(4,7,10-triscarboxymethyl-(1,4,7,10tetraazacyclododecyl)))ethylcarbamoyloxymethyl)-2-((2-ethoxy-2-oxoethyl)amino)phenyl)-β-D-galactopyranose (10a, C2): (59% yield) ESI-HRMS m/z [M−H]− calcd: 928.2217 g/mol, observed: 931.2219 g/mol.

Terbium(III)-1-(4-(2-(1-(4,7,10-triscarboxymethyl-(1,4,7,10tetraazacyclododecyl)))ethylcarbamoyloxymethyl)-2-((2-ethoxy-2-oxoethyl)amino)phenyl)-β-D-galactopyranose (10a', C2): (10% yield) ESI-HRMS m/z [M+H]+ calcd: 931.2381 g/mol, observed: 931.2371 g/mol.

Gadolinium(III)-1-(4-(2-(1-(4,7,10-triscarboxymethyl-(1,4,7,10tetraazacyclododecyl)))ethylcarbamoyloxymethyl)-2-((4-ethoxy-4-oxobutyl)amino)phenyl)-β-D-galactopyranose (10b, C4): (10% yield) ESI-HRMS m/z [M−H]− calcd: 956.2530 g/mol, observed: 956.2527 g/mol.

Terbium(III)-1-(4-(2-(1-(4,7,10-triscarboxymethyl-(1,4,7,10tetraazacyclododecyl)))ethylcarbamoyloxymethyl)-2-((4-ethoxy-4-oxobutyl)amino)phenyl)-β-D-galactopyranose (10b', C4): (16% yield), ESI-HRMS m/z [M+H]+ calcd: 959.2694 g/mol, observed: 959.2687 g/mol.

Gadolinium(III)-1-(4-(2-(1-(4,7,10-triscarboxymethyl-(1,4,7,10tetraazacyclododecyl)))ethylcarbamoyloxymethyl)-2-((6-ethoxy-6-oxohexyl)amino)phenyl)-β-D-galactopyranose (10c, C6) (22% yield) ESI-HRMS m/z [M+H]+ calcd: 986.2995 g/mol, observed: 986.2997 g/mol.

Terbium(III)-1-(4-(2-(1-(4,7,10-triscarboxymethyl-(1,4,7,10tetraazacyclododecyl)))ethylcarbamoyloxymethyl)-2-((6-ethoxy-6-oxohexyl)amino)phenyl)-β-D-galactopyranose (10c', C6): (49% yield) ESI-HRMS m/z [M+H]+ calcd: 987.3007 g/mol, observed: 987.2999 g/mol.

Gadolinium(III)-1-(4-(2-(1-(4,7,10-triscarboxymethyl-(1,4,7,10tetraazacyclododecyl)))ethylcarbamoyloxymethyl)-2-((8-ethoxy-8-oxooctyl)amino)phenyl)-β-D-galactopyranose (10d, C8): (50% yield) ESI-HRMS m/z [M+H]+ calcd: 1014.3308 g/mol, observed: 1014.3317 g/mol.

Terbium(III)-1-(4-(2-(1-(4,7,10-triscarboxymethyl-(1,4,7,10tetraazacyclododecyl)))ethylcarbamoyloxymethyl)-2-((8-ethoxy-8-oxooctyl)amino)phenyl)-β-D-galactopyranose (10d', C8): (33% yield) ESI-HRMS m/z [M+H]+ calcd: 1015.3320 g/mol, observed: 1015.3325 g/mol.

HPLC Purification:

All final, metalated compounds were purified by semipreparative HPLC on a Varian Prostar 500 system equipped with a Varian 335 UV-vis and an HP 1046 fluorescence detector. Compound purification was verified by analytical HPLC on a Varian Prostar 500 system equipped with a Varian Prostar 335 UV-vis and Varian Prostar 363 fluorescence detector. Both systems utilized a binary mobile phase of MilliQ water (A) and HPLC-grade MeCN (B). All samples were injected in 100% water and elution gradients were run from 5 to 50% MeCN. Compounds 5a-c and 5a'-c' were purified/verified using a Waters 19×250 mM 5 μM Atlantis T3 C18 column or Waters 4.6×250 mM 5 μm Atlantis T3 C18 column, for semi-preparative and analytical respectively. Compounds 10a-d and 10a'-d' were purified/verified using a Phenomenex Synergi 4 μm Polar-RP 80 Å LC Column 150×21.2 mm.

Inductively Coupled Plasma-Mass Spectrometry (ICP-MS)

Exact Gd(III) concentrations used for relaxivity and Mill were determined using ICP-MS. Samples were prepared by digestion in concentrated $HNO_3$ (100 μL) at 80° C. in 15 mL conical tubes for 1 hour followed by dilution to a total volume of 10 mL with MilliQ water. Samples were analyzed on a computer-controlled (Plasmalab software) Thermo X series II ICP-MS (Thermo Fisher Scientific, Waltham, MA) equipped with an ESI SC-2 autosampler (Omaha, NE). Each sample was acquired using one survey run (10 sweeps) followed by three main (peak jumping) runs (100 sweeps). Isotopes analyzed included 154, 157, 158Gd, while 115In and 165Ho were used as internal standards for data interpolation and instrument stability.

Relaxivity (1.4 T).

$T_1$ relaxation times were obtained for 5a-c (FIG. 13), and complexes 10a-d (FIG. 14), and 11 at 37° C. at 60 MHz (1.4 T) on a Bruker mq60 minispec spectrometer (Billerica, MA). Three 1 mM solutions of each complex were prepared in four different buffer conditions 1) 10 mm 3-(N-morpholino)propanesulfonic acid (MOPS), 100 mm NaCl, pH 7.4, 2) 10 mm MOPS, 24 mm NaHCO$_3$, 100 mm NaCl, pH 7.4, 3) Dulbecco's Phosphate Buffer (DPBS) pH 7.3 Life Technologies, and 4) b-galactosidase enzyme assay buffer, 200 mm sodium phosphate, 100 mm bmercaptoethanol, 2 mm MgCl$_2$, pH 7.3 (FIG. 15). Three sets of five serial dilutions (about 1 mm, 0.5 mm, 0.25 mm, 0.125 mm and 0.0625 mm) were prepared for each complex. T1 relaxation rates were measured using an inversion recovery pule sequence (t1_ir_mb) with a 10 ms first pulse separation, recycle delay and final pulse separation ≥5 T1. T1 relaxation rates were plotted as a function of GdIII concentrations as determined by ICP-MS, $r_1/r_2$ was obtained from linear fit of concentration vs. $T_1$ as described in Equation (1).

Compound stability was assessed by relaxivity ($T_1$) for 10a-d by measuring 1 mM solutions in enzyme buffer (200 mM Na$_3$PO$_4$, 100 mM β-mercaptoethanol, 2 mM MgCl$_2$, pH 7.3) and compound 10c was additionally measured in cell culture media over the course of two weeks (FIG. 16). No significant change in T1 was observed over 140 hours.

Terbium(III) Luminescence: Determination of q.

The number of water molecules directly coordinated to the lanthanide center (q), was determined for each of the TbIII analogues 5a'-c' (see Table 1), 10a'-d' (Table 2), and 11' in MilliQ water and MOPS/carbonate buffer (10 mm MOPS, 24 mm NaHCO$_3$, pH 7.4).

and D$_2$O, and in both buffer and deuterated buffer, obtained by lyophilizing and re-suspending the buffer in D2O three times (FIG. 17A-E). The q values were calculated using the empirically derived Horrock's equation for Tb(III) (Eq. 2):

$$q = 4.2\left(\frac{1}{\tau_H} - \frac{1}{\tau_D} - 0.06\right)$$ Eq. 2

Enzyme Kinetics by UV-Vis

Enzyme activation kinetics were determined by the method of initial rates for compounds 5a-c via the appearance of the nitrophenol byproduct of activation. The characteristic absorption was monitored at 420 nm. Concentrations of substrate used were 0, 0.05, 0.1, 0.12, 0.15, 0.3, 0.4, 0.5, 0.75, 1, and 2 mM. Each concentration was measured in triplicate and exact concentrations were measured by ICP-MS (see Table 2).

TABLE 2

Michaelis-Menten kinetics determined by UV-vis spectroscopy for the 5a, 5b, and 5c as compared to ortho-nitrophyenyl-☐-galactoside (ONPG) and para-nitrophyenyl-☐-galactoside (PNPG), standard compounds used to evaluate ☐-galactosidase activity. Catalytic efficiencies are reported as the appearance of the nitro-phenol absorbance at 420 nm, performed at 25° C. in TES buffer with 1 mM MgCl2 and 150 mM NaCl.

| Substrate | $K_m$ (mM) | $K_{cat}$ (S-1) | $k_{cat}/K_m$ (M-1s-1) |
|---|---|---|---|
| ortho (5a) | 0.272 +/- 0.048 | 637 +/- 21.9 | 2.34 |
| meta (5b) | 0.791 +/- 0.16 | 679 +/- 135.8 | 0.90 |
| para (5c) | 0.129 +/- 0.028 | 765 +/- 37.8 | 5.93 |
| ONPG | 0.120 +/- 0.0014 | 600 +/- 29.7 | 5.0 |
| PNPG | 0.061 +/- 0.0014 | 276 +/- 16.9 | 4.5 |

MR Imaging Solution Phantoms (+/−β-Gal) (7 T)

MR images were acquired on a Bruker Pharmscan 7 T imaging spectrometer fitted with shielded gradient coils at 25° C. Image analysis was carried out using Paravision 5.0 p13 software (Bruker, Billerica, MA, USA) with monoexponential curve-fitting of image intensities of selected

TABLE 1

Luminescent decay properties of TbIII analogues (5a', 5b', 5c', and 11') and resulting q values are reported. Decay (☐) rates were measured in H2O, D2O, MOPS/CO32- buffer (τHbuf), and deuterated MOPS/CO32- buffer at pH = 7.4 (τDbuf). Excitations are reported, q values are calculated using Horrock's equation for TbIII (Eq. 2). Emission was observed at 543 nm at ambient temperature.

| Complex | Ex. λ (nm) | $\tau_{H2O}$ (ms) | $\tau_{D2O}$ (ms) | $\tau_{Hbuf}$ (ms) | $\tau_{Dbuf}$ (ms) | q (H$_2$O) | q (buffer) |
|---|---|---|---|---|---|---|---|
| 5a' ortho | 223 | 1.2(8) | 2.2(3) | 1.7(6) | 2.2(0) | 1.1 | 0.2 |
| 5b' meta | 225 | 1.3(0) | 1.6(6) | 1.4(2) | 1.5(4) | 0.4 | 0 |
| 5c' para | 352 | 0.8(9) | 1.1(1) | 1.0(2) | 1.0(7) | 0.7 | 0 |
| 11' | 308 | 1.7(1) | 2.2(6) | 1.3(5) | 2.0(4) | 0.9 | 0.8 |

The monoexponential fluorescence decay of an ≈1 mm solution of each complex was determined using a Hitachi F4500 fluorometer (Schaumburg, IL). An excitation wavelength of 308 nm and an emission wavelength of 534 nm were used, and 25 scans were acquired and averaged for each solution. The averaged data was fit with a monoexponential decay function, and the time constant (t) for each solution was determined in triplicate. The fluorescence decay curves of the complexes were measured in both H$_2$O regions of interest (ROIs) for each axial slice. Complexes 10b, 10c, 10d, and 11 were prepared in enzyme assay buffer (200 mM sodium phosphate, 100 mM β-mercaptoethanol, 2 mM MgCl2, pH 7.3) at 500 µM. Exact Gd(III) concentration was verified by ICP-MS. Either 10 µL of enzyme stock solution (50% enzyme assay buffer, 50% glycerol, at 521 U/mL β-gal) or 10 µL of a 50% enzyme assay buffer/50% glycerol solution (used as a control) were added to a 190 µL aliquot of each complex. After this addition, the final concentration of each complex was 475 μM, with 26.1 U/mL of β-gal. The solutions were incubated at 37° C. for 24 hours, then aliquoted to 5, ¾" flame-sealed Pasteur pipets. The bottom sections of the flame-sealed pipets were then scored with a glass scribe, broken into small capillaries, and imaged using a RF RES 300 1H 089/023 quadrature transmit receive 23 mm volume coil (Bruker BioSpin, Billerica, MA, USA). T1 relaxation times were measured using a rapid-acquisition rapid-echo RARE-VTR T1-map pulse sequence with the following imaging parameters: TE (11.0 ms), TR (500.0 ms), field of view (FOV)=25×25 mm2, matrix size (MTX) =256×256, number of axial slices=5, slice thickness (SI) =1.0 mm, and averages (NEX)=3, and total scan time was 2:36:57. T2 values were measured using a multislice multiecho (MSME) T2-map pulse sequence, with static TR (5000 ms) and 32 fitted echoes in 11 ms intervals (11, 22, . . ., 352 ms). Imaging parameters were as follows: FOV=25× 25 mm2, MTX=256×256, number of axial slices=4, SI=1.0 mm, NEX=3, and a total scan time=48 min. T1 images and times can be found in FIG. 14 and T2 maps and times can be found in FIG. 18.

In vivo MR Imaging (9.4 T) Hemizygous transgenic mice (n=2) constitutively expressing the lacZ gene that encodes the β-gal enzyme (strain ROSA26-lacZ) were purchased from The Jackson Laboratory (Bar Harbor, ME). A non-transgenic littermate was used as a control. 200 of 40 mM 10c was injected into 3 mice in the intraperitoneal cavity (IP). Mice were imaged with MRI at baseline, and 1, 4, and 24 hours post injection.

MRI was performed on a 9.4T Bruker Biospec MRI system with a 30 cm bore, a 12 cm gradient insert, and an Autopac automated sample positioning system (Bruker Biospin Inc, Billerica, MA). Animals were anesthetized in an induction chamber with 3% isoflurane and transferred to a dedicated imaging bed with isoflurane delivered via nosecone at 1-2%. Respiratory signals were monitored using an MR-compatible physiologic monitoring system (SA Instruments, Stonybrook, NY) and a warm water circulating system was used to maintain body temperature. Animals were placed in the prone position and a quadrature radiofrequency coil with inner diameter 40 mm was mounted on the bed. Mice were imaged using a FLASH gradient echo sequence using the following parameters: TR/TE/α=100 ms/2.2 ms/45°, MTX=192×192, FOV 4×4 cm, 9 slices of 1 mm thick, 0.3 mm slice gap, and 1 signal average.

Results and Discussion

Two different architectures of the b-gal activated contrast agent were synthesized and characterized herein (FIG. 12). In the intermolecular design, a carbonate is occupying the open coordination site of the GdIII ion (FIG. 19). In the intramolecular design the ninth coordination site is occupied by a pendent carboxyl ligand attached to the para position of the nitrobenzene (FIG. 20). Based upon results with the intermolecular design, the para sugar configuration was selected due to the rapid enzyme kinetics and the relative synthetic ease of incorporating a pendant carboxylate ligand (FIG. 20 and FIG. 21). In this strategy, the nitro group was reduced to the corresponding aniline for synthetic incorporation of a pendant carboxylate arm with variable levels of flexibility. Aliphatic linkers composed of 1, 3, 5, or 7 carbons (10a-d) were used to connect the pendant carboxylate to the aniline nitrogen in an effort to determine the optimal flexibility for facilitating intramolecular coordination to the GdIII ion.

q Measurements, Intramolecular Ligand Coordination:

As with the intermolecular series, the Tb(III) luminescence properties of 10a' d' were used to determine q in pure water versus MOPS/$CO_3^{2-}$ (Table 2). If intramolecular coordination is more favorable than the intermolecular coordination, the inner-coordination sphere should not change in the presence of the strongly coordinating $CO_3^{2-}$ anion. These data suggest that the 2C and 4C linkers (10a', b') were too short and inflexible to coordinate to the lanthanide center, making them unsatisfactory for q-modulation. However, the 6C and 8C linkers (10c' and 10d'), respectively, have a stable q=0.1 in the presence of $CO_3^{2-}$. This suggests that in these complexes, there is enough flexibility in the linker to facilitate coordination of the pendant carboxylate, making these the best candidates for intramolecular activation and maximization of Δ r1.

TABLE 3

Luminescent decay properties and q values of Tb(III) analogues 10a', 10b', 10c', and 10d'. Decay (τ) rates were measured in $H_2O$, $D_2O$, MOPS/$CO_3^{2-}$ buffer (τHbuf), and deuterated MOPS/$CO_3^{2-}$ buffer at pH = 7.4 (τDbuf). The excitation wavelengths that were used are reported. q values were calculated using Horrock's equation for TbIII. Emission was observed at 543 nm at ambient temperature.

| Complex | Ex. λ (nm) | $\tau_{H_2O}$ (ms) | $\tau_{D_2O}$ (ms) | $\tau_{Hbuf}$ (ms) | $\tau_{Dbuf}$ (ms) | q ($H_2O$) | q (buffer) |
|---|---|---|---|---|---|---|---|
| 10a' | 308 | 1.1(4) | 2.1(0) | 1.7(2) | 2.1(8) | 1.3 | 0.3 |
| 10b' | 308 | 1.6(3) | 2.2(6) | 1.8(9) | 1.8(8) | 0.5 | 0 |
| 10c' | 310 | 1.8(9) | 2.2(9) | 1.9(3) | 2.2(6) | 0.1 | 0.1 |
| 10d' | 310 | 1.9(3) | 2.2(6) | 1.9(7) | 2.0(2) | 0.1 | 0.1 |

Relaxivity of the Intramolecular Design:

Relaxivities of the intramolecular series were measured at 1.4 T to evaluate signal changes in the absence and presence of $CO_3^{2-}$. Measurements were conducted in two buffer conditions, MOPS and MOPS/$CO_3^{2-}$ (FIG. 14A), and plotted as percent change in signal Δr1 (FIG. 14B). As expected based on the measured q values, 10a has the highest relativity of the series, suggesting that intramolecular coordination between the pendant carboxylate and the GdIII ion is not significant. As a result, 10a displays a negative Δ r1. 10b displays the largest Δr1 in MOPS and 10c demonstrates the highest overall change in signal in the presence of $CO_3^{2-}$. Although the 8C linker in 10d can coordinate the lanthanide ion (GdIII or TbIII), this agent displays a negative Δr1 and is therefore not viable for in vivo imaging.

Solution Phantom MR Imaging, +/−β-Gal:

Based on the Δr1 and q measurements, 10b, 10c, and 10d were selected for further investigation by MR imaging at 7 T. 10b was selected because it displayed a positive Δr1, even though it did not display intramolecular q-modulation. 10c was selected as the optimal candidate, displaying both a positive (20%) Δr1 and effective q-modulation. 10d was selected because it displayed effective q-modulation even though the Δr1 was negative at 1.4 T.

T1 solution phantom images were collected in the presence and absence of β-gal (FIG. 38). 10b displayed the greatest change in MR contrast but this does not arise from intramolecular q-modulation, as determined by Tb(III) luminescence where the q≠0 in pure water (Table 3). However, 10b does not appear to fully activate in the presence of β-gal, as the T1+β-gal (378 ms) did not reach the T1 of 11 (334 ms). 10c and 10d have approximately the same T1 signal in the presence of β-gal as the fully cleaved agent 11 (see FIG. 12)

MR Imaging in Transgenic Mice: Compound 10c (6C pendant carboxylate ligand) was selected for an in vivo studies in mice. This complex displayed a q=0.1 in the presence of $CO_3^{2-}$ and a positive change in relaxivity at both 1.4 and 7 T.

10c was injected intraperitoneally into transgenic LacZ mice (FIG. 23, Rows 1 and 2: Jackson Labs: http://www.jax.org/). Global signal enhancement was observed in the lacZ-expressing mice at 1 h post injection (prominent in the liver and kidney). At 4 hrs post injection, signal enhancement was present but at a reduced level. In one LacZ mouse, the bladder was visible at the 4 hr time point with a very bright MR signal, suggesting that the b-gal responsive MR agent is cleared renally. In both mice, the MR signal returned to baseline within 24 hours, suggesting that the bulk of the agent was cleared by the kidney. No signal enhancement was observed in non-transgenic native control mice (FIG. 23, row3).

Conclusions:

Two structural designs for the preparation of q-modulated, self-immolative activated MR contrast agents for the in vivo detection of b-galactosidase are described herein. The first exploits intermolecular $CO_3^{2-}$ to coordinatively saturate the GdIII ion to create an ineffective agent. The results from this investigation guided the strategy of a second design that involves the intramolecular coordination of a pendant carboxylate ligand with varied linker lengths. Both strategies exploit the rapid enzyme kinetics of a self-immolative linker that undergoes an electron cascade upon hydrolysis of the galactose moiety by b-gal. For the intermolecular approach, a number of structural isomers designed to increase $CO_3^2$ affinity to the GdIII ion were systematically evaluated. This was accomplished by increasing steric interactions between galactose and the macrocycle. Even so, this intermolecular approach did not provide significant changes in relaxivity for the in vivo detection of b-gal activity. However, the significant improvement in the enzyme kinetics of 5c (para), and the positive change in q, were important parameters to guide intramolecular design. By inserting a pendent carboxylic functional group as part of the self-immolative linker, a stable carboxylate coordination to the GdIII ion was able to be created. 10c (6-C pendant carboxylate) is demonstrated herein to be an extremely effective MR reporter for the detection of enzyme activity in a mouse model expressing b-gal. The need for non-invasive, disease specific biomarkers that reflect treatment efficacy is paramount in this field. Therefore, bioactivated MR agents may be developed using the intramolecular approach described herein for Adeno-Associated Virus (AAV) treatment in Tay-Sachs/Sandhoff (GM2 gangliosidoses), hexosaminidase (or Hex-A), Pompe disease (a-glucosidase) and mucopolysaccharidosis VII (b-glucosidase).

Example 3

β-Gal Responsive MR Contrast Agent

Gene therapy is once again on the rise thanks to newly developed gene-editing and gene-delivery technologies. However, it remains challenging to noninvasively track the effectiveness and the biodistribution of these gene therapy products in vivo. This is a significant hinderance towards FDA-approval and may leave physicians guessing which organs or structures are effectively treated. To track/validate the expression of target therapeutic gene, a reporter gene can be attached to the therapeutic gene and be co-expressed. The expressed protein of the reporter gene can then be detected and visualized ex vivo. In vivo detection of the expressed reporter gene product is much more difficult, yet essential to evaluating gene therapy effectiveness. Herein, a new MRI-based technology that has the potential to track β-galactosidase, a commonly used reporter gene product, in vivo with high spatial and temporal resolution is described. β-galactosidase (β-gal) is the product of reporter gene LacZ that is routinely used to evaluate transcription and transfection efficiencies via beta-galactosidase assay. Deficiency of native β-gal in human has also been implicated in several diseases such as ABC. As a result, detecting this crucial biomarker in vivo has profound diagnostic as well as therapeutic implications, and much progress has been made to this end. Among the various imaging modalities that have been used to detect β-gal, MRI is a frontrunner for in vivo detection due to its tunable soft-tissue contrast, high spatial temporal resolution and lack of ionizing radiation.

In order to detect β-gal activities in vivo via MRI, bioresponsive MR contrast agents (CAs) must be employed. Specifically, for T1-weighted molecular MRI, bioresponsive Gd(III)-based MR contrast agents (GBCAs) are used to enhance T1-weighted MR signal by reducing the longitudinal relaxation time (T1) of water protons. The degree to which 1 mM Gd(III) chelate can decrease the T1 of water protons is known as relaxivity r1 (mM-is-1). Relaxivity r1 is the term used to describes the signal enhancement capability of GBCAs.

Because water molecules closest to the Gd(III) center (i.e. directly bound) experience the fastest relaxation, the relaxivity r1 of GBCAs is positively correlated with the hydration number q of the Gd(III) center. As such, when the q of a bioresponsive GBCA increased upon activation, enhanced T1-w MR signal will be observed. In the context of β-gal imaging, these bioresponsive GBCAs are in the "off-state" with a low q value prior to β-gal activation; upon activation the q value increases thereby "turning on" the MR signal. This change of MR signal is then used as a readout for β-gal activities in vivo.

β-gal responsive GBCAs face several unresolved issues including slow kinetics, difficulties in scale-up synthesis, negligible response at low field (<3 T), carbonate/phosphate binding and quenching of the MR signal.

To overcome these challenges, herein a β-gal probe 1 (BP1) is described that is free of all the issues mentioned above. The ligand is a DO3 A derivative substituted with a pyridylmethyl moiety. Prior to activation, the pyridylmethyl moiety acts as a bidentate ligand to Gd(III) giving q=0. However, once the sugar is cleaved by β-gal, the pendent arm self-immolate to open up 1 coordination site for water binding, leading to a q increase from 0 to 1. Normally, when a probe of this size is activated at low field, the increase in r1 as a result of q increase is offset or negated by a decrease in rotational correlation time ($\tau_R$). Surprisingly, this was not the case for BP1 as β-gal activity leads to 100% increase in longitudinal relaxivity r1 at both low field (1.4 T) and high field (7 T). In addition to the field-independent response, the modular design of BP1 provides a general GBCA platform where different bioresponsive moieties can be installed to generate a variety of different molecular probes.

The proposed sensing mechanism of BP1 is shown in FIG. 24.

Results and Discussion

Synthesis of B-Gal Probe 1 (BP1).

The syntheses of BP1 is highly modular and allows for relative ease in scaling up (FIG. 25). Precursors 1 and 2 were coupled to form the carbamate product 3, which was deprotected in the presence of TBAF and brominated to afford the pendent sugar arm 4. It was then reacted with Ethyl-DO3A to give the protected ligand 5, followed by a two-step deprotection to give the fully-deprotected ligand 6. In the final step, 6 was metallated with GdCl3 to furnish the final probe BP1. This platform is modular as one can replace precursor 1 for other reactive moieties such as sugars or peptides to image other enzyme of interests. To showcase this key feature and to have a control probe for BP1, BP1-control (BP1-ctrl) was synthesized adopting the same synthetic route (SI). The activated product of BP1, ABP1 was also synthesized. The purity of BP1, BP1-ctrl and ABP1 were confirmed with analytical HPLC and ESI-MS.

In Vitro MR Detection of β-Gal Activities with BP1.

The MR response of BP1 to β-gal was evaluated. The $T_1$ of BP1 solution (1 mM) in the presence of β-gal (0.8 µg/mL) were measured with relaxometry at 1.41 T and 37° C., and the results confirmed its reactivity towards β-gal.[10d] A 39.2% increase in $1/T_1$ was observed after 1 hr, and a 89.0% increase in $1/T_1$ was observed after 5 hrs. The concomitant T2 change was similar.

MR imaging at higher field strength is routinely used for pre-clinical studies as it offers higher signal-to-noise ratio, better resolution and decreased imaging time. As such, MR images were acquired at 7 T for BP1 solution phantoms with and without β-gal incubated (FIG. 26B). The $r_1$ increase was similar at high field compared to low field. At 4 different concentration of BP1 measured, the $1/T_1$ of the solution increased by 47-86% upon overnight incubation with β-gal, and the images was readily discernable from prior to enzymatic conversion in color scale.

Relaxivity Measurements.

The relaxivities $r_1$ and $r_2$ of both BP1 and BP1-ctrl with and without β-gal overnight incubation were measured at 1.41 T and 7 T (Table 4). At both field strengths, the $r_1$ and $r_2$ of BP1 solution increased by ca. 90% in the presence of β-gal. The r1 and r2 of BP1-ctrl are close to those of BP1, indicating that BP1-ctrl is a valid control probe to BP1. The r1 and r2 of ABP1 approximate those of BP1+β-gal, suggesting that BP1 is fully converted to ABP1 after incubation with β-gal.

TABLE 4

Relaxivities of GBCAs discussed herein at 1.41 T (37° C.) and 7 T (25° C.)

| MR Probe | $r_1$ at 1.41 T (mM$^{-1}$ s$^{-1}$) | $r_2$ at 1.41 T (mM$^{-1}$ s$^{-1}$) | $r_1$ at 7 T (mM$^{-1}$ s$^{-1}$) | $r_2$ at 7 T (mM$^{-1}$ s$^{-1}$) |
|---|---|---|---|---|
| BP1 | 1.8 | 2.3 | 2.3 | 3.4 |
| BP1 +β-gal | 3.7 | 4.4 | 4.3 | 5.7 |
| ABP1 | 3.8 | 4.2 | 4.4 | 6.3 |
| BP1-ctrl | 1.6 | 1.9 | 2.0 | 2.9 |

UV-Vis Studies of BP1 Activation Kinetics Unveil Reaction Intermediates.

To gain insights into the activation kinetic of BP1, we measured the initial rate of formation for the nitrophenol product which absorbs strongly at 340 nm. Much to our surprise, the kinetic study (FIG. 27A) albeit performed at lower β-gal concentration (1 µg/mL) compared to the concentration used in the relaxometry studies (8 µg/mL, FIG. 26A), indicated that the enzymatic cleave of the sugar from BP1 (1 mM) was complete within 20 mins, much shorter than the 5 hrs as indicated by the relaxometry study.

The discrepancy between absorption and relaxometry data may be the result of a stepwise activation mechanism (FIG. 28). After the sugar cleavage by β-gal, BP1 is transformed to intermediate A, which then breaks down to intermediate B via self-immolation, and finally B to ABP1 via decarboxylation. If the breakdown of either A or B is slow, it would explain why the sugar was cleaved quickly hence the fast absorption change, but the $T_1$ change was lagged behind since both A and B have q of 0 just like BP1.

Intermediate A is more likely the "trapped" intermediate, since the decarboxylation of B should be facile. If so, two sets of UV-vis spectral changes would be observed, with the first one corresponding to β-gal cleavage and formation of A, second corresponding to A breaking down to form ABP1. If B is the intermediate, only one set of UV-vis spectral change will be observed, since o-nitrophenol is the only product formed that absorbs strongly above 400 nm. As shown in FIG. 27B, two sets of spectral changes were observed. The first one occurred from 0-2 hrs featuring a relatively fast hyperchromic shift in the UV region, and it is consistent with the formation of intermediate A. The second one occurred after 2 hrs, featuring a slow hypsochromic shift, indicating the formation of a new species. This is consistent with intermediate A further react and forms ABP1 and o-nitrophenol. In addition, the presence of A during the reaction was also confirmed by ESI-MS, further supporting that the conversion of A to B is the slow step. Interestingly, when BP1 is incubated with β-gal at three different pHs (pH 4.5, 5.5, 6.6), fastest $T_1$ change was seen at pH 5.5 (FIG. 27C). The fact that $T_1$ change at pH 5.5 is faster than at pH 4.5 further supports the formation of intermediate A, as higher pH leads to higher proportion of deprotonated A which readily self-immolate to form ABP1. However, further increasing pH slows down the $T_1$ decrease, suggesting a more complex mechanism may be at work. While this mechanistic study is interesting, it should not interfere with the in vivo activation of BP1, as most β-gal resides in lysosomal pH environment (pH 4.5-5), well within the range where A will break down to form ABP1. In fact, it is possible that this pH-sensitive response of BP1 towards β-gal may confer selectivity towards lysosomal-β-gal over other cytosolic or extracellular enzymes that may also cleave the β-galactose.

Example 4

Adeno-associated virus (AAV) gene therapy has shown transformative outcomes in treating lysosomal storage diseases (LSD). However, lack of a non-invasive method for monitoring the expression of therapeutic enzyme, limits the evaluation of the enzyme biodistribution in the target organs in patients and animal studies.

Described herein are methods for in-vivo magnetic resonance (MR) imaging of β-galactosidase (β-gal), using a novel β-gal responsive MR probe in AAV treated GM1 gangliosidosis mice. This contrast agent-based probe enables in-vivo real-time tracking of gene therapy outcomes in GM1 gangliosidosis through the enhancement of the MR signal in presence of β-gal enzyme.

The β-gal responsive contrast agent-based probe uses an enzyme-specific substrate to block access of water to a Gd(III) ion, thus suppressing its MRI signal. In presence of the therapeutic enzyme (β-gal), the contrast agent is cleaved and MR signal of Gd(III) ion becomes detectable; therefore enabling non-invasive tracking of therapeutic enzyme expression.

GM1 gangliosidosis is a neurodegenerative LSD, caused by mutation in GLB-1 gene that encodes for β-gal enzyme. AAV gene therapy in β-gal$^{-/-}$ mice results in distribution of β-gal, with highest levels in brain after intracranial delivery and in the liver after intravenous AAV administration. FIG. 29 shows β-gal distribution (blue) in mouse brain, one month after intracranial AAV gene therapy.

Methods

Animals and Treatment:

Wild type (n=8), β-gal$^{-/-}$ mice (n=16) and heterozygous mice (n=8) were bred. AAV treated mice were injected with AAV9 encoding GLB-1 intracranially (thalamus, unilateral, 1E10vg,n=4) or intravenously (3E11vg,n=4).

Imaging and Analysis:

AAV-thalamus treated mice were injected with β-gal responsive contrast agent at 0.06 mmol/kg intrathecally. AAV-IV treated mice received 0.16 mmol/kg of contrast agent intraperitoneally. Age matched wild type or heterozygous and β-gal$^{-/-}$ mice (n=3 per group) were included for both routes of contrast administration. Brain or abdomen of mice were imaged using T1W magnetic resonance (MR) imaging technique for at least 90 min. MR signal intensity was analyzed in relation to baseline using ImageJ.

Enzyme Assays:

Frozen mice tissues were used to determine total β-galactosidase activity using 4-methylumbelliferyl-β-D-galactopyranoside as the synthetic fluorogenic substrate, specific for β-galactosidase.

Results:

Activation of β-Gal Responsive Contrast Agent Following Intrathecal Contrast Delivery:

Following intrathecal injection of β-gal responsive contrast agent, AAV treated β-gal$^{-/-}$ mouse shows signal enhancement in cerebral spinal fluid (CSF) and parenchyma (FIG. 30A-30C) Pre contrast injection; ROIs on cerebellum (circle D in FIG. 30A) and brain stem (circle E in 30 A). FIG. 30B shows contrast immediately after contrast injection. Enhancement of CSF, edges of brain stem and base of cerebellum is evident. FIG. 30C shows contrast 90 min after contrast injection. Arrows point to the enhanced areas of CSF between brain stem and cerebellum. The brain stem and cerebellum are fully enhanced. The plot shown in FIG. 30D demonstrates the increasing ratio of parenchyma over CSF signal, which indicates penetration of contrast agent from CSF to parenchyma and its subsequent activation.

The kinetics of signal enhancement within the parenchyma are shown in FIG. 31A-D. Representative brain MR images of an AAV treated β-gal$^{-/-}$ mouse. (A) pre-contrast. (B) post-contrast image showing areas (D-F) where signal changes were quantified over time. Note that ventral aspect of the brain with the greatest exposure to CSF shows the greatest enhancement (up to 70%) which reaches a plateau after 40 min. (C) Heat map of signal enhancement. (D) Plot of signal enhancement over time.

Differential activation of β-gal responsive contrast agent is shown in FIG. 32A-D. Signal enhancement in ventral region of thalamus, 90 min following contrast injection in (A) AAV treated β-gal$^{-/-}$, (B) WT and (C) β-gal$^{-/-}$ mice. Plot illustrates the percentage of signal enhancement over time. While AAV treated and WT mice show enhancement, no enhancement for β-gal$^{-/-}$ mouse is observed.

Activation of β-Gal Responsive Contrast Agent Following Intraperitoneal Contrast Delivery:

Activation of contrast agent in the liver (e.g. following intraperitoneal contrast delivery) is shown in FIG. 33A-D. Differential activation of contrast agent in liver of (A) AAV treated β-gal$^{-/-}$ mouse vs. (B) β-gal$^{-/-}$ mouse. (C) Signal enhancement of liver reaches a plateau after 40 to 50 min of contrast injection (up to 20%). (D) Correlation of MR signal enhancement with β-gal enzyme assay signal ($R^2$=0.95).

Activation of contrast agent in the kidney is shown in FIG. 34A-C.

AAV treated mice showed strong enhancement following contrast administration in brain and liver. These regions show greatest β-gal activity after intracranial and intravenous AAV delivery respectively. No enhancement was present for β-gal$^{-/-}$ mice indicating the specificity of this contrast agent for detection of β-gal enzyme.

Signal enhancement in kidney was present for all groups including β-gal$^{-/-}$ mice. This finding is in agreement with previous enzyme activity measurements in kidney of β-gal$^{-/-}$ mice indicating presence of residual activity of β-gal towards synthetic 4-methylumbelliferyl β-galactoside which might be contributed by other lysosomal enzymes in kidney.

This contrast agent can be modified to interact with the active sites of other enzymes and could be extended to other gene therapies, CRISPR based technologies or enzyme replacement therapies.

Example 5

Synthesis of β-Gluc Probe-1

Representative methods for synthesis of a β-gluc responsive probe are shown in FIG. 35. HPLC results are shown in FIG. 36. Exact mass is shown in FIG. 37.

Example 6

This example demonstrates detection of lysosomal acid beta-galactosidase (βgal) activity using MR imaging in βgal deficient GM1 gangliosidosis mice (GM1 mice) after AAV gene transfer and correlation of enhancement with enzymatic activity ex vivo. This gene therapy approach has showed remarkable efficacy in GM1 mice, GM1 cats, and is now in human clinical trials (NCT03952637). This agent holds promise to inform on AAV gene therapy efficacy in GM1 patients, allowing for non-invasive long-term assessment of durability of gene expression. Additionally, results from this study apply to a large portion of the gene therapy field, since this class of agents can be rapidly adapted to nearly any disease with an enzymatic deficiency.

To determine the capability of this probe to inform on enzyme distribution after AAV gene therapy, GM1 mice were injected with an AAV9-βgal intracranially ($10^{10}$ vg, in the thalamus, unilateral, n=7 or intravenously ($3\times10^{11}$ vg, n=4). After intrathecal injection of βgal responsive contrast agent (FIG. 40), intracranially AAV-treated GM1 mice exhibit signal enhancement in cerebral spinal fluid (CSF) and parenchyma (FIG. 41A-F). Enhancement of CSF occurred rapidly after intrathecal administration (<20 minutes) with an increasing ratio of parenchymal signal/CSF signal that indicates penetration of contrast agent from the CSF into the brain tissue (FIG. 42 A-E). Distribution of the probe within the brain was greatest on the ventral aspect with a gradient projecting dorsally (FIG. 42F-M). The dynamic range is linear and extends to at least >3-logs with a strong correlation between enhancement and βgal enzyme activity within the brain ($R^2$=0.81; FIG. 42N; three AAV treated and one wild type mouse died over night after MRI and are not included in correlation). Signal intensity is normalized to muscle signal (FIG. 45A-F). Success of contrast administration is shown in FIG. 46.

The βgal responsive contrast agent was then evaluated in GM1 mice treated systemically with AAV9-βgal. Signal intensity in the liver after contrast agent administration (intraperitoneal) rose sharply over the first 40-50 minutes after which it plateaued for the duration of the MRI (>2 hours; FIG. 43A-E). Enzymatic activity correlated with enhancement (FIG. 43F; $R^2$=0.94). In the kidney, enhancement followed a similar pattern, except enhancement in untreated GM1 mice was noted, likely due to other enzymes with β-galactosidase activity expressed in renal tissue. In the kidney, there was no apparent correlation between βgal activity and probe enhancement (FIG. 44A-C), suggesting renal clearance of the agent prevents assessment of renal enzyme activity.

The strongest signal enhancement was observed in organs, or sub-structures, where the greatest enzymatic activity has been documented for a particular AAV delivery route. For example, after IV administration of AAV9-βgal the liver is the organ with the greatest transduction and subsequent enzymatic activity. Enhancement of the liver was pronounced in AAV treated animals and correlated with enzymatic activity ($R^2$=0.94). Peritoneal fluid enhancement was noted in all intravenous AAV treated animals, which is not surprising after intraperitoneal (IP) administration since βgal is a lysosomal enzyme that is secreted when overexpressed after gene transfer. While IP injection is an accepted surrogate for intravascular administration in rodents, IV injection may increase the kinetics and potential distribution of this agent as well. Due to the nature of the contrast agent, it is unlikely that it will cross the blood brain barrier to detect βgal activity in brain after vascular administration.

After intrathecal administration, compounds initially pool under the ventral aspect of the brain and penetrate parenchyma via the Virchow-Robin spaces along cerebral blood vessels (e.g. anterior, middle, and posterior cerebral arteries). Histochemical detection of βgal activity in the brain of GM1 mice treated by thalamic injection of AAV-βgal has shown strong staining throughout the parietal cortex and thalamus. Here a gradient of enhancement was observed, most prominent in the ventral aspect of the brain (FIG. 42G-I). The apparent disparity between enzyme distribution and enhancement may indicate that the kinetics of CSF penetration into the brain may be longer than the imaging time shown here. Accordingly, agent distribution into other brain structures may have increased over time. Catalytically active enzyme in CSF, as suggested by contrast enhancement, represents a pool of bioavailable βgal for uptake by untransduced cells through receptor-mediated endocytosis. Although the activity of βgal is optimal in the low pH environment of lysosomes, it likely has catalytic activity at neutral pH. Therefore, enhancement in CSF and/or tissue (in insterstitial fluid or lysosomes) is a direct representation of bioavailable therapeuticaly relevant enzyme regardless of the contrast agent compartmentalization.

The disclosure represents the first report of a contrast agent that informs on enzymatic activity in target tissues after AAV gene therapy. The high correlation between enzyme activity and enhancement encourage further exploration of this technology for eventual translation to patients. The chemical architecture of this platform can be used to develop highly specific MR imaging agents for a large number of enzyme targets by substrate replacement.

The invention claimed is:

1. A method of monitoring gene therapy in a mammalian subject, comprising:
   a) providing gene therapy to the subject, wherein the subject is deficient in a target enzyme and wherein the gene therapy is provided to the subject to restore activity of the target enzyme in the subject;
   b) providing a composition comprising a complex for use in magnetic resonance imaging (MRI) to the subject; and
   c) performing magnetic resonance imaging on the subject, wherein the complex comprises:
      (i) an MRI contrast agent;
      (ii) a blocking substrate cleavable by the target enzyme; and
      iii) a self-immolative linker attaching the blocking substrate to the MRI contrast agent,
   wherein the self-immolative linker provides a functional group that coordinatively saturates the MRI contrast agent, thereby preventing a water access to the MRI contrast agent resulting in no detectable signal in vivo,
   wherein the functional group is attached to the self-immolative linker by a spacer comprising at least 4 carbons, and
   wherein cleavage of the blocking substrate by the target enzyme, if present in the subject, initiates a spontaneous electron cascade of the self-immolative linker that results in removal of the functional group from the MRI contrast agent, thus activating the MRI contrast agent to generate a detectable signal in vivo by magnetic resonance imaging, wherein the detectable signal is produced within 1 hour following cleavage of the blocking substrate,
   wherein the detectable signal indicates that activity of the target enzyme was restored by the gene therapy, or wherein no detectable signal indicates that activity of the target enzyme was not restored by the gene therapy.

2. The method of claim 1, wherein the target enzyme is associated with a lysosomal storage disease in the subject.

3. The method of claim 1, wherein the target enzyme is selected from α-galactosidase, β-galactosidase, α-glucosidase, β-glucosidase, hexosaminidase-A, and hexosaminidase-B.

4. The method of claim 1, wherein the spacer consists of 4, 5, 6, 7, or 8 methylene groups.

5. The method of claim 1, wherein the spacer is attached to an amine present in the self-immolative linker.

6. The method of claim 1, wherein the functional group is a single carboxylate.

7. The method of claim 1, wherein the complex exhibits at least a 50% increase in relaxivity in vivo following cleavage of the blocking substrate.

8. The method of claim 1, wherein the complex exhibits at least an 80% increase in relaxivity in vivo following cleavage of the blocking substrate.

9. The method of claim 1, wherein the contrast agent comprises gadolinium.

10. The method of claim 1, wherein the blocking substrate comprises a sugar moiety containing a glucose, a galactose, a mannose, a ribose, a dextrose, or a derivative thereof.

11. The method of claim 1, wherein the blocking substrate comprises α-glucose, β-glucose, β-galactose, β-glucuronic acid, or N-acetylgalactosamine.

12. The method of claim 1, wherein the complex further comprises a targeting moiety.

13. A method of monitoring gene therapy in a mammalian subject, comprising:
 a) providing gene therapy to the subject, wherein the subject is deficient in a target gene and the gene therapy is provided to the subject to restore activity of the target gene, and wherein during said gene therapy the target gene is co-expressed with a reporter gene that produces a reporter gene product;
 b) providing a composition comprising a complex for use in magnetic resonance imaging (MRI) to the subject; and
 c) performing magnetic resonance imaging on the subject, wherein the complex comprises:
 (i) an MRI contrast agent;
 (ii) a blocking substrate cleavable by the reporter gene product; and
 (iii) a self-immolative linker attaching the blocking substrate to the MRI contrast agent,
 wherein the self-immolative linker provides a functional group that coordinatively saturates the MRI contrast agent, thereby preventing a water access to the MRI contrast agent resulting in no detectable signal in vivo,
 wherein the functional group is attached to the self-immolative linker by a spacer comprising at least 4 carbons, and
 wherein cleavage of the blocking substrate by the reporter gene product, if present in the subject, initiates a spontaneous electron cascade of the self-immolative linker that results in removal of the functional group from the MRI contrast agent, thus activating the MRI contrast agent to generate a detectable signal in vivo by magnetic resonance imaging, wherein the detectable signal is produced within 1 hour following cleavage of the blocking substrate,
 wherein the detectable signal indicates that the reporter gene product was expressed and the activity of the target gene was restored by the gene therapy, or wherein no detectable signal indicates that the reporter gene product was not expressed and the activity of the target gene was not restored by the gene therapy.

14. The method of claim 13, wherein the spacer consists of 4, 5, 6, 7, or 8 methylene groups.

15. The method of claim 13, wherein the spacer is attached to an amine present in the self-immolative linker.

16. The method of claim 13, wherein the functional group is a single carboxylate.

17. The method of claim 13, wherein the complex exhibits at least a 50% increase in relaxivity in vivo following cleavage of the blocking substrate.

18. The method of claim 13, wherein the complex exhibits at least an 80% increase in relaxivity in vivo following cleavage of the blocking substrate.

19. The method of claim 13, wherein the contrast agent comprises gadolinium.

20. The method of claim 13, wherein the complex further comprises a targeting moiety.

* * * * *